(12) United States Patent
Otsuki

(10) Patent No.: US 11,120,287 B2
(45) Date of Patent: Sep. 14, 2021

(54) DATA PROCESSING DEVICE, DATA PROCESSING METHOD, PROGRAM, AND ELECTRONIC DEVICE

(71) Applicant: Sony Semiconductor Solutions Corporation, Kanagawa (JP)

(72) Inventor: Seichi Otsuki, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 169 days.

(21) Appl. No.: 16/465,178

(22) PCT Filed: Dec. 12, 2017

(86) PCT No.: PCT/JP2017/044631
§ 371 (c)(1),
(2) Date: May 30, 2019

(87) PCT Pub. No.: WO2018/110575
PCT Pub. Date: Jun. 21, 2018

(65) Prior Publication Data
US 2019/0370586 A1    Dec. 5, 2019

(30) Foreign Application Priority Data
Dec. 13, 2016 (JP) .............................. JP2016-241355

(51) Int. Cl.
*G06K 9/00* (2006.01)
*G06K 9/20* (2006.01)
*G06K 9/62* (2006.01)

(52) U.S. Cl.
CPC ....... *G06K 9/2018* (2013.01); *G06K 9/00657* (2013.01); *G06K 9/6256* (2013.01);
(Continued)

(58) Field of Classification Search
CPC ............. G06K 9/2018; G06K 9/00657; G06K 9/6256; G06K 2009/00644; G06K 2209/17
See application file for complete search history.

(56) References Cited

U.S. PATENT DOCUMENTS 10,109,051 B1 * 10/2018 Natesh ................. G06K 9/4652
2010/0176280 A1    7/2010 Yokogawa
(Continued)

FOREIGN PATENT DOCUMENTS

JP    H04352078 A    12/1992
JP    H1083455 A     3/1998
(Continued)

OTHER PUBLICATIONS

International Search Report and Written Opinion dated Mar. 23, 2018 in connection with International Application No. PCT/JP2017/044631.
(Continued)

*Primary Examiner* — Atiba O Fitzpatrick
(74) *Attorney, Agent, or Firm* — Wolf, Greenfield & Sacks, P.C.

(57) ABSTRACT

There is provided an imaging system. The imaging system comprising a multispectral camera configured to capture a multispectral image of an object, an RGB camera configured to capture a color image of the object, at least one storage device configured to store spectrum information for each of a plurality of labeled objects, and processing circuitry. The processing circuitry is configured to determine, based on the captured multispectral image, spectrum information associated with the object, associate, based at least in part, on the spectrum information associated with the object and the stored spectrum information for each of the plurality of objects, a label with the color image of the object, and store,
(Continued)

on the at least one storage device, the color image and the associated label as training data.

13 Claims, 38 Drawing Sheets

(52) U.S. Cl.
CPC .............. *G06K 2009/00644* (2013.01); *G06K 2209/17* (2013.01)

(56) References Cited

U.S. PATENT DOCUMENTS

| | | | |
|---|---|---|---|
| 2013/0089248 A1* | 4/2013 | Remiszewski | G06K 9/6262 382/128 |
| 2014/0010443 A1* | 1/2014 | Imai | G01N 21/31 382/165 |
| 2014/0093138 A1 | 4/2014 | Naganuma et al. | |
| 2015/0012226 A1* | 1/2015 | Skaff | G01N 21/55 702/22 |
| 2015/0160128 A1* | 6/2015 | Liu | G01N 21/55 356/445 |
| 2015/0219557 A1* | 8/2015 | Skaff | G01N 21/255 702/189 |
| 2016/0150213 A1 | 5/2016 | Mutti et al. | |

FOREIGN PATENT DOCUMENTS

| | | |
|---|---|---|
| JP | 2003-006612 A | 1/2003 |
| JP | 2010-165718 A | 7/2010 |
| JP | 2012-154628 A | 8/2012 |
| JP | 2013-030626 A | 2/2013 |
| WO | WO 2013/002349 A1 | 1/2013 |
| WO | WO 2014/199720 A1 | 12/2014 |

OTHER PUBLICATIONS

Huang et al., Recent Developments in Hyperspectral Imaging for Assessment of Food Quality and Safety, Sensors, vol. 14, Apr. 22, 2014, pp. 7248-7276.
Liu et al., Application of Multispectral Imaging to Determine Quality Attributes and Ripeness State in Strawberry Fruit, PLOS ONE, vol. 9, No. 2, Feb. 4, 2014, e87818 (8 pages).
Miehl et al., Detection of Defects on Selected Apple Cultivars using Hyperspectral and Multispectral Image Analysis, Applied Engineering in Agriculture, 2002, pp. 219-226.
International Preliminary Report on Patentability dated Jun. 27, 2019 in connection with International Application No. PCT/JP2017/044631.
Japanese Office Action dated Nov. 17, 2020 in connection with Japanese Application No. 2016-241355 and English translation thereof.

\* cited by examiner

FIG. 32

| DETECTION TARGET | DETECTION ITEM | PEAK WAVELENGTH | HALF WIDTH |
|---|---|---|---|
| MYOGLOBIN | TASTINESS COMPONENT | 580–630nm | 30–50nm |
| OLEIC ACID | FRESHNESS | 970nm | 50–100nm |
| CHLOROPHYLL | FRESHNESS | 650–700nm | 50–100nm |

FIG. 33

| FRUIT | DETECTION TARGET | DETECTION ITEM | PEAK WAVELENGTH | HALF WIDTH |
|---|---|---|---|---|
| MELON RAIDEN | SUGAR CONTENT | FLESH LIGHT PATH LENGTH | 880nm | 20-30nm |
| | | SUCROSE | 910nm | 40-50nm |
| MELON RAIDEN RED | SUGAR CONTENT | SUCROSE | 915nm | 40-50nm |
| | | MOISTURE | 955nm | 20-30nm |
| APPLE | SUGAR CONTENT | SUCROSE | 912nm | 40-50nm |
| | MOISTURE | WATER | 844nm | 30nm |
| MANDARIN ORANGE | SUGAR CONTENT | SUCROSE | 914nm | 40-50nm |

FIG. 34

| DETECTION TARGET | PEAK WAVELENGTH | HALF WIDTH |
|---|---|---|
| PET | 1669nm | 30-50nm |
| PS | 1688nm | 30-50nm |
| PE | 1735nm | 30-50nm |
| PVC | 1716-1726nm | 30-50nm |
| PP | 1716-1735nm | 30-50nm |

DATA PROCESSING DEVICE, DATA PROCESSING METHOD, PROGRAM, AND ELECTRONIC DEVICE

CROSS REFERENCE TO RELATED APPLICATIONS

This is a U.S. National Stage Application under 35 U.S.C. § 371, based on International Application No. PCT/JP2017/044631, filed Dec. 12, 2017, which claims priority to Japanese Priority Patent Application JP 2016-241355 filed on Dec. 13, 2016, the entire contents of each of which is incorporated herein by reference.

TECHNICAL FIELD

The present disclosure relates to a data processing device, a data processing method, a program, and an electronic device, and in particular, relates to a data processing device, a data processing method, a program, and an electronic device, in which labeling processing can be automated with respect to an object.

BACKGROUND ART

In the related art, a harvest prediction device is proposed in which the types of crops are recognized, and a yield amount is predicted with respect to each of the crops, from an image in which various crops cultivated in a wide region are photographed (for example, refer to PTL 1).

In addition, an imaging element detecting light in a predetermined narrow wavelength band (a narrow band) (hereinafter, also referred to as narrow band light) by using a plasmon filter is proposed (for example, refer to PTL 2).

CITATION LIST

Patent Literature

PTL 1: JP 2003-6612A
PTL 2: JP 2010-165718A

SUMMARY OF INVENTION

Technical Problem

However, as described above, in object recognition processing of recognizing an object from an image, such as recognition of the type of crop photographed in the image, in general, it is necessary to perform machine learning in advance by using a large quantity of training data. In the related art, for example, the training data is generated by visually determining and labeling the object, and thus, enormous man-hour is necessary for preparing a large quantity of training data.

The present disclosure has been made in consideration of the circumstances described above, and is capable of automating the labeling of an object.

Solution to Problem

According to the present disclosure, there is provided an imaging system, comprising a multispectral camera configured to capture a multispectral image of an object, an RGB camera configured to capture a color image of the object, at least one storage device configured to store spectrum information for each of a plurality of labeled objects, and processing circuitry. The processing circuitry is configured to determine, based on the captured multispectral image, spectrum information associated with the object, associate, based at least in part, on the spectrum information associated with the object and the stored spectrum information for each of the plurality of objects, a label with the color image of the object, and store, on the at least one storage device, the color image and the associated label as training data.

Further according to the present disclosure, there is provided an object classification system, comprising at least one storage device configured to store a trained object classifier and processing circuitry. The processing circuitry is configured to classify an object in a received color image using the trained object classifier, determine based, at least in part, on the classification of the object in the received color image and spectrum information associated with the object, an evaluation index value for a characteristic of the object, and output on a display, an indication of the evaluation index value.

Further according to the present disclosure, there is provided a method of generating training data for training an object classifier. The method comprises receiving a multispectral image of an object captured by a multispectral camera and a color image of the object captured by an RGB camera, and determining, based on the multispectral image of an object, spectrum information associated with the object. The method further comprises associating, based at least in part, on the spectrum information associated with the object and stored spectrum information for each of a plurality of objects, a label with the color image of the object, and storing, on at least one storage device, the color image and the associated label as training data.

Further according to the present disclosure, there is provided a method of classifying an object. The method comprises classifying an object in a received color image using a trained object classifier, determining based, at least in part, on the classification of the object in the received color image and spectrum information associated with the object, an evaluation index value for a characteristic of the object, and outputting on a display, an indication of the evaluation index value.

Advantageous Effects of Invention

According to one aspect of the present disclosure, it is possible to automate the labeling of an object.

BRIEF DESCRIPTION OF DRAWINGS

FIG. 32 is a diagram illustrating an example of a detection band in a case where the tastiness or the freshness of food is detected.

FIG. 33 is a diagram illustrating an example of a detection band in a case where a sugar content or the moisture of fruit is detected.

FIG. 34 is a diagram illustrating an example of a detection band in a case where plastic is sorted.

DESCRIPTION OF EMBODIMENTS

Hereinafter, aspects for carrying out the disclosure (hereinafter, referred to as an "embodiment") will be described in detail by using the drawings. Furthermore, the embodiments will be described in the following sequence.
1. Embodiment of Imaging Device
2. Usage Example of Multispectral Image
3. Modification Example
4. Application Example 1. Embodiment of Imaging Device First, an embodiment of an imaging device of the present technology will be described with reference to FIGS. 1 to 22.
<Configuration Example of Imaging Device>

Figure 1:
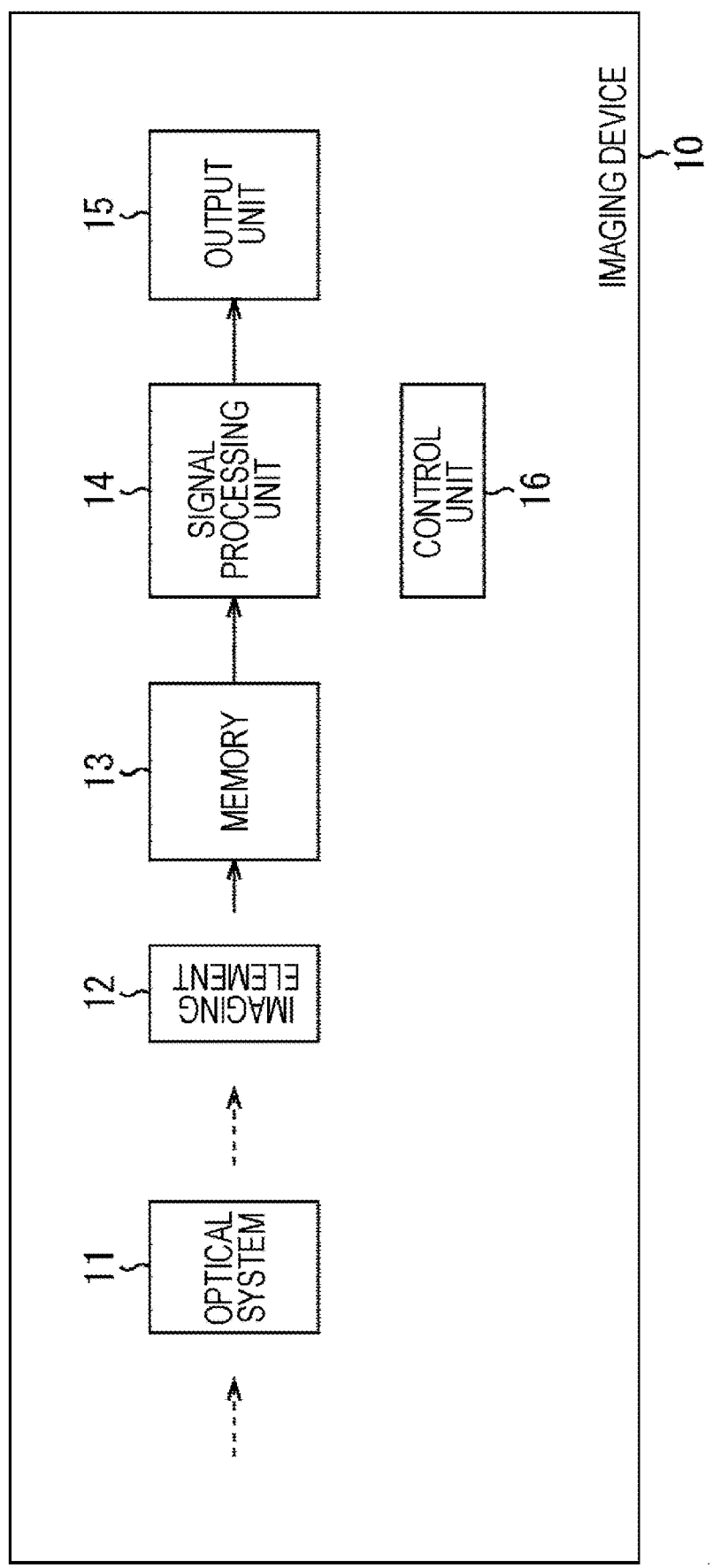
FIG. 1 is a block diagram illustrating an embodiment of an imaging device to which the present technology is applied.

FIG. 1 is a block diagram illustrating an embodiment of an imaging device, which is one type of electronic devices to which the present technology is applied.

An imaging device 10 of FIG. 1, for example, is formed of a digital camera which is capable of imaging both of a still image and a moving image. In addition, the imaging device 10, for example, is formed of a multispectral camera which is capable of detecting light (multi-spectrum) of four or more wavelength bands (four or more bands) greater than three wavelength bands (three bands) of the related art of R (red), G (green), and B (blue) or Y (yellow), M (magenta), and C (cyan), based on three primary colors or a color-matching function.

The imaging device 10 includes an optical system 11, an imaging element 12, a memory 13, a signal processing unit 14, an output unit 15, and a control unit 16.

The optical system 11, for example, includes a zoom lens, a focus lens, a diaphragm, and the like, which are not illustrated, and allows light from the outside to be incident on the imaging element 12. In addition, as necessary, various filters such as a polarization filter are disposed on the optical system 11.

The imaging element 12, for example, is formed of a complementary metal oxide semiconductor (CMOS) image sensor. The imaging element 12 receives incident light from the optical system 11, and performs photoelectric conversion, and thus, outputs image data corresponding to the incident light.

The memory 13 temporarily stores the image data which is output from the imaging element 12.

The signal processing unit 14 performs signal processing (for example, processing such as elimination of a noise and adjustment of a white balance) using the image data stored in the memory 13, and thus, supplies the image data to the output unit 15.

The output unit 15 outputs the image data from the signal processing unit 14. For example, the output unit 15 includes a display (not illustrated) configured of a liquid crystal or the like, and displays a spectrum (an image) corresponding to the image data from the signal processing unit 14 as a so-called through image. For example, the output unit 15 includes a driver (not illustrated) driving a recording medium such as a semiconductor memory, a magnetic disk, and an optical disk, and records the image data from the signal processing unit 14 in a recording medium. For example, the output unit 15 functions as a communication interface for performing communication with respect to an external device (not illustrated), and transmits the image data from the signal processing unit 14 to the external device in a wireless manner or a wired manner.

The control unit 16 controls each of the units of the imaging device 10 according to an operation or the like of a user.

<Configuration Example of Circuit of Imaging Element>

Figure 2:
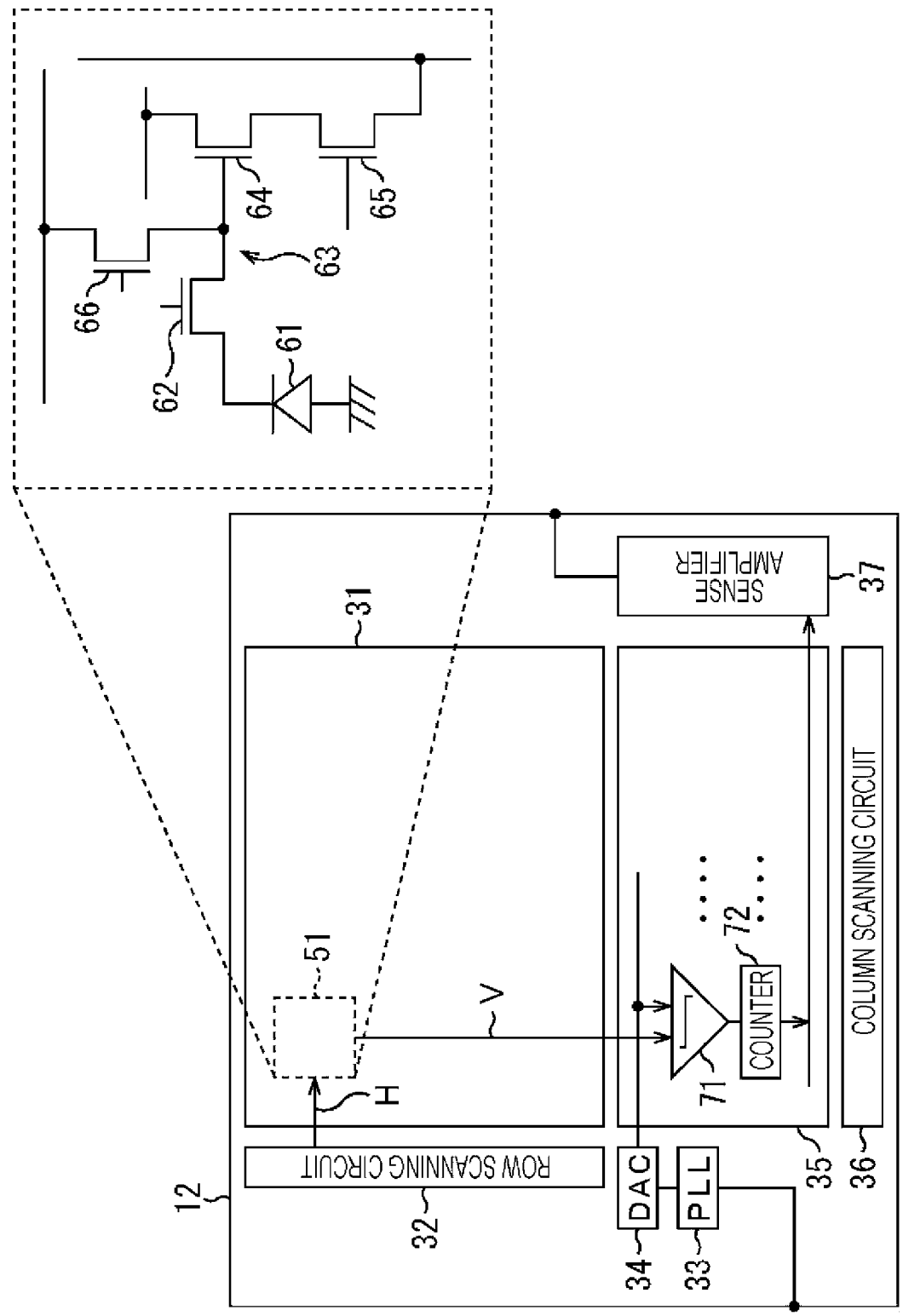
FIG. 2 is a block diagram illustrating a configuration example of a circuit of an imaging element.

FIG. 2 is a block diagram illustrating a configuration example of a circuit of the imaging element 12 of FIG. 1.

The imaging element 12 includes a pixel array 31, a row scanning circuit 32, a phase locked loop (PLL) 33, a digital analog converter (DAC) 34, a column analog digital converter (ADC) circuit 35, a column scanning circuit 36, and a sense amplifier 37.

A plurality of pixels 51 are two-dimensionally arranged in the pixel array 31.

The pixel 51 includes a horizontal signal line H which is connected to the row scanning circuit 32, a photodiode 61 which is disposed in each point where the photodiode 61 intersects with a perpendicular signal line V connected to the column ADC circuit 35, and performs photoelectric conversion, and several types of transistors for reading out an accumulated signal. That is, the pixel 51, as enlargedly illustrated on the right side of FIG. 2, includes the photodiode 61, a transfer transistor 62, a floating diffusion 63, an amplification transistor 64, a selection transistor 65, and a reset transistor 66.

An electric charge accumulated in the photodiode 61 is transferred to the floating diffusion 63 through the transfer transistor 62. The floating diffusion 63 is connected to a gate of the amplification transistor 64. In a case where the pixel 51 is a target from which a signal is read out, the selection transistor 65 is turned on from the row scanning circuit 32 through the horizontal signal line H, and the amplification transistor 64 is subjected to source follower driving according to the signal of the selected pixel 51, and thus, the signal is read out to the perpendicular signal line V as a pixel signal corresponding to an accumulation electric charge amount of the electric charge accumulated in the photodiode 61. In addition, the pixel signal is reset by turning on the reset transistor 66.

The row scanning circuit 32 sequentially outputs a driving (for example, transferring, selecting, resetting, or the like) signal for driving the pixel 51 of the pixel array 31 for each row.

The PLL 33 generates and outputs a clock signal of a predetermined frequency which is necessary for driving each of the units of the imaging element 12, on the basis of the clock signal supplied from the outside.

The DAC 34 generates and outputs a lamp signal in the shape of being returned to a predetermined voltage value after a voltage drops from a predetermined voltage value at a certain slope (in the shape of approximately a saw).

The column ADC circuit 35 includes a comparator 71 and a counter 72 as many as the number corresponding to the number of columns of the pixel 51 of the pixel array 31, extracts a signal level from the pixel signal output from the pixel 51 by a correlated double sampling (CDS) operation, and outputs pixel data. That is, the comparator 71 compares the lamp signal supplied from the DAC 34 with the pixel signal (a brightness value) output from the pixel 51, and supplies a comparison result signal obtained as the result thereof to the counter 72. Then, the counter 72 counts a counter clock signal of a predetermined frequency according to the comparison result signal output from the comparator 71, and thus, the pixel signal is subjected to A/D conversion.

The column scanning circuit 36 sequentially supplies a signal of outputting the pixel data to the counter 72 of the column ADC circuit 35 at a predetermined timing.

The sense amplifier 37 amplifies the pixel data which is supplied from the column ADC circuit 35, and outputs the pixel data to the outside of the imaging element 12.

<First Embodiment of Imaging Element>

Figure 3:
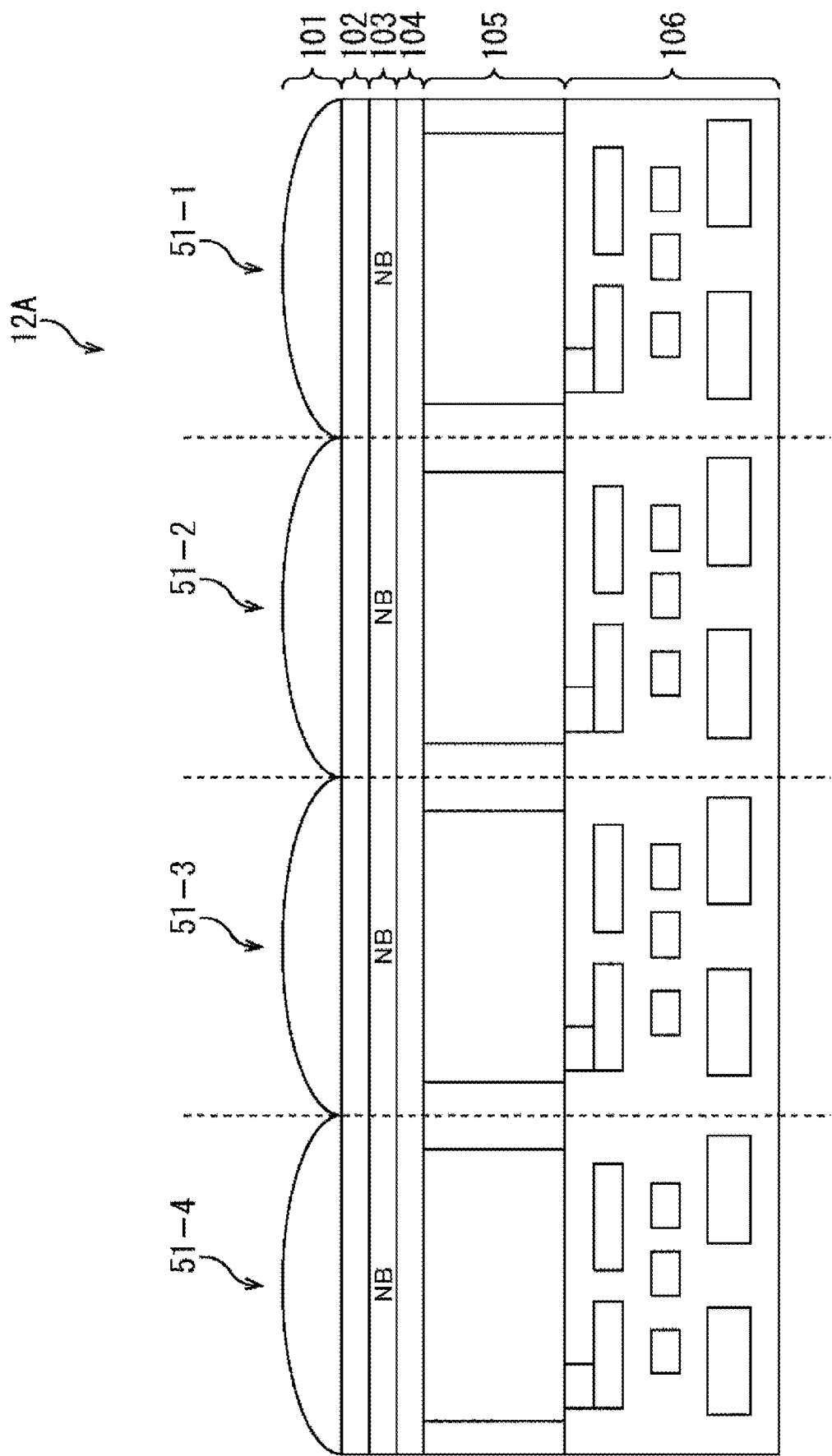
FIG. 3 is a sectional view schematically illustrating configuration example of a first embodiment of the imaging element.

FIG. 3 schematically illustrates a configuration example of a sectional surface of an imaging element 12A, which is a first embodiment of the imaging element 12 of FIG. 1. FIG. 3 illustrates sectional surfaces of four pixels of a pixel 51-1 to a pixel 51-4 of the imaging element 12. Furthermore, hereinafter, in a case where it is not necessary to distinguish the pixel 51-1 to the pixel 51-4 from each other, the pixel will be simply referred to as the pixel 51.

An on-chip microlens 101, an interlayer film 102, a narrow band filter layer 103, an interlayer film 104, a photoelectric conversion element layer 105, and a signal wiring layer 106 are laminated in each of the pixels 51, in this order from the above. That is, the imaging element 12 is formed of a back-side illumination type CMOS image sensor in which the photoelectric conversion element layer 105 is disposed on an incident side of light from the signal wiring layer 106.

The on-chip microlens 101 is an optical element for condensing light into the photoelectric conversion element layer 105 of each of the pixels 51.

The interlayer film 102 and the interlayer film 104 are formed of a dielectric body such as SiO2. As described below, it is desirable that dielectric constants of the interlayer film 102 and the interlayer film 104 are as low as possible.

In the narrow band filter layer 103, a narrow band filter NB, which is an optical filter transmitting narrow band light in a predetermined narrow wavelength band (a narrow band), is disposed in each of the pixels 51. For example, a plasmon filter using front plasmon, which is one type of metal thin film filters using a thin film formed of a metal such as aluminum, is used in the narrow band filter NB. In addition, a transmission band of the narrow band filter NB is set for each of the pixels 51. The type (the number of bands) of the transmission band of the narrow band filter NB is arbitrary, and for example, the number of bands is set to be greater than or equal to 4.

Here, the narrow band, for example, is a wavelength band which is narrower than a transmission band of a color filter of the related art of red (R), green (G), and blue (B) or yellow (Y), magenta (M), and cyan (C), based on three primary colors or a color-matching function. In addition, hereinafter, a pixel receiving the narrow band light transmitted through the narrow band filter NB will be referred to as a multispectral pixel or a MS pixel.

The photoelectric conversion element layer 105, for example, includes the photodiode 61 or the like of FIG. 2, receives the light transmitted through the narrow band filter layer 103 (the narrow band filter NB) (the narrow band light), and converts the received light into an electric charge. In addition, the photoelectric conversion element layer 105 is configured such that the pixels 51 are electrically separated from each other by an element separating layer.

Wiring or the like for reading the electric charge which is accumulated in the photoelectric conversion element layer 105 is disposed on the signal wiring layer 106.

<Plasmon Filter>

Next, the plasmon filter which can be used in the narrow band filter NB will be described with reference to FIGS. 4 to 15.

Figure 4:
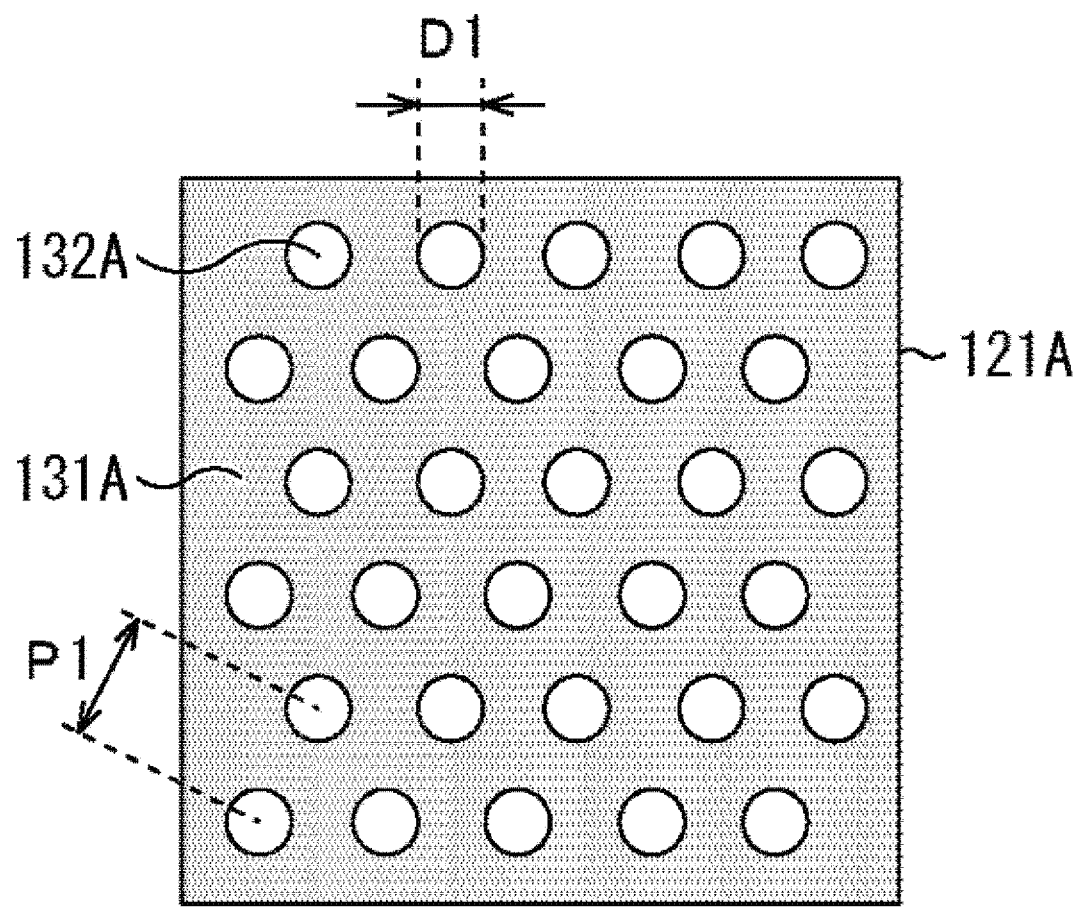
FIG. 4 is a diagram illustrating a configuration example of a plasmon filter having a pore array structure.

FIG. 4 illustrates a configuration example of a plasmon filter 121A having a pore array structure.

The plasmon filter 121A is configured of a plasmon resonator in which holes 132A are arranged in a metal thin film (hereinafter, referred to as a conductor thin film) 131A in the shape of a honeycomb.

Each of the holes 132A penetrates through the conductor thin film 131A, and functions as a waveguide. In general, the waveguide has a cutoff frequency and a cutoff wavelength which are determined according to a shape such as a length of a side or a diameter, and has properties of not allowing light of a frequency less than or equal to the cutoff frequency (a wavelength less than or equal to the cutoff wavelength) to propagate. A cutoff wavelength of the hole 132A mainly depends on an opening diameter D1, and the cutoff wavelength shortens as the opening diameter D1 decreases. Furthermore, the opening diameter D1 is set to a value which is smaller than the wavelength of the transmitted light.

On the other hand, in a case where light is incident on the conductor thin film 131A in which holes 132A are periodically formed during a short period less than or equal to the wavelength of the light, a phenomenon occurs in which light at a wavelength which is longer than the cutoff wavelength of the hole 132A is transmitted. Such a phenomenon will be referred to as an abnormal transmission phenomenon of the plasmon. Such a phenomenon occurs due to the excitation of front plasmon on a boundary between the conductor thin film 131A and the interlayer film 102, which is an upper layer of the conductor thin film 131A.

Here, occurrence conditions of the abnormal transmission phenomenon of the plasmon (a front plasmon resonance) will be described with reference to FIG. 5.

Figure 5:
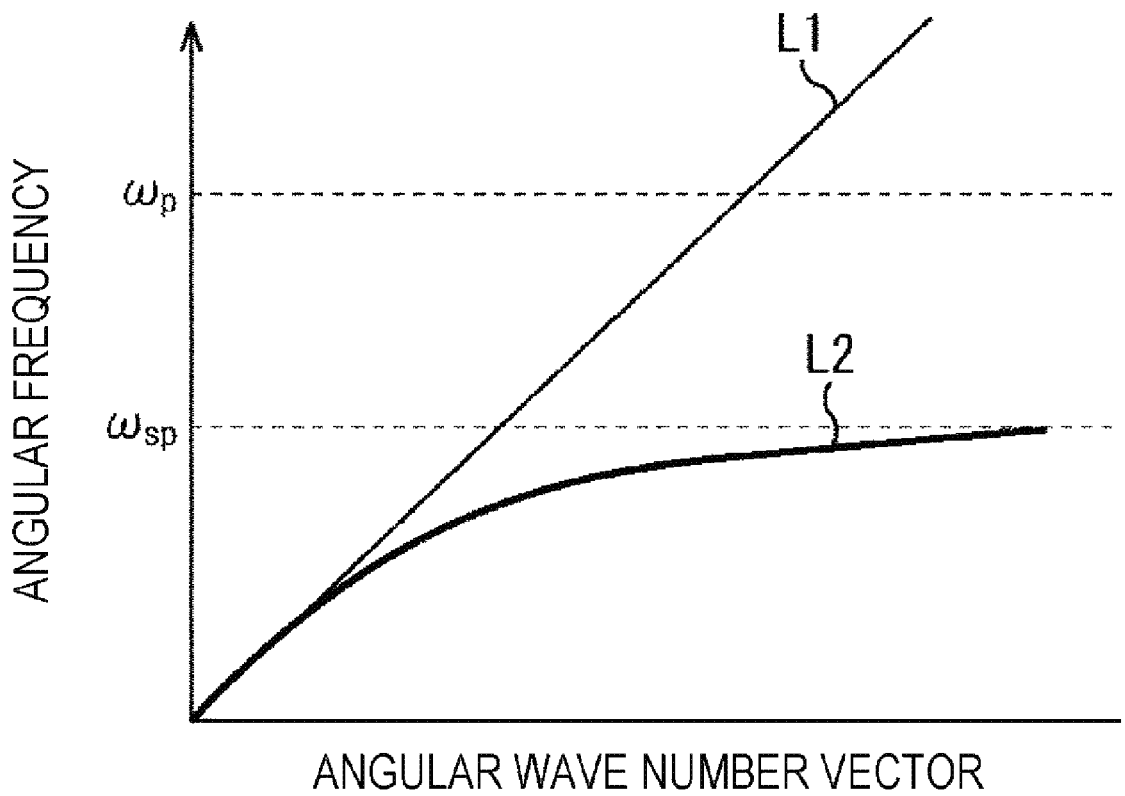
FIG. 5 is a graph illustrating a dispersion relationship of a front plasmon.

FIG. 5 is a graph illustrating a dispersion relationship of the front plasmon. In the graph, a horizontal axis represents an angular wave number vector k, and a vertical axis represents an angular frequency ω. ωp represents a plasma frequency of the conductor thin film 131A. ωsp represents a front plasma frequency on a boundary surface between the interlayer film 102 and the conductor thin film 131A, and is represented by formula (1) described below.

[Math. 1]

$$\omega_{sp} = \frac{\omega_p}{\sqrt{1+\varepsilon_d}} \quad (1)$$

εd represents a dielectric constant of a dielectric body configuring the interlayer film 102.

According to formula (1), the front plasma frequency ωsp increases as the plasma frequency ωp increases. In addition, the front plasma frequency ωsp increases as the dielectric constant εd decreases.

A line L1 represents a dispersion relationship of the light (a write line), and is represented by formula (2) described below.

[Math. 2]

$$\omega = \frac{c}{\sqrt{\varepsilon_d}}k \quad (2)$$

c represents a light speed.

A line L2 represents a dispersion relationship of the front plasmon, and is represented by formula (3) described below.

[Math. 3]

$$\omega = ck\sqrt{\frac{\varepsilon_m + \varepsilon_d}{\varepsilon_m \varepsilon_d}} \quad (3)$$

εm represents a dielectric constant of the conductor thin film 131A.

The dispersion relationship of the front plasmon represented by the line L2 is close to the write line represented by the line L1 in a range where the angular wave number vector k is small, and is close to the front plasma frequency ωsp as the angular wave number vector k increases.

Then, when formula (4) described below is established, the abnormal transmission phenomenon of the plasmon occurs.

[Math. 4]

$$\mathrm{Re}\left[\frac{\omega_{SO}}{C}\sqrt{\frac{\varepsilon_m \varepsilon_d}{\varepsilon_\eta + \varepsilon_d}}\right] = \left|\frac{2\pi}{\lambda}\sin\theta + iG_x + jG_y\right| \quad (4)$$

λ represents the wavelength of the incident light. θ represents an incident angle of the incident light. Gx and Gy are represented by formula (5) described below.

$$|Gx|=|Gy|=2\pi/a0 \quad (5)$$

a0 represents a lattice constant of a pore array structure formed of the hole 132A of the conductor thin film 131A.

In formula (4), the left member represents an angular wave number vector of the front plasmon, and the right member represents an angular wave number vector of the conductor thin film 131A during a pore array period. Accordingly, when the angular wave number vector of the front plasmon is identical to the angular wave number vector of the conductor thin film 131A during the pore array period, the abnormal transmission phenomenon of the plasmon occurs. Then, at this time, the value of λ is a resonance wavelength of the plasmon (the transmission wavelength of the plasmon filter 121A).

Furthermore, in formula (4), the angular wave number vector of the front plasmon in the left member is determined according to the dielectric constant εm of the conductor thin film 131A and the dielectric constant εd of the interlayer film 102. On the other hand, the angular wave number vector during the pore array period in the right member is determined according to the incident angle θ of the light and a pitch (a hole pitch) P1 between the adjacent holes 132A of the conductor thin film 131A. Accordingly, the resonance wavelength and the resonance frequency of the plasmon are determined according to the dielectric constant εm of the conductor thin film 131A, the dielectric constant εd of the interlayer film 102, the incident angle θ of the light, and the hole pitch P1. Furthermore, in a case where the incident angle of the light is 0°, the resonance wavelength and the resonance frequency of the plasmon are determined according to the dielectric constant εm of the conductor thin film 131A, the dielectric constant εd of the interlayer film 102, and the hole pitch P1.

Accordingly, the transmission band of the plasmon filter 121A (the resonance wavelength of the plasmon) is changed according to a material and a film thickness of the conductor thin film 131A, a material and a film thickness of the interlayer film 102, a pattern period of the pore array (for example, the opening diameter D1 and the hole pitch P1 of the hole 132A), and the like. In particular, in a case where the material and the film thickness of the conductor thin film 131A and the interlayer film 102 are determined, the transmission band of the plasmon filter 121A is changed according to the pattern period of the pore array, in particular, the hole pitch P1. That is, the transmission band of the plasmon filter 121A is shifted to a short wavelength side as the hole pitch P1 narrows, and the transmission band of the plasmon filter 121A is shifted to a long wavelength side as the hole pitch P1 widens.

Figure 6:
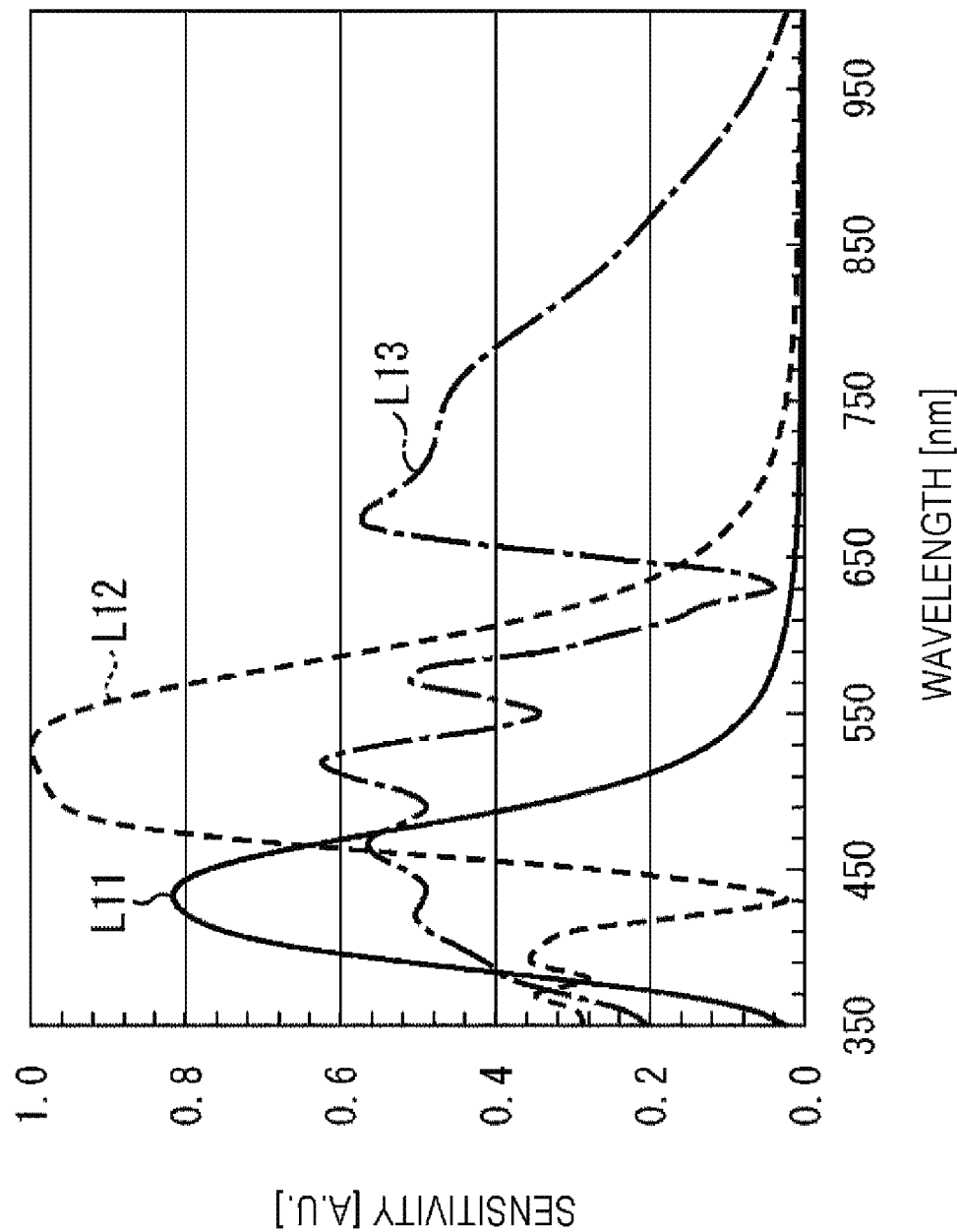
FIG. 6 is a graph illustrating a first example of spectrum information of the plasmon filter having the pore array structure.

FIG. 6 is a graph illustrating an example of spectral characteristics of the plasmon filter 121A in a case where the hole pitch P1 is changed. In the graph, a horizontal axis represents a wavelength (the unit is nm), and a vertical axis represents sensitivity (the unit is an arbitrary unit). A line L11 represents spectral characteristics in a case where the hole pitch P1 is set to 250 nm, a line L12 represents spectral characteristics in a case where the hole pitch P1 is set to 325 nm, and a line L13 represents spectral characteristics in a case where the hole pitch P1 is set to 500 nm.

In a case where the hole pitch P1 is set to 250 nm, the plasmon filter 121A mainly transmits light in a wavelength band of a blue color. In a case where the hole pitch P1 is set to 325 nm, the plasmon filter 121A mainly transmits light in a wavelength band of a green color. In a case where the hole pitch P1 is set to 500 nm, the plasmon filter 121A mainly transmits light in a wavelength band of a red color. However, in a case where the hole pitch P1 is set to 500 nm, the plasmon filter 121A transmits a great amount of light in a low wavelength band of a red color according to a waveguide mode described below.

Figure 7:
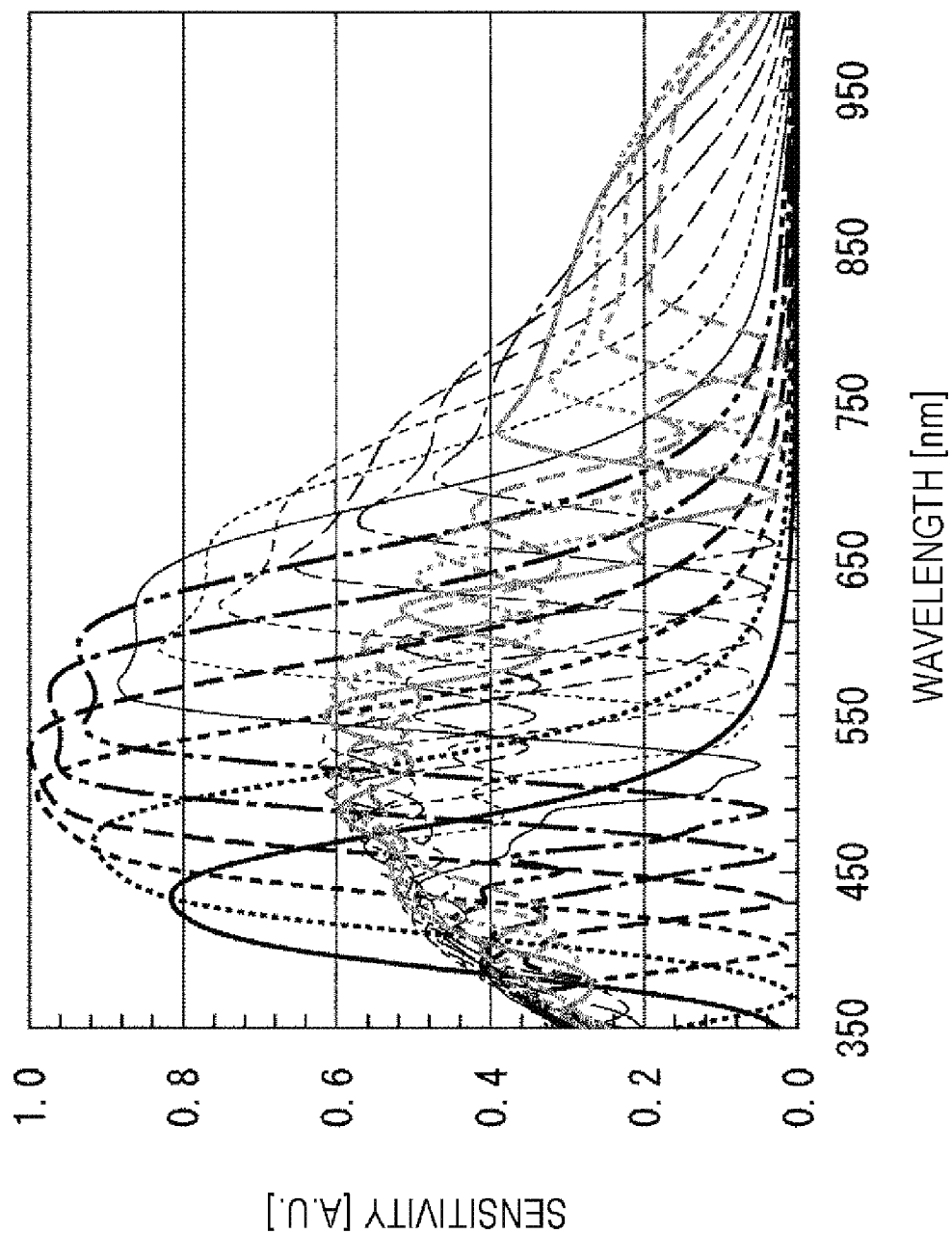
FIG. 7 is a graph illustrating a second example of the spectrum information of the plasmon filter having the pore array structure.

FIG. 7 is a graph illustrating another example of the spectral characteristics of the plasmon filter 121A in a case where the hole pitch P1 is changed. In the graph, a horizontal axis represents a wavelength (the unit is nm), and a vertical axis represents sensitivity (the unit is an arbitrary unit). This example illustrates an example of spectral characteristics of sixteen types of plasmon filters 121A in a case where the hole pitch P1 is changed by being divided by 25 nm from 250 nm to 625 nm.

Furthermore, the transmittance of the plasmon filter 121A is mainly determined according to the opening diameter D1 of the hole 132A. The transmittance increases as the opening diameter D1 increases, but color mixture easily occurs. In general, it is desirable that the opening diameter D1 is set such that an opening rate is 50% to 60% of the hole pitch P1.

In addition, as described above, each of the holes 132A of the plasmon filter 121A functions as a waveguide. Accordingly, in the spectral characteristics, there is a case where not only a wavelength component transmitted by the front plasmon resonance (a wavelength component in a plasmon mode) but also a wavelength component transmitted through the hole 132A (the waveguide) (a wavelength component in a waveguide mode) increases, according to a pattern of the pore array of the plasmon filter 121A.

For a given hole pitch P1 of the plasmon filter there is a range of desirable thicknesses of the plasmon filter to maximize light transmittance of the filter for those wavelengths that are transmitted. For instance, a range of desirable thicknesses of the plasmon filter may range between 20% and 80% of the size of the hole pitch P1, or between 30% and 70% of the size of the hole pitch, or between 40% and 60% of the size of the hole pitch.

For example, in a case where the plasmon filter is formed from Aluminum, a desirable range of thicknesses of the plasmon filter for a 350 nm hole pitch is between 100 nm and 300 nm, with a preferred thickness of 200 nm. For an Aluminum plasmon filter with a 550 nm hole pitch, a desirable range of thicknesses of the plasmon filter is between 200 nm and 400 nm, with a preferred thickness of 300 nm.

For a given peak transmission wavelength of the plasmon filter there is a range of desirable thicknesses of the plasmon filter to maximize light transmittance of the filter for those wavelengths that are transmitted. For instance, a range of desirable thicknesses of the plasmon filter may range between 10% and 60% of the peak transmission wavelength, or between 20% and 50% of the peak transmission wavelength, or between 30% and 40% of the peak transmission wavelength.

For example, in a case where the plasmon filter is formed from Aluminum, a desirable range of thicknesses of the plasmon filter when desirable a peak transmission wavelength of 580 nm is between 100 nm and 300 nm, with a preferred thickness of 200 nm. For an Aluminum plasmon filter with a peak transmission wavelength of 700 nm, a desirable range of thicknesses of the plasmon filter is between 150 nm and 350 nm, with a preferred thickness of 250 nm.

Figure 8:
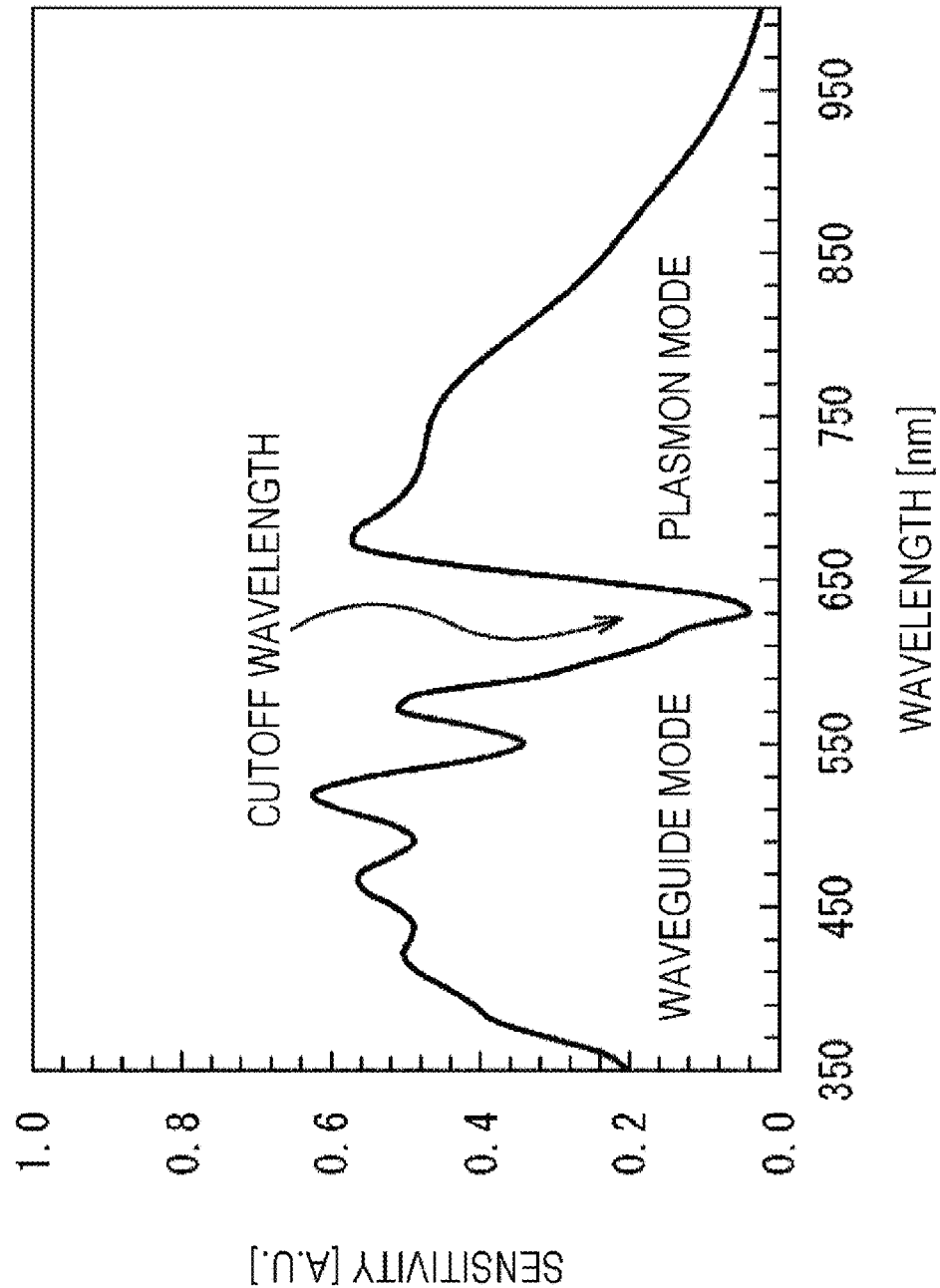
FIG. 8 is a graph illustrating a plasmon mode and a waveguide mode.

FIG. 8 illustrates the spectral characteristics of the plasmon filter 121A in a case where the hole pitch P1 is set to 500 nm, as with the spectral characteristics represented by the line L13 of FIG. 6. In this example, a wavelength side which is longer than the cutoff wavelength in the vicinity of 630 nm is the wavelength component in the plasmon mode, and a wavelength side which is shorter than the cutoff wavelength is the wavelength component in the waveguide mode.

As described above, the cutoff wavelength mainly depends on the opening diameter D1 of the hole 132A, and the cutoff wavelength decreases as the opening diameter D1 decreases. Then, wavelength resolution characteristics of the plasmon filter 121A are improved as a difference between the cutoff wavelength and the peak wavelength in the plasmon mode increases.

In addition, as described above, the front plasma frequency $\omega sp$ of the conductor thin film 131A increases as the plasma frequency $\omega p$ of the conductor thin film 131A increases. In addition, the front plasma frequency $\omega sp$ increases as the dielectric constant εd of the interlayer film 102 decreases. Then, it is possible to set the resonance frequency of the plasmon to be higher as the front plasma frequency $\omega sp$ increases, and to set the transmission band of the plasmon filter 121A (the resonance wavelength of the plasmon) to a shorter wavelength band.

Accordingly, in a case where a metal having a smaller plasma frequency $\omega p$ is used in the conductor thin film 131A, it is possible to set the transmission band of the plasmon filter 121A to a shorter wavelength band. For example, aluminum, silver, gold, or the like is preferable as the metal. Here, in a case where the transmission band is set to a long wavelength band of infrared light or the like, copper or the like can also be used.

In addition, in a case where a dielectric body having a small dielectric constant εd is used in the interlayer film 102, it is possible to set the transmission band of the plasmon filter 121A to a shorter wavelength band. For example, SiO2, Low-K, or the like is preferable as the dielectric body.

Figure 9:
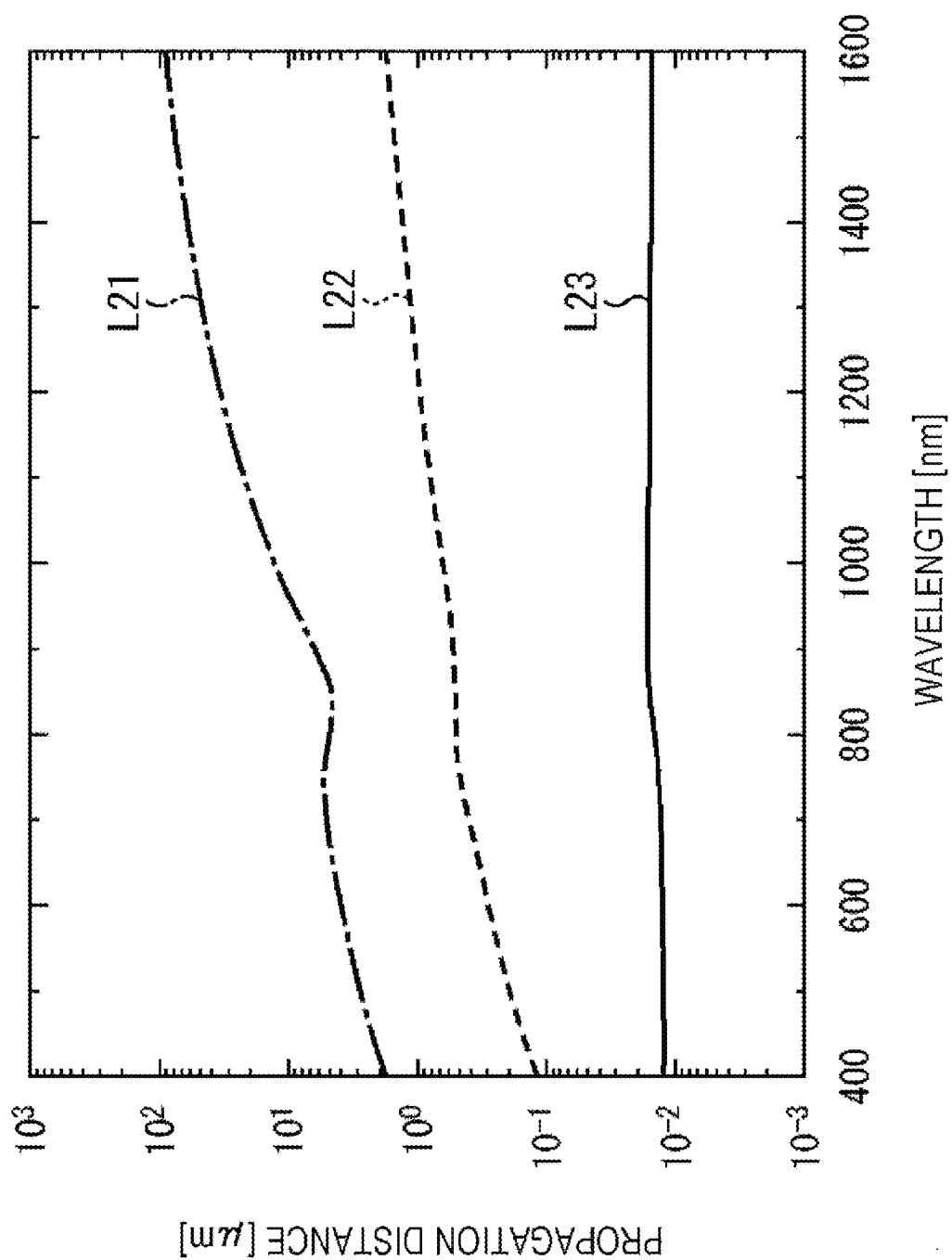
FIG. 9 is a graph illustrating an example of propagation characteristics of the front plasmon.
Figure 10:
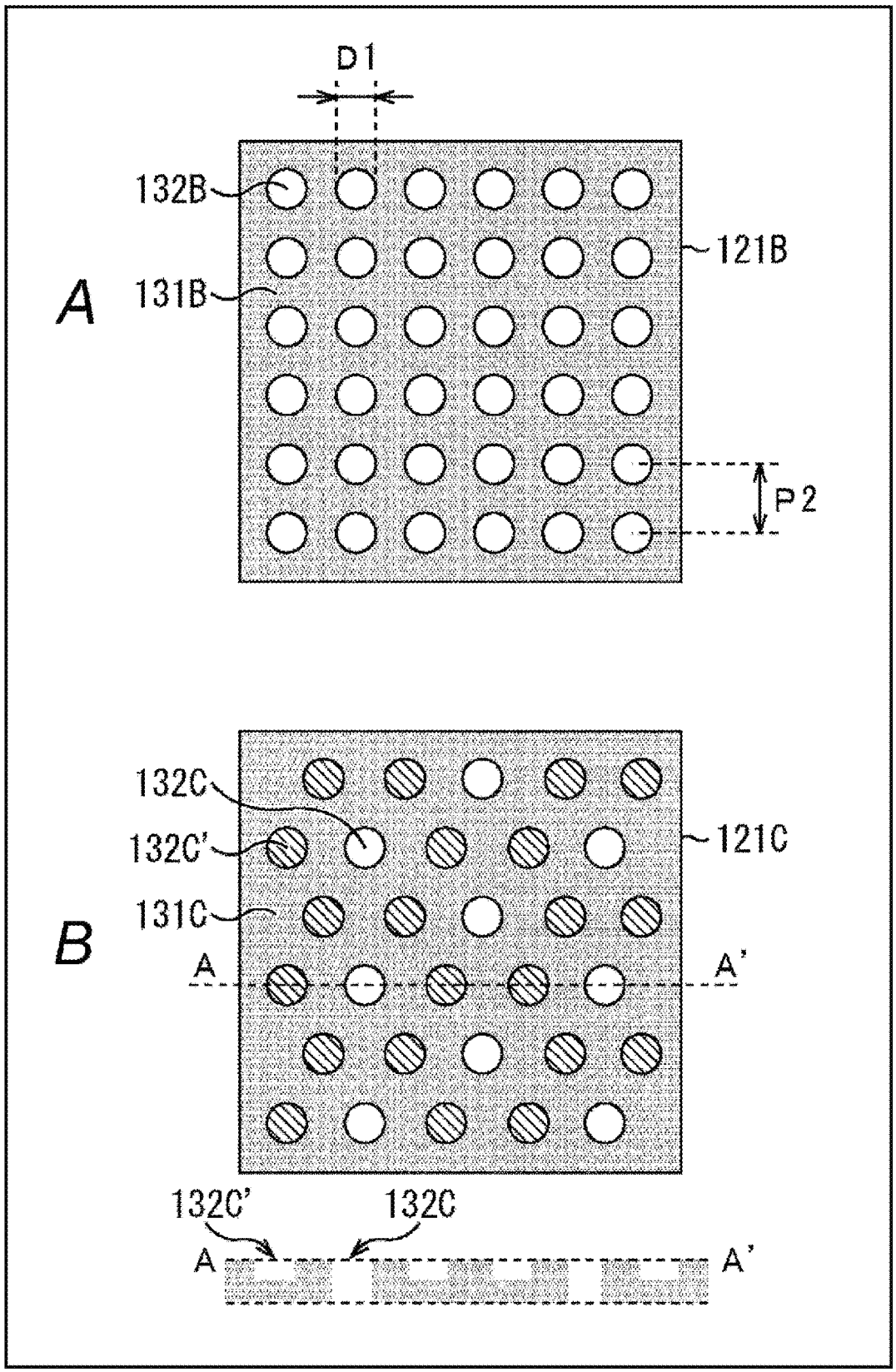
FIG. 10 is a diagram illustrating another configuration example of the plasmon filter having the pore array structure.

In addition, FIG. 9 is a graph illustrating propagation characteristics of the front plasmon on an interface between conductor thin film 131A and the interlayer film 102 in a case where aluminum is used in the conductor thin film 131A, and SiO2 is used in the interlayer film 102. In the graph, a horizontal axis represents the wavelength of the light (the unit is nm), and a vertical axis represents a propagation distance (the unit is μm). In addition, a line L21 represents propagation characteristics in an interface direction, a line L22 represents propagation characteristics in a depth direction of the interlayer film 102 (a direction perpendicular to the interface), and a line L23 represents propagation characteristics in a depth direction of the conductor thin film 131A (a direction perpendicular to the interface).

A propagation distance ΛSPP (λ) in a depth direction of the front plasmon is represented by formula (6) described below.

[Math. 5]

$$\Lambda_{SPP}(\lambda) \equiv \frac{4\pi k_{SPP}}{\lambda} = \frac{4\pi}{\lambda} \left[ \operatorname{Im} \left( \sqrt{\frac{\varepsilon_m + \varepsilon_d}{\varepsilon_m \varepsilon_d}} \right) \right] \quad (6)$$

kSPP represents an absorption coefficient of a substance propagated by the front plasmon. εm (λ) represents a dielectric constant of the conductor thin film 131A with respect to light at a wavelength of λ. εd (λ) represents a dielectric constant of the interlayer film 102 with respect to light at the wavelength of λ.

Accordingly, as illustrated in FIG. 9, front plasmon with respect to light at a wavelength of 400 nm propagates in the depth direction from a front surface of the interlayer film 102 formed of SiO2 to approximately 100 nm. Accordingly, the thickness of the interlayer film 102 is set to be greater than or equal to 100 nm, and thus, the front plasmon on the interface between the interlayer film 102 and the conductor thin film 131A is prevented from being affected by a substance laminated on a surface of the interlayer film 102 on a side opposite to the conductor thin film 131A.

In addition, front plasmon with respect to light at a wavelength of 400 nm propagates in the depth direction from a front surface of the conductor thin film 131A formed of aluminum to approximately 10 nm. Accordingly, the thickness of the conductor thin film 131A is set to be greater than or equal to 10 nm, and thus, the front plasmon on the interface between the interlayer film 102 and the conductor thin film 131A is prevented from being affected by the interlayer film 104.

<Other Examples of Plasmon Filter>

Next, other examples of the plasmon filter will be described with reference to FIGS. 10A to 15.

A plasmon filter 121B of FIG. 10A is configured of a plasmon resonator in which holes 132B are arranged in a conductor thin film 131B in the shape of an orthogonal matrix. In the plasmon filter 121B, for example, a transmission band is changed according to a pitch P2 between adjacent holes 132B.

In addition, in the plasmon resonator, it is not necessary that all of the holes penetrate through the conductor thin film, and even in a case where a part of the holes is configured as a non-through which does not penetrate through the conductor thin film, the plasmon resonator functions as a filter.

For example, in FIG. 10B, a plan view and a sectional view (a sectional view taken along A-A' of the plan view) of a plasmon filter 121C configured of a plasmon resonator in which holes 132C formed of through holes and holes 132C' formed of non-through holes are arranged in the conductor thin film 131C in the shape of a honeycomb. That is, holes 132C formed of through holes and holes 132C' formed of non-through holes are periodically arranged in the plasmon filter 121C.

Further, a plasmon resonator of a single layer is basically used as the plasmon filter, and for example, the plasmon filter can be configured of a two-layer plasmon resonator.

Figure 11:
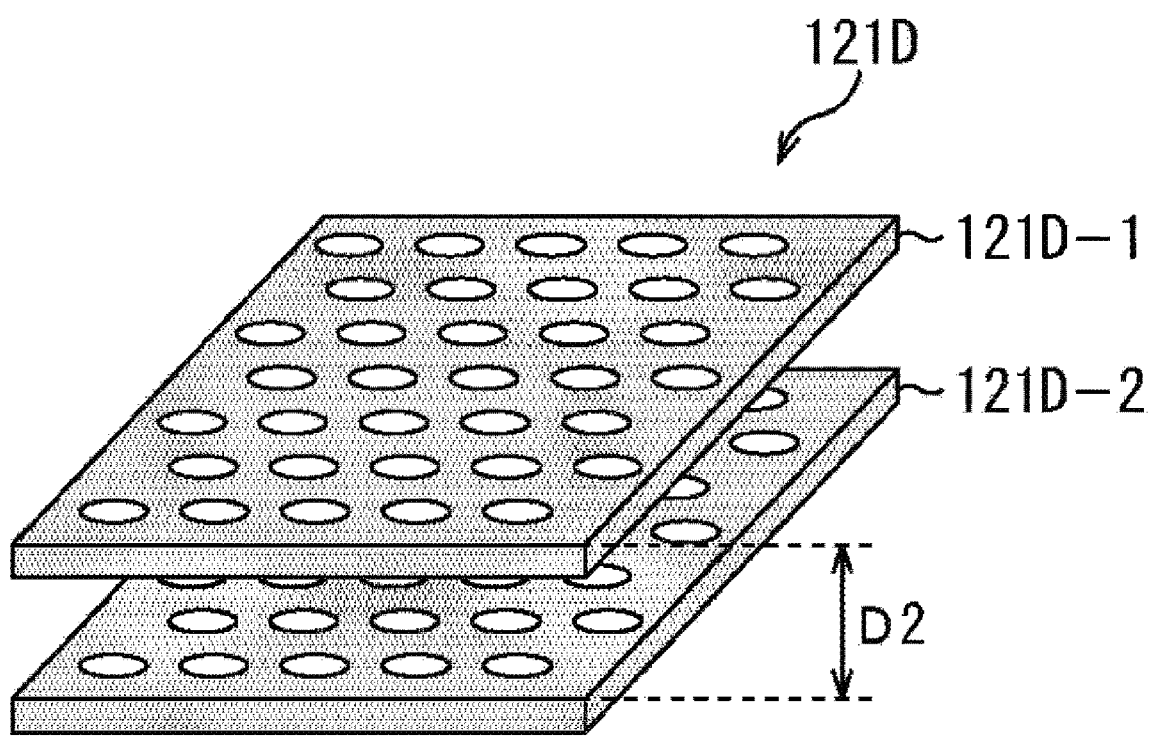
FIG. 11 is a diagram illustrating a configuration example of a plasmon filter having a two-layer structure.
Figure 12:
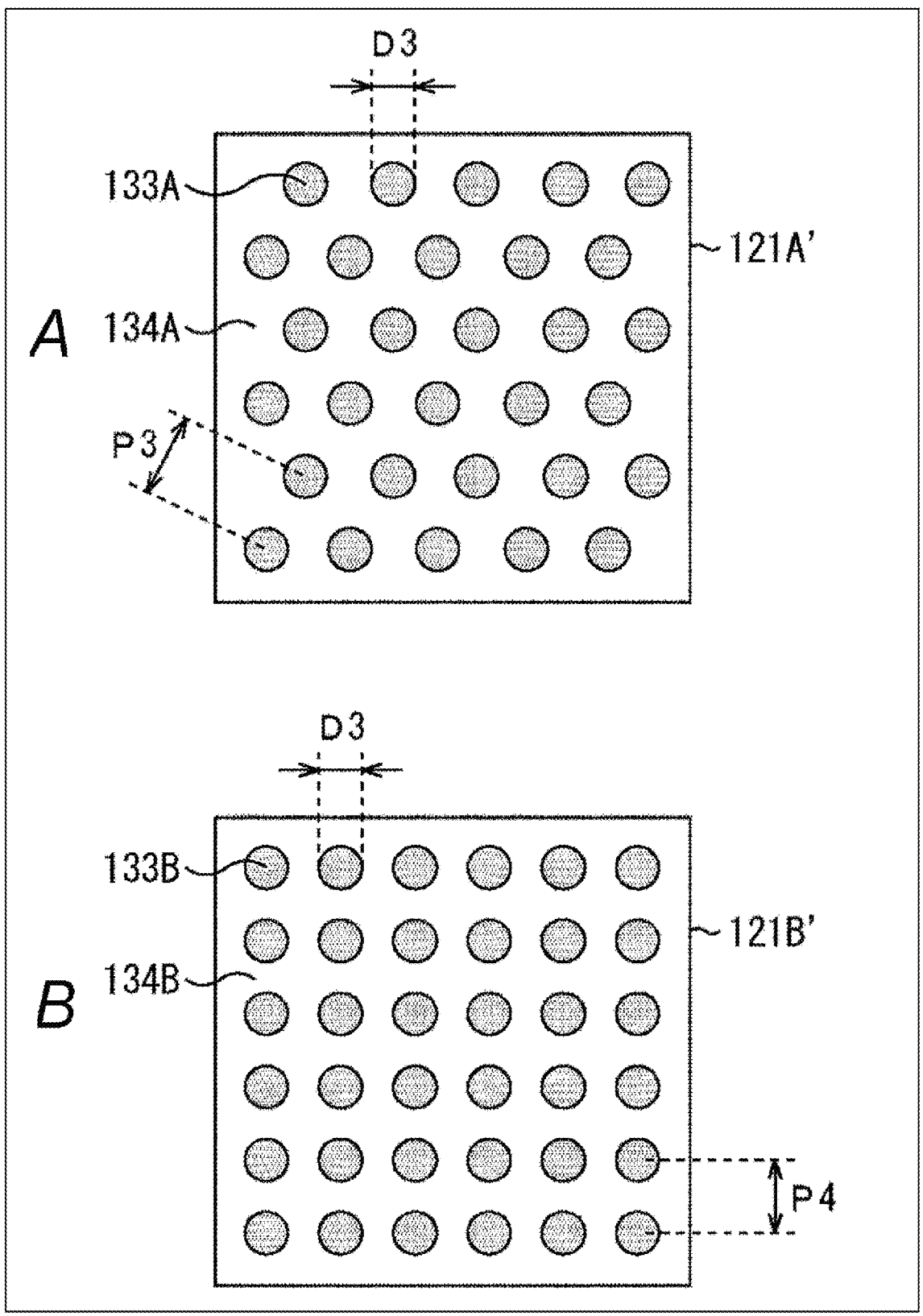
FIG. 12 is a diagram illustrating a configuration example of a plasmon filter having a dot array structure.

For example, a plasmon filter 121D illustrated in FIG. 11 is configured of two layers of a plasmon filter 121D-1 and a plasmon filter 121D-2. The plasmon filter 121D-1 and the plasmon filter 121D-2 have a structure in which holes are arranged in the shape of a honeycomb, as with the plasmon resonator configuring the plasmon filter 121A of FIG. 4.

In addition, it is preferable that an interval D2 between the plasmon filter 121D-1 and the plasmon filter 121D-2 is approximately ¼ of a peak wavelength of a transmission band. In addition, in consideration of the freedom in design, it is preferable that the interval D2 is less than or equal to ½ of the peak wavelength of the transmission band.

Furthermore, as with the plasmon filter 121D, the holes are arranged in the same pattern in the plasmon filter 121D-1 and the plasmon filter 121D-2, and for example, the holes may be arranged in patterns similar to each other in a two-layer plasmon resonator structure. In addition, in the two-layer plasmon resonator structure, holes and dots may be arranged in a pattern in which a pore array structure and a dot array structure (described below) are inversed from each other. Further, the plasmon filter 121D has the two-layer structure, and is capable of being multilayered to be three or more layers.

In addition, in the above description, the configuration example of the plasmon filter using the plasmon resonator having the pore array structure has been described, but a plasmon resonator having a dot array structure may be adopted as the plasmon filter.

A plasmon filter having a dot array structure will be described with reference to FIGS. 12A and 12B.

A plasmon filter 121A' of FIG. 12A has a structure which is negatively and positively inversed with respect to the plasmon resonator of the plasmon filter 121A of FIG. 4, that is, is configured of a plasmon resonator in which dots 133A are arranged in a dielectric layer 134A in the shape of a honeycomb. A space between the respective dots 133A is filled with the dielectric layer 134A.

The plasmon filter 121A' absorbs light in a predetermined wavelength band, and thus, is used as a complementary color filter. The wavelength band of the light which is absorbed by the plasmon filter 121A' (hereinafter, referred to as an absorption band) is changed according to a pitch (hereinafter, referred to as a dot pitch) P3 between the adjacent dots 133A. In addition, a diameter D3 of the dot 133A is adjusted according to the dot pitch P3.

A plasmon filter 121B' of FIG. 12B has a structure which is negatively and positively inversed with respect to the plasmon resonator of the plasmon filter 121B of FIG. 10A, that is, is configured of a plasmon resonator structure in which dots 133B are arranged in a dielectric layer 134B in the shape of an orthogonal matrix. A space between the respective dots 133B is filled with the dielectric layer 134B.

An absorption band of the plasmon filter 121B' is changed according to a dot pitch P4 or the like between the adjacent dots 133B. In addition, a diameter D3 of the dot 133B is adjusted according to the dot pitch P4.

Figure 13:
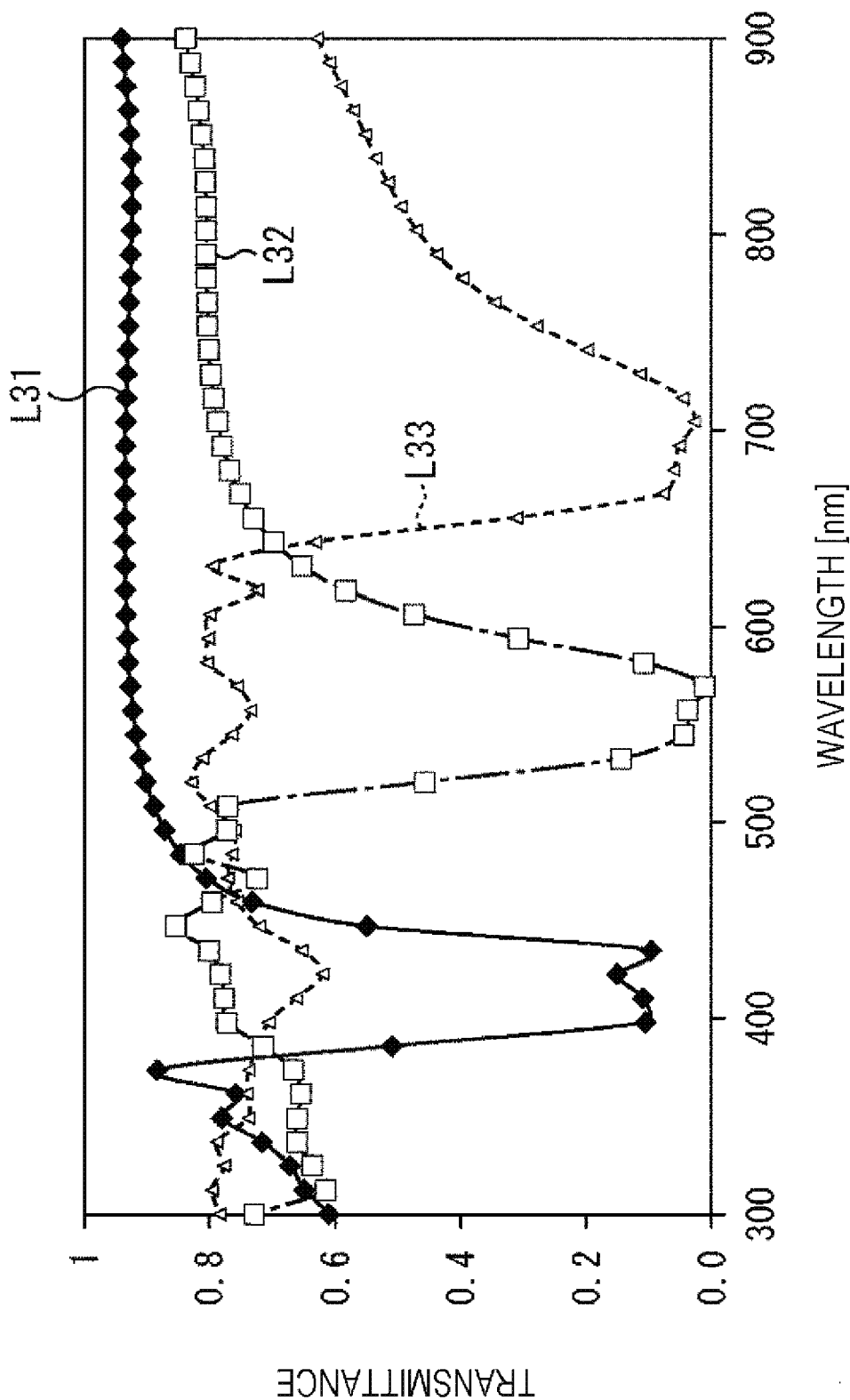
FIG. 13 is a graph illustrating an example of spectrum information of the plasmon filter having the dot array structure.

FIG. 13 is a graph illustrating an example of spectral characteristics in a case where the dot pitch P3 of the plasmon filter 121A' of FIG. 12A is changed. In the graph, a horizontal axis represents a wavelength (the unit is nm), and a vertical axis represents transmittance. A line L31 represents spectral characteristics in a case where the dot pitch P3 is set to 300 nm, a line L32 represents spectral characteristics in a case where the dot pitch P3 is set to 400 nm, and a line L33 represents spectral characteristics in a case where the dot pitch P3 is set to 500 nm.

As illustrated in the drawing, the absorption band of the plasmon filter 121A' is shifted to a short wavelength side as the dot pitch P3 narrows, and the absorption band of the plasmon filter 121A' is shifted to a long wavelength side as the dot pitch P3 widens.

Furthermore, in both of the plasmon filters having the pore array structure and the dot array structure, the transmission band or the absorption band can be adjusted by only adjusting the pitch between the holes or the dots in a planar direction. Accordingly, for example, the transmission band or the absorption band can be individually set with respect to each pixel by only adjusting the pitch between the holes or the dots in a lithography process, and the filter can be multicolored through a fewer process.

In addition, the thickness of the plasmon filter is approximately 100 nm to 500 nm, which is approximately similar to that of a color filter of an organic material, and a process affinity is excellent.

Figure 14:
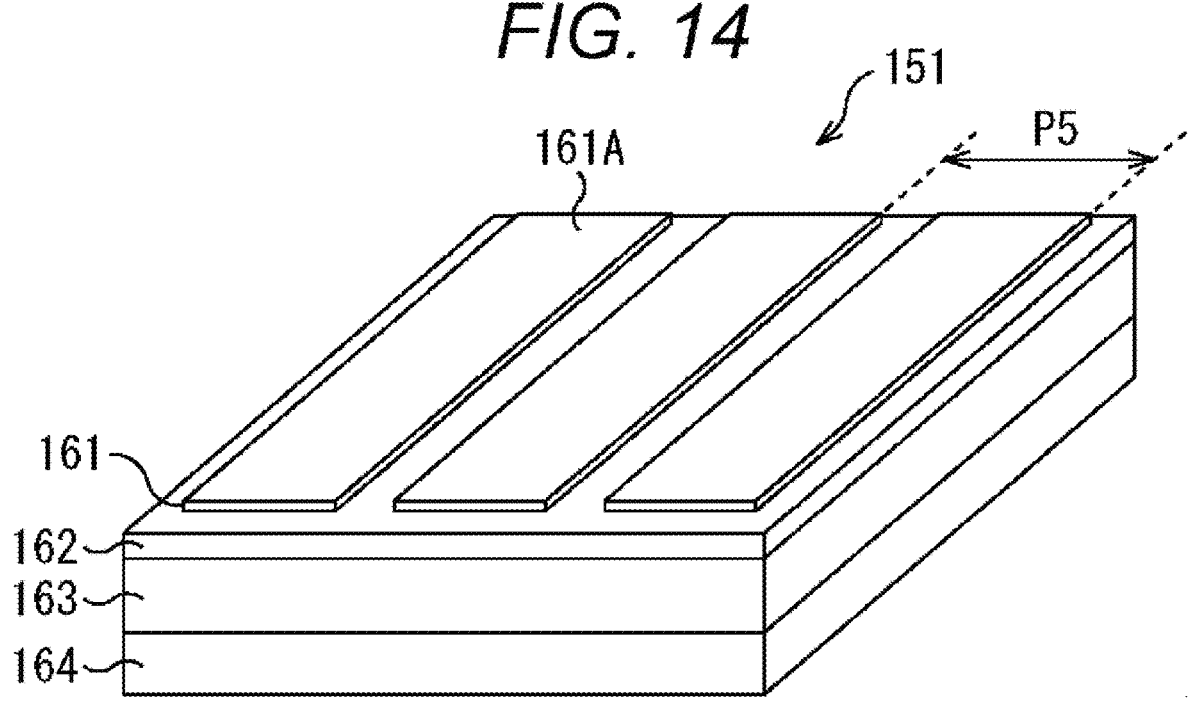
FIG. 14 is a diagram illustrating configuration example of a plasmon filter using GMR.

In addition, a plasmon filter 151 using a guided mode resonant (GMR) illustrated in FIG. 14 can also be used in the narrow band filter NB.

A conductor layer 161, an SiO2 film 162, an SiN film 163, and an SiO2 substrate 164 are laminated in the plasmon filter 151, in this order from the above. The conductor layer 161, for example, is included in the narrow band filter layer 103 of FIG. 3, and the SiO2 film 162, the SiN film 163, and the SiO2 substrate 164, for example, are included in the interlayer film 104 of FIG. 3.

For example, rectangular conductor thin films 161A formed of aluminum are arranged in the conductor layer 161 such that long sides of the conductor thin films 161A are adjacent to each other at a predetermined pitch P5. Then, a transmission band of the plasmon filter 151 is changed according to the pitch P5 or the like.

Figure 15:
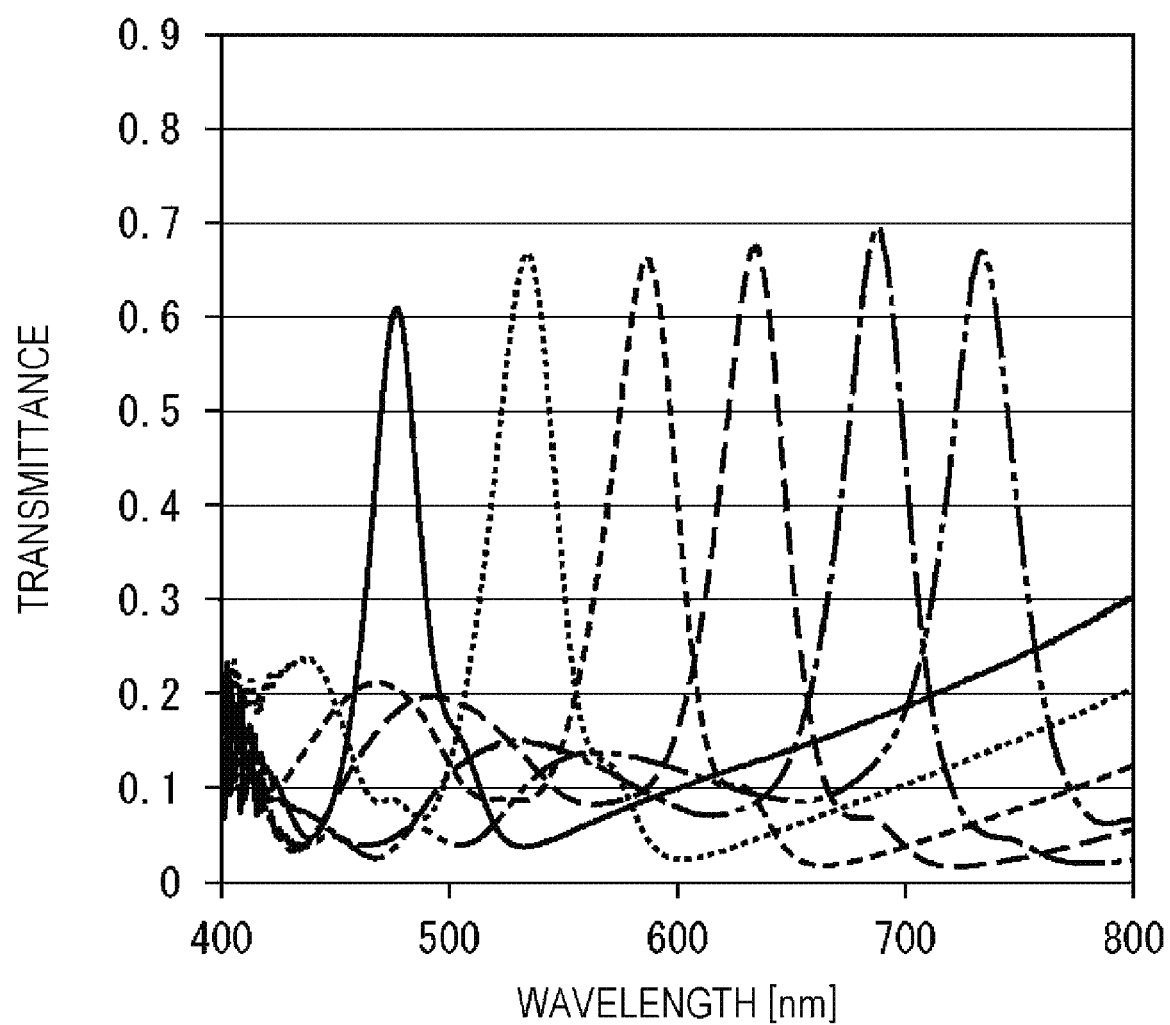
FIG. 15 is a graph illustrating an example of spectrum information of the plasmon filter using GMR.

FIG. 15 is a graph illustrating an example of spectral characteristics of the plasmon filter 151 in a case where the pitch P5 is changed. In the graph, a horizontal axis represents a wavelength (the unit is nm), and a vertical axis represents transmittance. This example illustrates an example of spectral characteristics in a case where the pitch P5 is changed to six types of pitches by being divided by 40 nm from 280 nm to 480 nm, and a width of a slit between the adjacent conductor thin films 161A is set to be ¼ of the pitch P5. In addition, a waveform having the shortest peak wavelength of the transmission band represents spectral characteristics in a case where the pitch P5 is set to 280 nm, and the peak wavelength elongates as the pitch P5 widens. That is, the transmission band of the plasmon filter 151 is shifted to a short wavelength side as the pitch P5 narrows, and the transmission band of the plasmon filter 151 is shifted to a long wavelength side as the pitch P5 widens.

The plasmon filter 151 using GMR has excellent affinity with respect to a color filter of an organic material, as with the plasmon filters having the pore array structure and the dot array structure described above.

<Second Embodiment of Imaging Element>

Next, a second embodiment of the imaging element 12 of FIG. 1 will be described with reference to FIGS. 16 to 21.

Figure 16:
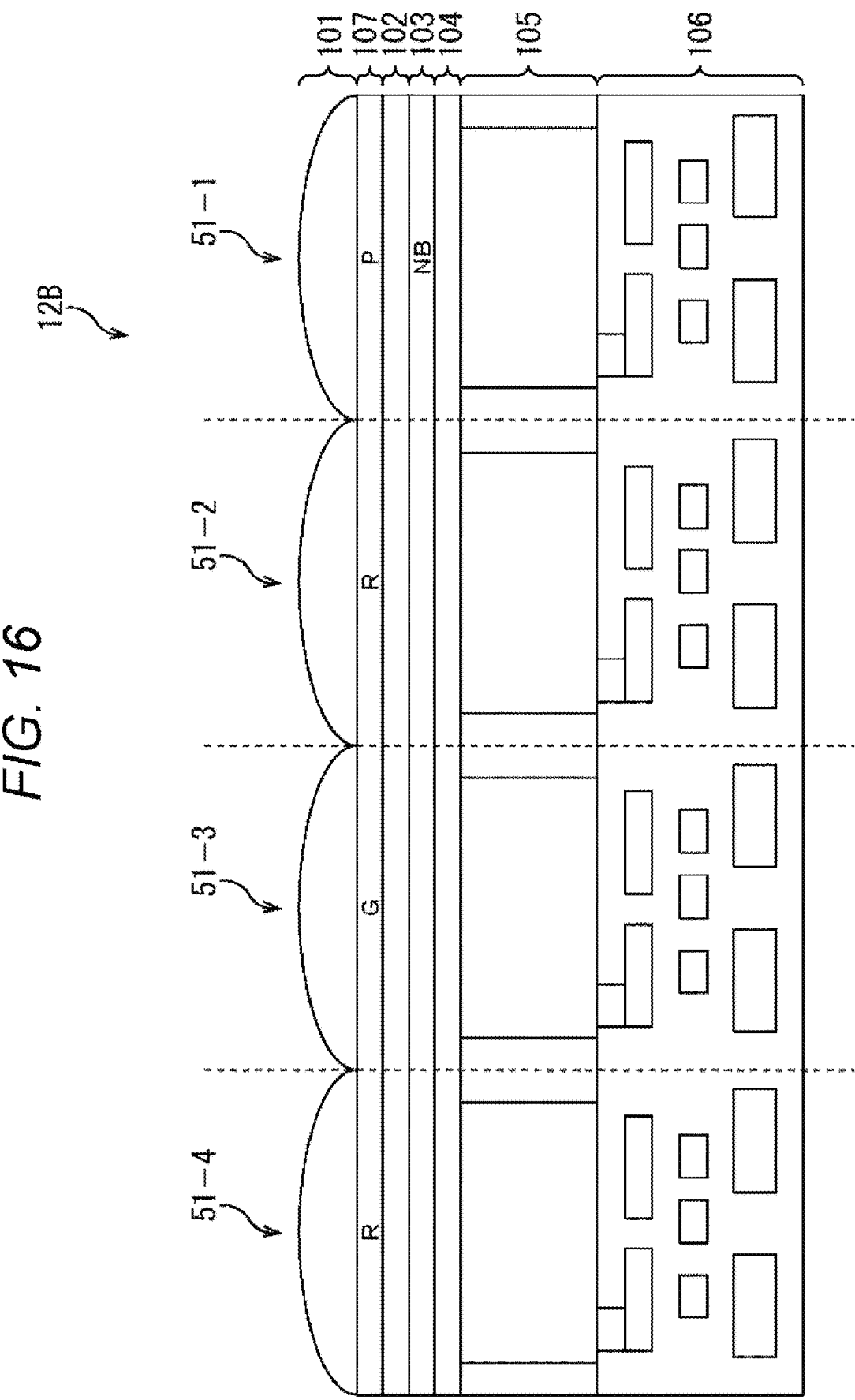
FIG. 16 is a sectional view schematically illustrating a configuration example of a second embodiment of the imaging element.

FIG. 16 schematically illustrates a configuration example of a sectional surface of an imaging element 12B which is the second embodiment of the imaging element 12. Furthermore, in the drawing, the same reference numerals are applied to portions corresponding to the imaging element 12A of FIG. 3, and the description thereof will be suitably omitted.

The imaging element 12B is different from the imaging element 12A in that a color filter layer 107 is laminated between the on-chip microlens 101 and the interlayer film 102.

In the narrow band filter layer 103 of the imaging element 12B, the narrow band filter NB is disposed in a part of the pixels 51 but not all of the pixels 51. The type of the transmission band of the narrow band filter NB (the number of bands) is arbitrary, and for example, the number of bands is set to be greater than or equal to 1.

In the color filter layer 107, a color filter is disposed in each of the pixels 51. For example, in the pixel 51 where the narrow band filter NB is not disposed, any one of a general red color filter R, a general green color filter G, and a general blue color filter B (not illustrated) is disposed. Accordingly, for example, an R pixel in which the red color filter R is disposed, a G pixel in which the green color filter G is disposed, a B pixel in which the blue color filter is disposed, and an MS pixel in which in which the narrow band filter NB is disposed, are arranged in the pixel array 31.

In addition, in the pixel 51 where the narrow band filter NB is disposed, a transmission filter P is disposed on the color filter layer 107. As described below, the transmission filter P is configured of an optical filter transmitting light in a wavelength band including the transmission band of the narrow band filter NB of the same pixel 51 (a low pass filter, a high pass filter, or a band pass filter).

Furthermore, the color filter disposed on the color filter layer 107 may be color filters of both of an organic material and an inorganic material.

Examples of the color filter of the organic material include a dyeing and coloring color filter of a synthetic resin or natural protein, and a color filter containing a dye using a pigment dye or a colorant dye.

Examples of the color filter of the inorganic material include materials such as TiO2, ZnS, SiN, MgF2, SiO2, and Low-k. In addition, for example, a method such as vapor deposition, sputtering, and chemical vapor deposition (CVD) film formation is used for forming the color filter of the inorganic material.

In addition, as described above with reference to FIG. 9, the interlayer film 102 is set to have a film thickness which is capable of preventing the influence of the color filter layer 107 on the front plasmon on an interface between the interlayer film 102 and the narrow band filter layer 103.

Here, the occurrence of flare is suppressed by the transmission filter P disposed on the color filter layer 107. This will be described with reference to FIGS. 17 and 18.

Figure 17:
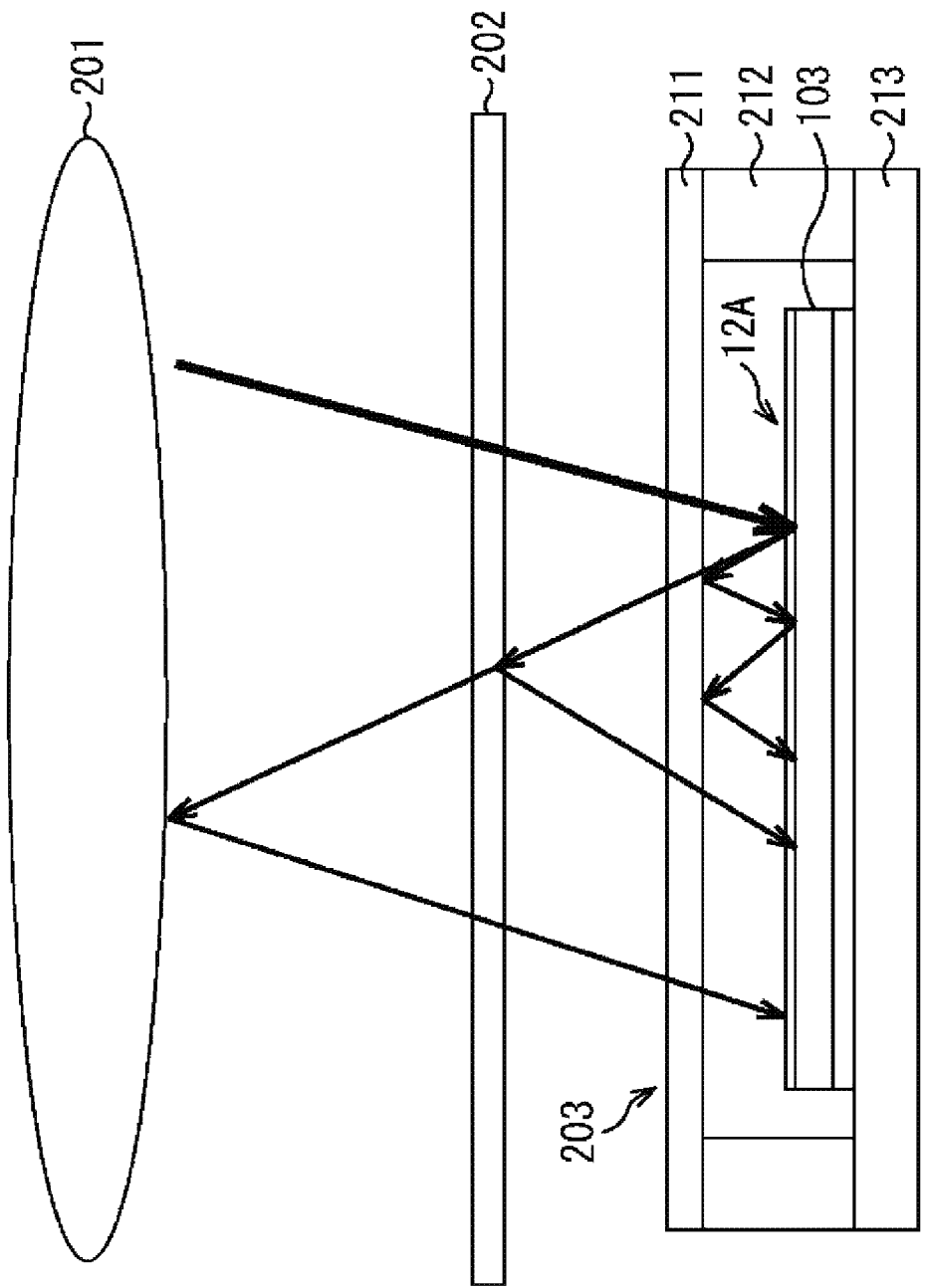
FIG. 17 is a diagram schematically illustrating an aspect of occurrence of flare of the imaging device.

FIG. 17 schematically illustrates an aspect of the occurrence of the flare of the imaging device 10 using the imaging element 12A of FIG. 2 in which the color filter layer 107 is not disposed.

In this example, the imaging element 12A is disposed on a semiconductor chip 203. Specifically, the semiconductor chip 203 is mounted on a substrate 213, and is surrounded by seal glass 211 and a resin 212. Then, light transmitted through a lens 201, an IR cut filter 202, and the seal glass 211, which are disposed in the optical system 11 of FIG. 1, is incident on the imaging element 12A.

Here, in a case where the narrow band filter NB of the narrow band filter layer 103 of the imaging element 12A is formed of a plasmon filter, a conductor thin film formed of metal is formed in the plasmon filter. The conductor thin film has a high reflection rate, and thus, light at a wavelength other than the transmission band is easily reflected. Then, a part of the light reflected on the conductor thin film, for example, as illustrated in FIG. 17, is reflected on the seal glass 211, the IR cut filter 202, or the lens 201, and is incident again on the imaging element 12A. The flare occurs due to the re-incident light. In particular, a plasmon filter using a pore array structure has a low opening rate, and thus, the flare easily occurs.

In order to prevent the reflection light, for example, it is considered that an antireflection film formed of a metal or a material having a high dielectric constant, which is different from the conductor thin film, is used. However, in a case where the plasmon filter uses a front plasmon resonance, and such an antireflection film is in contact with the front surface of the conductor thin film, there is a possibility that the characteristics of the plasmon filter are degraded, and desired characteristics are not obtained.

Figure 18:
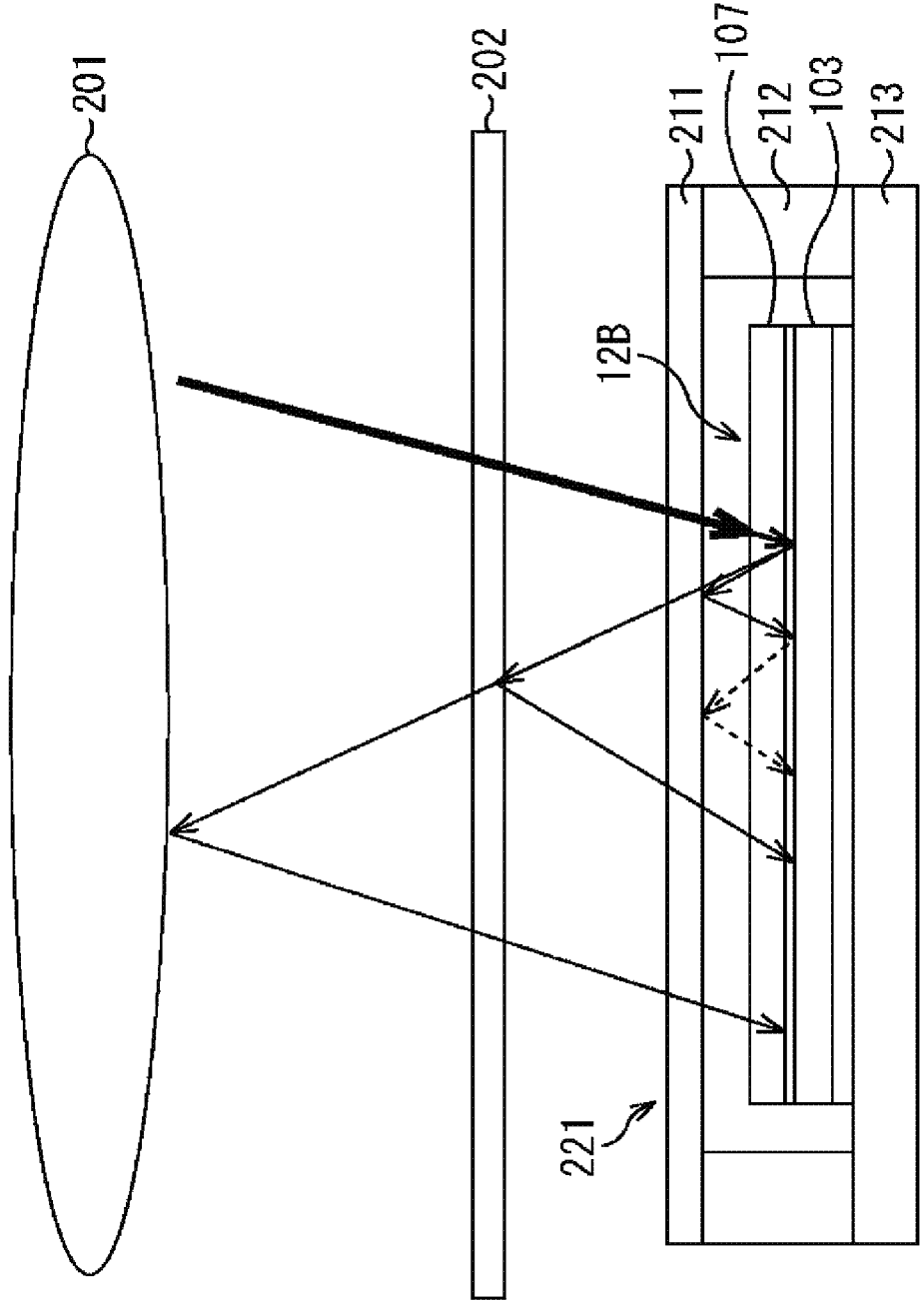
FIG. 18 is a diagram for describing a flare reducing method of the imaging device.

On the other hand, FIG. 18 schematically illustrates an aspect of the occurrence of the flare of the imaging device 10 using the imaging element 12B of FIG. 16, in which the color filter layer 107 is disposed. Furthermore, in the drawing, the same reference numerals are applied to portions corresponding to those of FIG. 17.

The example of FIG. 18 is different from the example of FIG. 17 in that a semiconductor chip 221 is disposed instead of the semiconductor chip 203. The semiconductor chip 221 is different from the semiconductor chip 203 in that the imaging element 12B is disposed instead of the imaging element 12A.

As described above, in the imaging element 12B, the transmission filter P is disposed on an upper side from the narrow band filter NB (an incident side of light). Accordingly, the light incident on the imaging element 12B is incident on the narrow band filter NB, in which a predetermined wavelength band is cutoff, by the transmission filter P, and thus, a light amount of the incident light with respect to the narrow band filter NB is suppressed. As a result thereof, a light amount of the reflection light on the conductor thin film of the narrow band filter NB (the plasmon filter) is also reduced, and thus, the flare is reduced.

Figure 19:
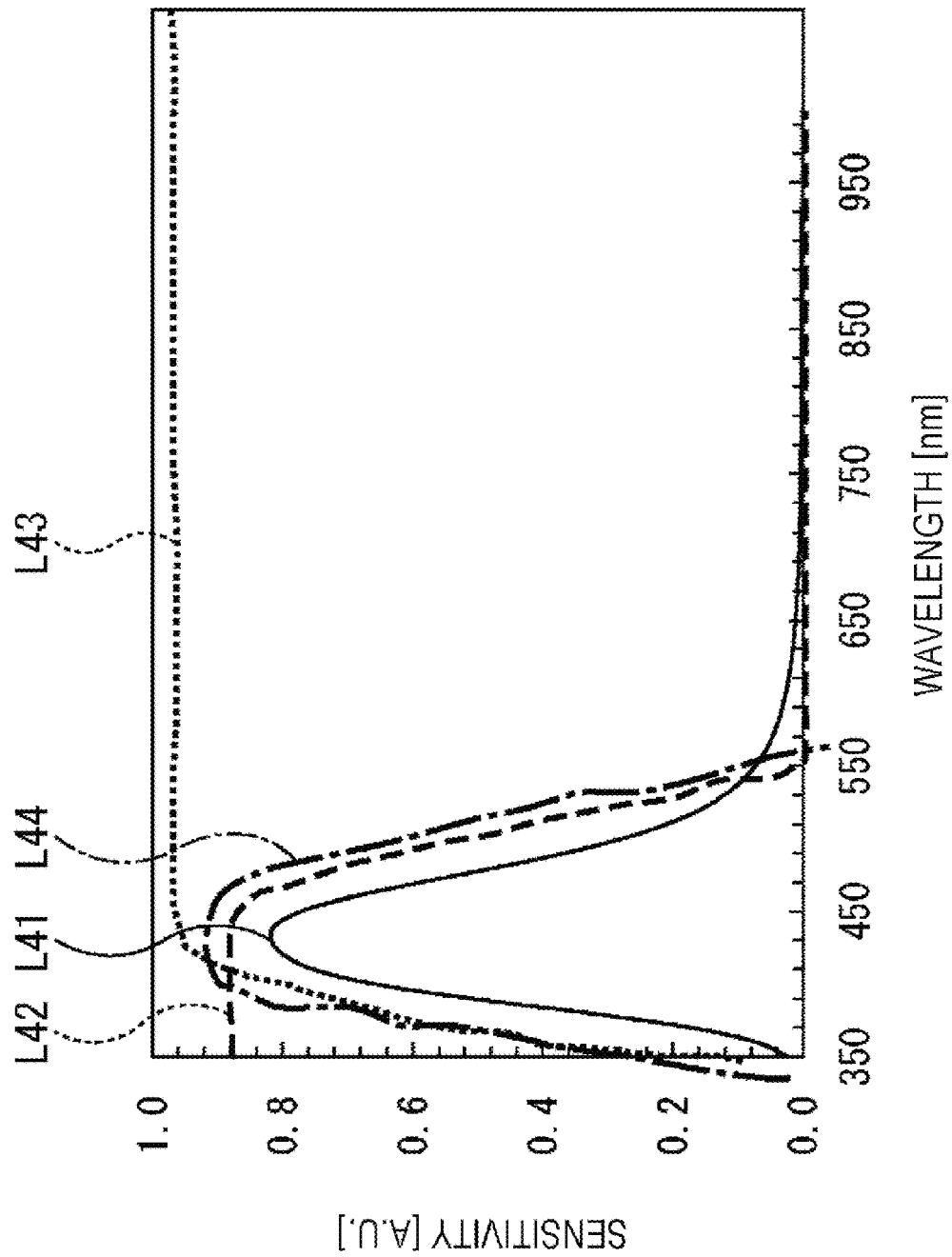
FIG. 19 is a graph illustrating a first example of spectrum information of a narrow band filter and a transmission filter.
Figure 20:
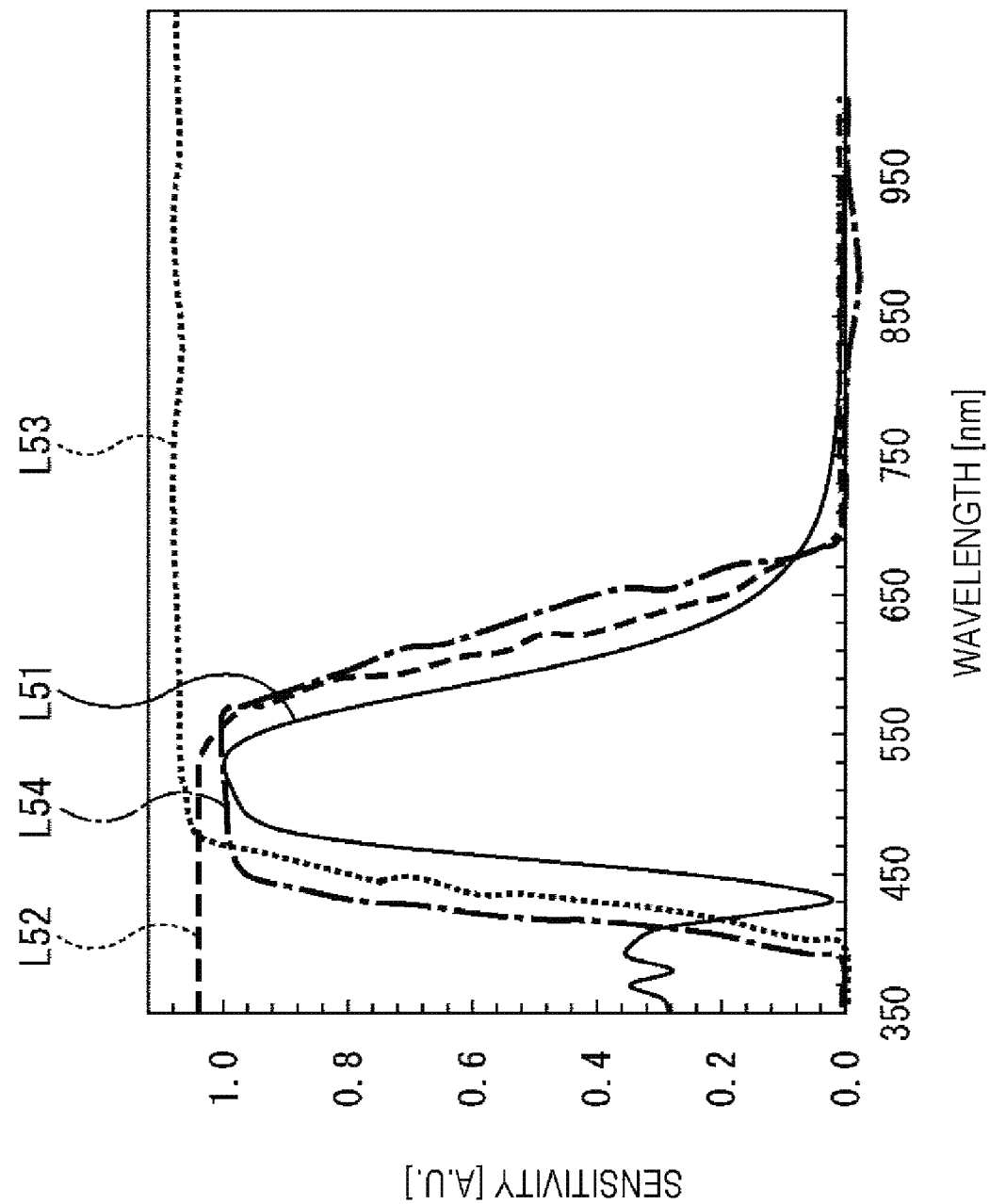
FIG. 20 is a graph illustrating a second example of the spectrum information of the narrow band filter and the transmission filter.
Figure 21:
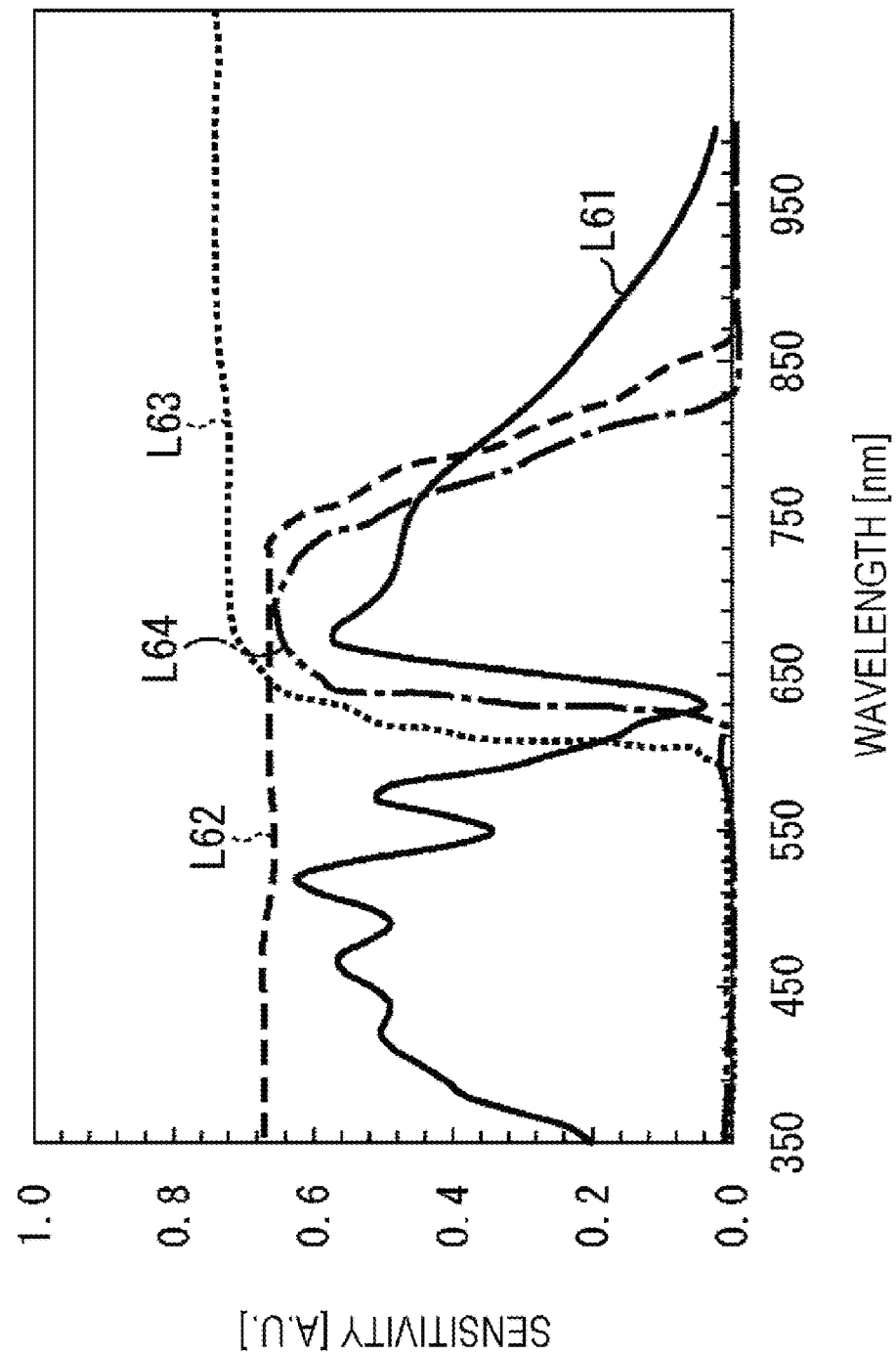
FIG. 21 is a graph illustrating a third example of the spectrum information of the narrow band filter and the transmission filter.

FIGS. 19 to 21 illustrate examples of the spectral characteristics of the narrow band filter NB and the spectral characteristics of the transmission filter P disposed on the upper side of the narrow band filter NB. Furthermore, in the graphs of FIGS. 19 to 21, a horizontal axis represents a wavelength (the unit is nm), and a vertical axis represents sensitivity (the unit is an arbitrary unit).

In FIG. 19, a line L41 represents the spectral characteristics of the narrow band filter NB. A peak wavelength of the spectral characteristics of the narrow band filter NB is approximately in the vicinity of 430 nm. A line L42 represents the spectral characteristics of a low pass type transmission filter P. A line L43 represents the spectral characteristics of a high pass type transmission filter P. A line L44 represents the spectral characteristics of a band pass type transmission filter P. The sensitivities of all of the transmission filters P are greater than the sensitivity of the narrow band filter NB in a predetermined wavelength band including the peak wavelength of the spectral characteristics of the narrow band filter NB. Accordingly, it is possible to reduce the light amount of the incident light which is incident on the narrow band filter NB without substantially attenuating the light in the transmission band of the narrow band filter NB, by using any transmission filter P.

In FIG. 20, a line L51 represents the spectral characteristics of narrow band filter NB. A peak wavelength of the spectral characteristics of the narrow band filter NB is approximately in the vicinity of 530 nm. A line L52 represents the spectral characteristics of the low pass type transmission filter P. A line L53 represents the spectral characteristics of the high pass type transmission filter P. A line L54 represents the spectral characteristics of the band pass type transmission filter P. The sensitivities of all of the transmission filters are greater than the sensitivity of the narrow band filter NB in a predetermined wavelength band including the peak wavelength of the spectral characteristics of the narrow band filter NB. Accordingly, it is possible to reduce the light amount of the incident light which is incident on the narrow band filter NB without substantially attenuating the light in the transmission band of the narrow band filter NB, by using any transmission filter P.

In FIG. 21, a line L61 represents the spectral characteristics of narrow band filter NB. A peak wavelength of the spectral characteristics of the narrow band filter NB in a plasmon mode is approximately in the vicinity of 670 nm. A line L62 represents the spectral characteristics of the low pass type transmission filter P. A line L63 represents the spectral characteristics of the high pass type transmission filter P. A line L64 represents the spectral characteristics of the band pass type transmission filter P. The sensitivities of all of the transmission filters are greater than the sensitivity of the narrow band filter NB in a predetermined wavelength band including the peak wavelength in the plasmon mode of greater than or equal to 630 nm, which is the cutoff wavelength of the spectral characteristics of the narrow band filter NB. Accordingly, it is possible to reduce the light amount of the incident light which is incident on the narrow band filter NB without substantially attenuating the light in the transmission band of the narrow band filter NB in the plasmon mode, by using any transmission filter P. Here, using the high pass type transmission filter P or the band pass type transmission filter P is desirable as the characteristics of a narrow band filter since light in a wavelength band of the narrow band filter NB in a waveguide mode can be cutoff.

Furthermore, in a case where the transmission band of the red color filter R, the green color filter G, or the blue color filter B includes a transmission band of the narrow band filter NB of a lower layer, such filters may be used in the transmission filter P.

In addition, in the example of FIG. 16, an example is described in which the narrow band filter NB is disposed only in a part of the pixels 51, and the narrow band filter NB is capable of being disposed in all of the pixels 51. In this case, in each of the pixels 51, the transmission filter P having a transmission band which includes the transmission band of the narrow band filter NB of the pixel 51 may be disposed on the color filter layer 107.

Further, a combination of the colors of the color filters in the color filter layer 107 is not limited to the example described above, and can be arbitrarily changed.

In addition, in a case where a countermeasure against the flare described above is not necessary, for example, the transmission filter P may be disposed on an upper layer of the narrow band filter NB, or a dummy filter transmitting light at all wavelengths may be disposed.

<Third Embodiment of Imaging Element>

Next, a third embodiment of the imaging element 12 of FIG. 1 will be described with reference to FIG. 22.

Figure 22:
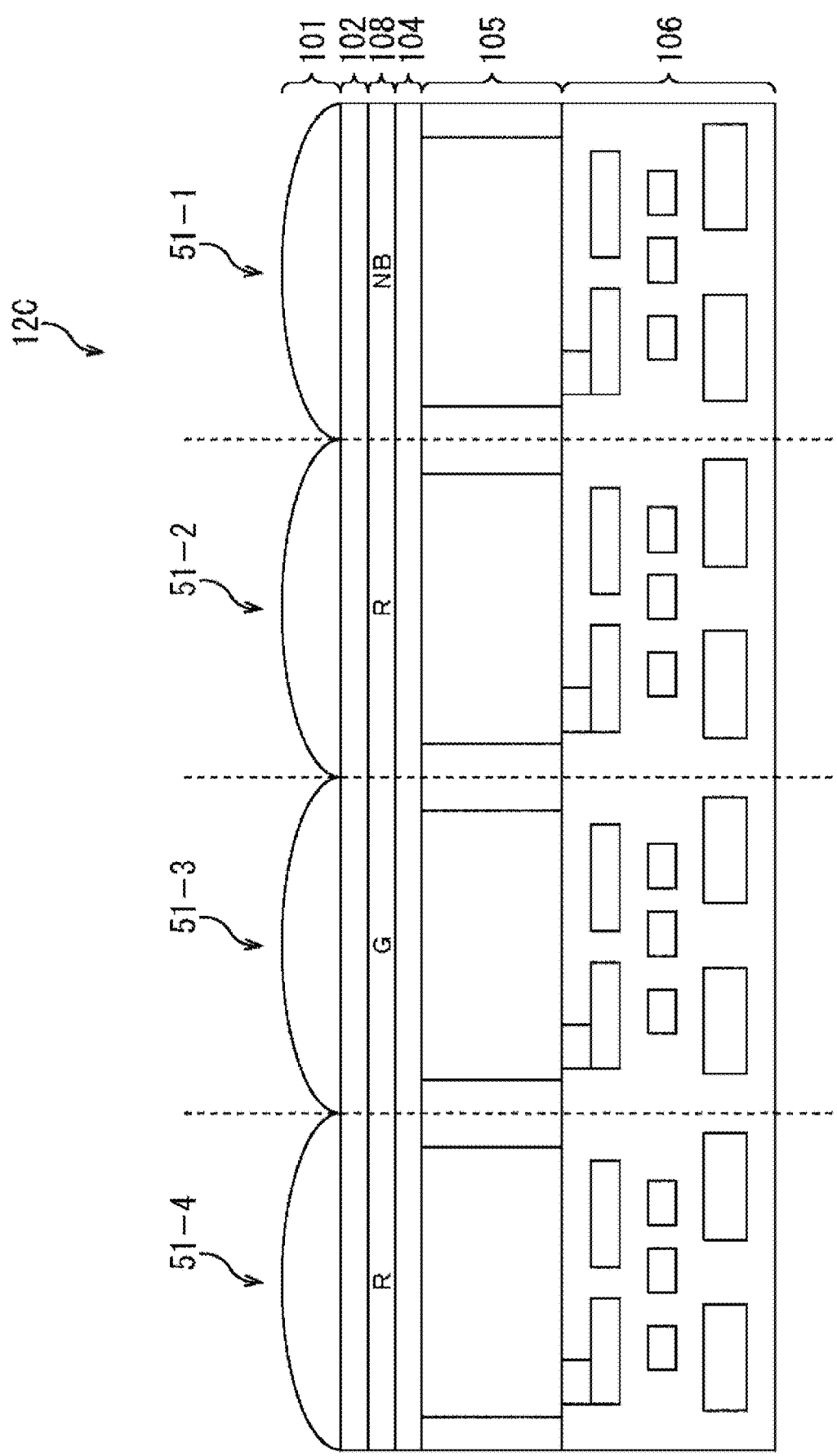
FIG. 22 is a sectional view schematically illustrating a configuration example of a third embodiment of the imaging element.

FIG. 22 schematically illustrates a configuration example of a sectional surface of an imaging element 12C, which is the third embodiment of the imaging element 12. Furthermore, in the drawing, the same reference numerals are applied to portions corresponding to the imaging element 12A of FIG. 3, and the description thereof will be suitably omitted.

The imaging element 12C is different from the imaging element 12A in that a filter layer 108 is disposed instead of the narrow band filter layer 103. In addition, the imaging element 12C is different from the imaging element 12B of FIG. 16 in that the narrow band filter NB and the color filter (for example, the red color filter R, the green color filter G, and the blue color filter B) are disposed in the same filter layer 108.

Accordingly, in a case where the R pixel, the G pixel, the B pixel, and the MS pixel are arranged in the pixel array 31 of the imaging element 12C, the color filter layer 107 can be omitted.

Furthermore, in a case where the color filter of the organic material is used, in order to prevent a damage or the like of the color filter due to heat, for example, the narrow band filter NB is formed first, and final heat processing such as sinter processing is performed at a high temperature, and then, the color filter is formed. On the other hand, in a case where the color filter of the inorganic material is used, basically, there is no necessity to restrict the formation sequence described above.

In addition, in a case where the countermeasure against the flare is performed as in the imaging element 12B of FIG. 16, as with the imaging element 12B, the color filter layer may be laminated between the on-chip microlens 101 and the interlayer film 102. In this case, in the pixel 51 where the narrow band filter NB is disposed on the filter layer 108, the transmission filter P described above is disposed on the color filter layer. On the other hand, in the pixel 51 where the color filter is disposed on the filter layer 108, a filter may be disposed on the color filter layer, or a dummy filter transmitting light in all wavelengths or a color filter of the same color as that of the filter layer 108 may be disposed.

2. Usage Example of Multispectral Image

Next, processing performed by using an image output from the imaging element 12 of FIG. 1 (hereinafter, referred to as a multispectral image) will be described with reference to FIGS. 23 to 29.

First Usage Example

Figure 23:
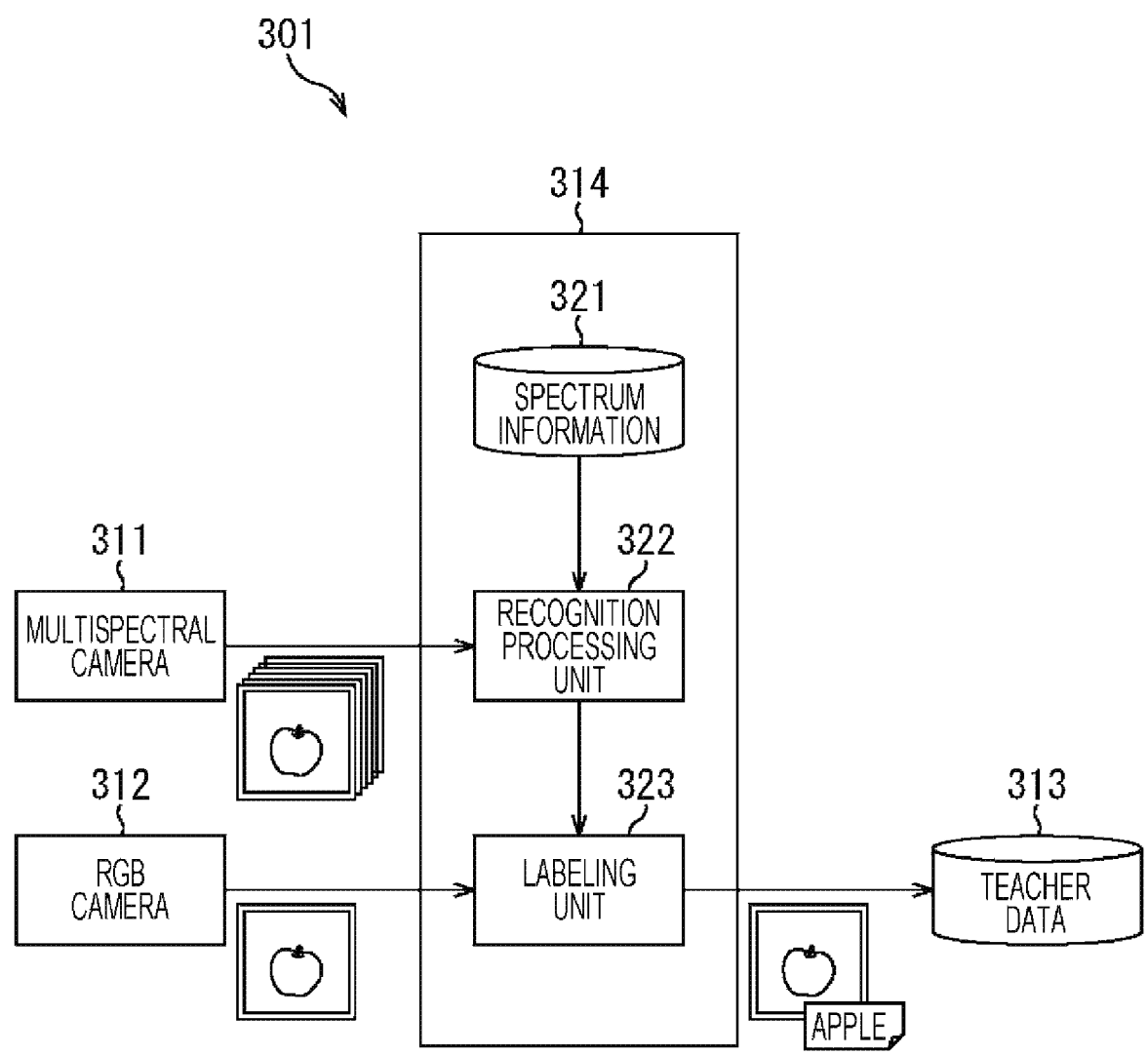
FIG. 23 is a block diagram illustrating a configuration example of an embodiment of a training data generating system to which the present technology is applied.

FIG. 23 illustrates a configuration example of a training data generating system performing processing of automatically generating training data to be used for machine learning, as a first usage example of processing which is performed by using the multispectral image.

As illustrated in FIG. 23, a training data generating system 301 is configured of a multispectral camera 311, an RGB camera 312, a storage device 313, and a training data generating processing device 314.

The multispectral camera 311 includes the imaging element 12 of FIG. 1, and supplies the multispectral image obtained by imaging an object (for example, an apple, a face of a person, or the like), which is a target generating the training data, to the training data generating processing device 314.

The RGB camera 312 is an imaging device which is capable of imaging a color image (so-called an RGB image), images the same object as that imaged by the multispectral camera 311, and supplies a color image obtained as a result thereof to the training data generating processing device 314.

The storage device 313, for example, is configured of a hard disk drive, a semiconductor memory, or the like, and stores the training data supplied from the training data generating processing device 314.

The training data generating processing device 314 performs the processing of automatically generating the training data to be used for the machine learning on the basis of the multispectral image supplied from the multispectral camera 311 and the color image supplied from the RGB camera 312.

In general, spectrum information representing specific spectral characteristics with respect to each type of the object, which is a subject, can be extracted from the multispectral image acquired by imaging the object with the light dispersed into a plurality of wavelength bands. Accordingly, the object photographed in the multispectral image can be recognized with a high accuracy, on the basis of the spectral characteristics with respect to each of the objects. On the other hand, the color image is obtained by only imaging the object with light in three wavelength bands (for example, R, G, and B), and thus, in order to recognize the object photographed in the color image with a high accuracy, it is necessary to perform the machine learning using a large quantity of training data in advance. For this reason, it is necessary to automatically generate the training data to be used in the machine learning for recognizing the object of the color image, for example, a color image to which a name representing the type of the object is added.

As illustrated in the drawing, the training data generating processing device 314 includes a spectrum information retaining unit 321, a recognition processing unit 322, and a labeling unit 323.

The spectrum information retaining unit 321 retains the spectrum information which is obtained in advance from the multispectral image in which various objects are photographed and represents specific spectral characteristics with respect to each type of the object, in association with the name representing each type of the object.

The recognition processing unit 322 extracts spectral characteristics in a region where the object, which is the target generating the training data in the multispectral image supplied from the multispectral camera 311, is photographed, and thus, acquires the spectrum information representing the spectral characteristics of the object. Further, the recognition processing unit 322 obtains a similarity ratio with respect to a plurality of spectrum information items retained in the spectrum information retaining unit 321, with respect to the spectrum information obtained from the multispectral image.

Then, the recognition processing unit 322 supplies a name associated with spectrum information having the highest similarity ratio as a recognition result of the object, which is the target generating the training data, from the plurality of spectrum information items retained in the spectrum information retaining unit 321, to the labeling unit 323. Furthermore, in a case where the highest similarity ratio obtained here is less than or equal to a predetermined defined value (a threshold value which can be determined as the same type), the recognition processing unit 322 sets the effect that the object photographed in the multispectral image is not capable of being recognized (unrecognizable) as the recognition result.

The labeling unit 323 performs labeling processing with respect to the color image supplied from the RGB camera 312, that is, processing of adding the recognition result supplied from the recognition processing unit 322 to the color image supplied from the RGB camera 312. Then, the labeling unit 323 supplies the color image to which the recognition result is added, to the storage device 313 for storage as the training data to be used for the machine learning for performing the object recognition using the color image.

The training data generating system 301 is configured as described above, and is capable of generating the color image to which the recognition result of the object photographed in the multispectral image is added, as the training data to be used for the machine learning for performing the object recognition using the color image. Accordingly, various objects are imaged by the multispectral camera 311 and the RGB camera 312, by using the training data generating system 301, and thus, the training data with respect to such objects can be automatically generated.

Accordingly, in the related art, for example, a huge labor of visually determining the type of the object, which is the target generating the training data and manually performing the labeling is necessary, but the labor can be reduced due to the automation of the training data generating system 301. That is, a large quantity of training data can be rapidly generated by the training data generating system 301.

Then, it is possible to perform the machine learning for performing the object recognition using the color image by using a large quantity of training data which is automatically generated by the training data generating system 301.

Figure 24:
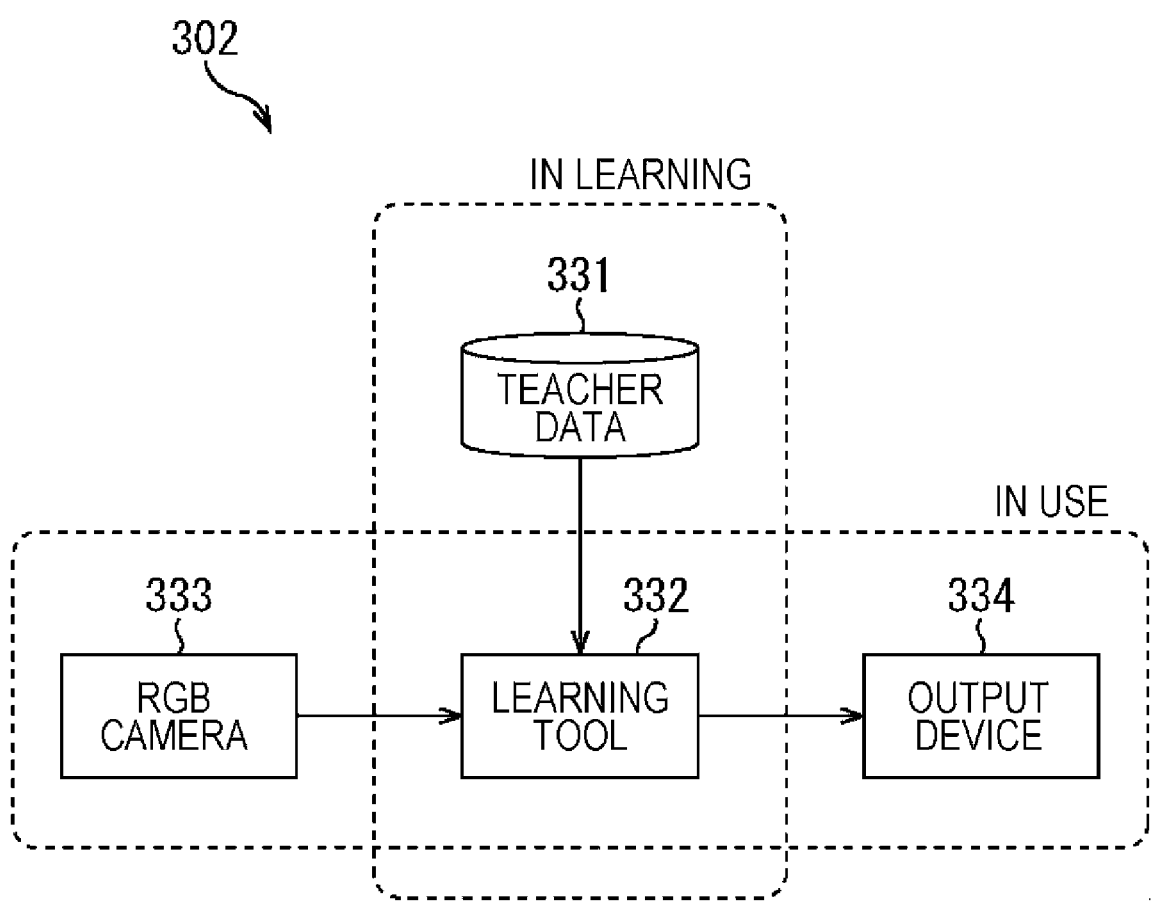
FIG. 24 is a block diagram illustrating a configuration example of an object recognition system.

FIG. 24 illustrates a configuration example of the object recognition system 302 performing machine learning by using the training data generated in the training data generating system 301, and performing the object recognition by using a learning result thereof.

As illustrated in FIG. 24, the object recognition system 302 includes a storage device 331, a learning tool 332, an RGB camera 333, and an output device 334. Furthermore, when the learning is performed in the object recognition system 302, the object recognition system 302 may include at least the storage device 331 and the learning tool 332. In addition, when the learning result is used in the object recognition system 302, the object recognition system 302 may include at least the learning tool 332, the RGB camera 333, and the output device 334.

The storage device 331 stores a large quantity of training data which is automatically generated in the training data generating system 301 of FIG. 23, that is, the color image to which the recognition result with respect to various objects (the name representing the type of the object) is added.

The learning tool 332 sequentially reads out a large quantity of training data which is stored in the storage device 331 at the time of performing the learning, and for example, performs the learning of extracting the common characteristics for the objects with respect to a plurality of images in which the same type of the object is photographed. Then, when the object recognition is performed by using the learning result, the learning tool 332 compares the characteristics of the object photographed in the color image which is imaged by the RGB camera 333 with the characteristics which are subjected to the learning in advance. Accordingly, the learning tool 332 recognizes the type of the object photographed in the color image which is imaged by the RGB camera 333, and supplies the recognition result (the name representing the type of the object) to the output device 334.

The RGB camera 333 is an imaging device which is capable of imaging a general color image, and supplies the color image obtained by imaging the object, which is the target to be subjected to the object recognition, to the learning tool 332.

The output device 334, for example, is configured of a display such as a liquid crystal panel or an organic electro luminescence (EL) panel, and displays the recognition result supplied from the learning tool 332 by superimposing the recognition result on the color image which is imaged by the RGB camera 333. Furthermore, in a case where the output device 334 is configured of a speaker, and a synthetic audio expressing the recognition result may be output.

Thus, the object recognition system 302 performs the machine learning by using the training data which is generated in the training data generating system 301, and is capable of performing the object recognition with a higher accuracy by using the learning result.

Figure 25:
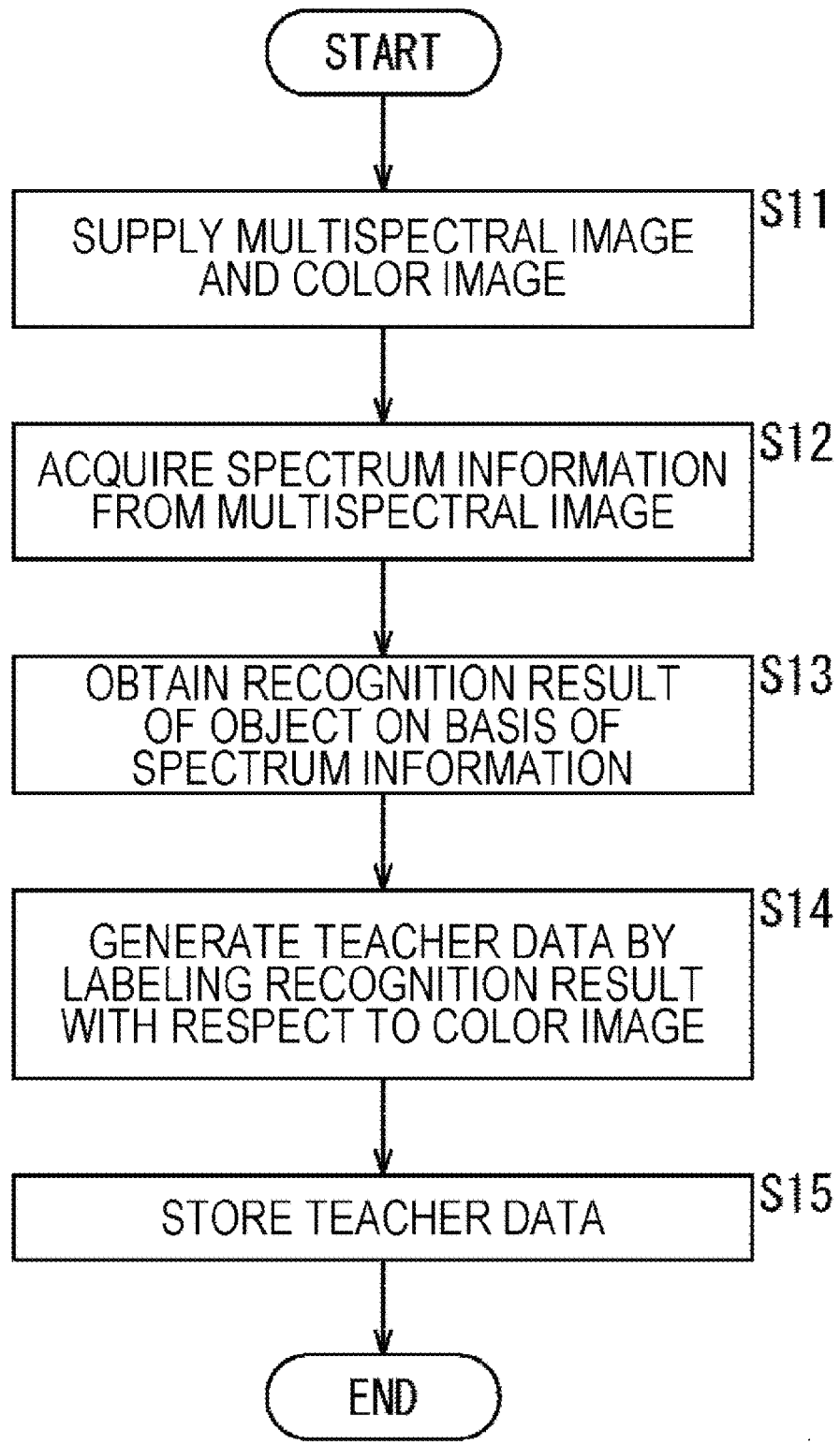
FIG. 25 is a flowchart describing training data generating processing.

FIG. 25 is a flowchart illustrating training data generating processing of the training data generating system 301.

For example, in a state where the multispectral camera 311 and the RGB camera 312 are directed towards the object, which is the target generating the training data, in the case of performing an operation of instructing the training data of the object to be generated, the processing is started. In step S11, the multispectral camera 311 supplies the multispectral image in which the object as the target is photographed, to the recognition processing unit 322, and the RGB camera 312 supplies the color image in which the object as the target is photographed, to the labeling unit 323.

In step S12, the recognition processing unit 322 extracts the spectral characteristics from the multispectral image which is supplied from the multispectral camera 311 in step S11, and acquires the spectrum information representing the spectral characteristics of the object, which is the target generating the training data.

In step S13, the recognition processing unit 322 obtains the similarity ratio with respect to the plurality of spectrum information items which are retained in the spectrum information retaining unit 321, with respect to the spectrum information acquired in step S12. Then, the recognition processing unit 322 obtains the name associated with the spectrum information in which the highest similarity ratio is obtained, as the recognition result of the object, which is the target generating the training data, and supplies the name to the labeling unit 323.

In step S14, the labeling unit 323 labels the recognition result supplied from the recognition processing unit 322 in step S13 with respect to the color image supplied from the RGB camera 312 in step S11, and generates the training data of the object as the target. Then, the labeling unit 323 supplies the generated training data to the storage device 313.

In step S15, the storage device 313 stores the training data supplied from the labeling unit 323 in step S14, and then, ends the training data generating processing. After that, for example, in the case of performing an operation of instructing the training data to be generated by using the next object as the target, hereinafter, similar processing is repeated.

As described above, in the training data generating system 301, it is possible to automate the labeling processing with respect to the object, which is the target generating the training data, and to easily generate a large quantity of training data.

Second Usage Example

Figure 26:
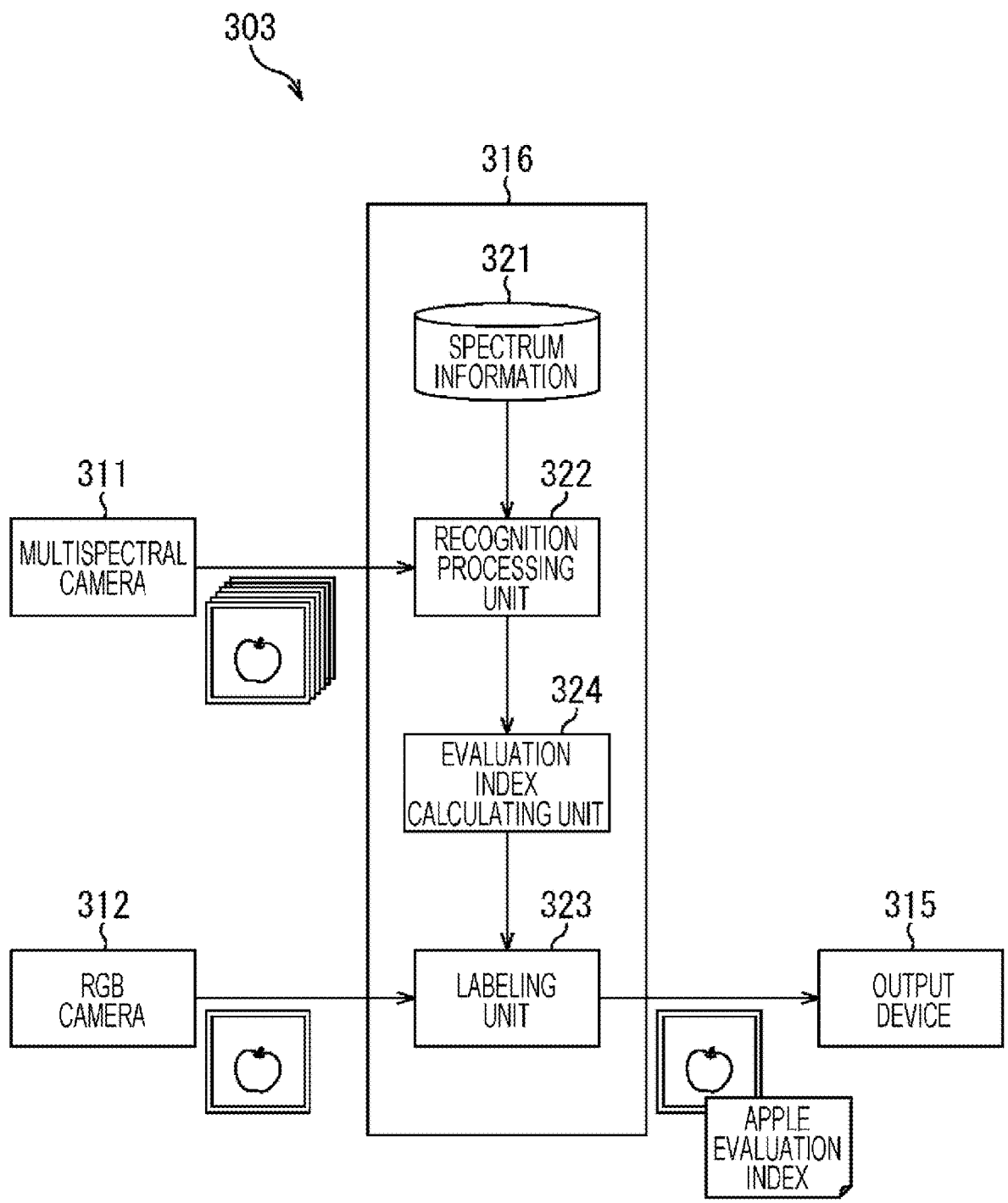
FIG. 26 is a block diagram illustrating a configuration example of an embodiment of an evaluation index presenting system to which the present technology is applied.
Figure 27:
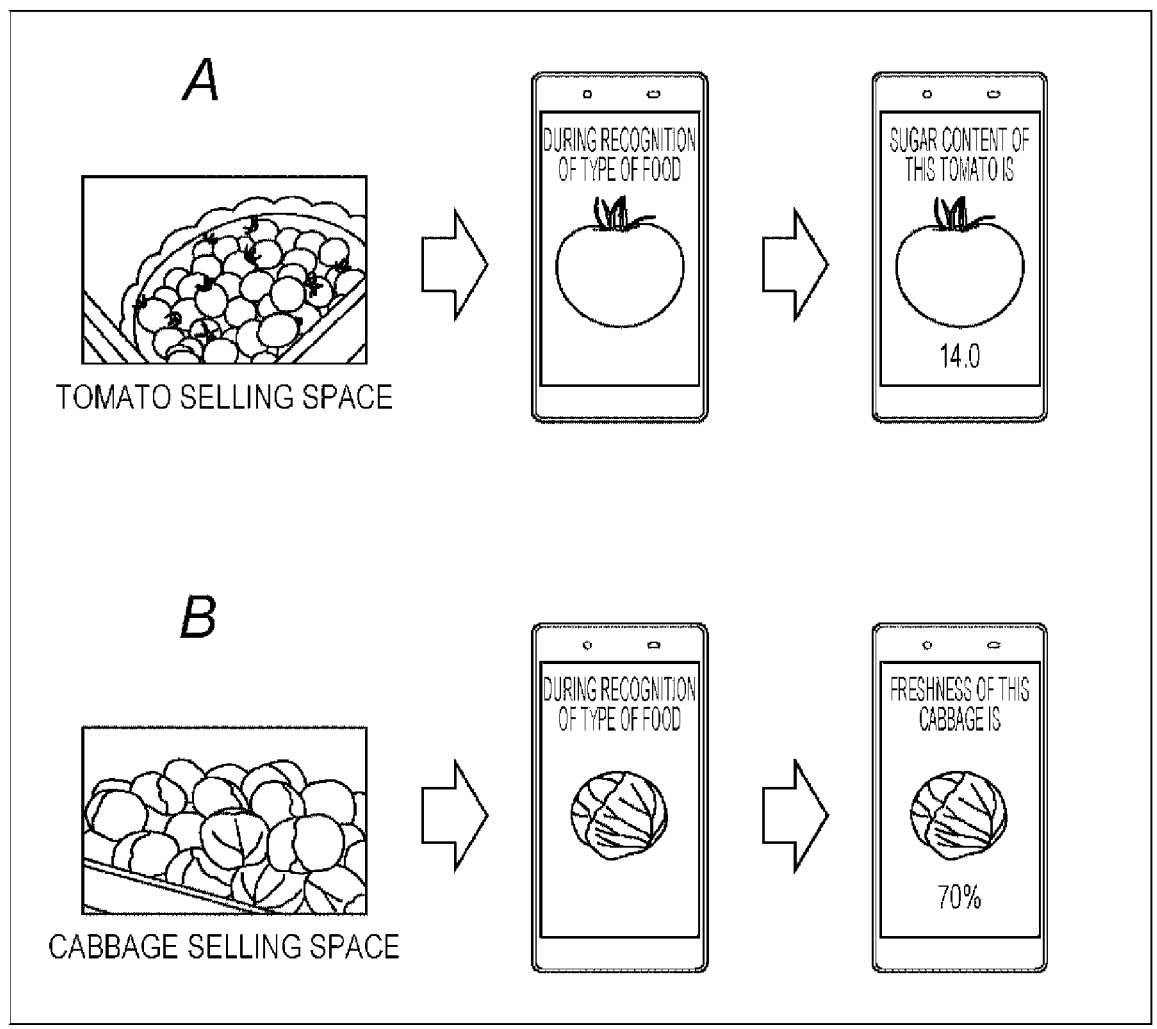
FIG. 27 is a diagram describing usage examples of an information processing terminal on which the evaluation index presenting system is mounted.

FIG. 26 illustrates a configuration example of an evaluation index presenting system performing processing of presenting a suitable evaluation index with respect to the object as the target, as a second usage example of the processing which is performed by using the multispectral image.

As illustrated in FIG. 26, the evaluation index presenting system 303 includes a multispectral camera 311, an RGB camera 312, an output device 315, and an evaluation index acquisition processing device 316. Furthermore, the multispectral camera 311 and the RGB camera 312 have a similar configuration to that of the training data generating system 301 of FIG. 23, and the detailed description will be omitted.

The output device 315, for example, is configured of a display such as a liquid crystal panel or an organic EL panel, and displays the evaluation index supplied from the evaluation index acquisition processing device 316 by superimposing the evaluation index on the color image which is imaged by the RGB camera 312. Furthermore, in a case where the output device 315 is configured of a speaker, a synthetic audio expressing the evaluation index may be output.

The evaluation index acquisition processing device 316 recognizes the object as the target, on the basis of the multispectral image supplied from the multispectral camera 311 and the color image supplied from the RGB camera 312, and performs processing of acquiring the evaluation index quantitatively evaluating the object.

As illustrated in the drawing, the evaluation index acquisition processing device 316 includes a spectrum information retaining unit 321, a recognition processing unit 322, a labeling unit 323, and an evaluation index calculating unit 324. Furthermore, the spectrum information retaining unit 321, the recognition processing unit 322, and the labeling unit 323 have a similar configuration to that of the training data generating processing device 314 of FIG. 23, and the detailed description will be omitted.

A recognition result of the recognition processing unit 322 is supplied to the evaluation index calculating unit 324, along with the multispectral image imaged by the multispectral camera 311. Then, the evaluation index calculating unit 324 automatically selects the evaluation index suitable for the type of the object according to the recognition result supplied from the recognition processing unit 322, that is, the name representing the type of the object, which is the target calculating the evaluation index. For example, the evaluation index calculating unit 324 retains the type of the object and the optimal evaluation index with respect to the type of the object in association with each other. Then, as described below with reference to FIGS. 27A and 27B, in a case where a tomato is the target, a sugar content is selected as the evaluation index, and in a case where a cabbage is the target, freshness is selected as the evaluation index.

Further, the evaluation index calculating unit 324 automatically selects an index calculation formula and a coefficient necessary for calculating the evaluation index suitable for the type of the object as the target, calculates the evaluation index on the basis of the multispectral image, and supplies the evaluation index to the labeling unit 323.

Accordingly, the labeling unit 323 performs the labeling processing with respect to the color image supplied from the RGB camera 312, that is, processing of adding the recognition result supplied from the recognition processing unit 322 and the evaluation index supplied from the evaluation index calculating unit 324 to the color image supplied from the RGB camera 312. Then, the labeling unit 323 supplies the color image to which the recognition result and the evaluation index are added, to the output device 315 for display as the evaluation result.

The evaluation index presenting system 303 is configured as described above, and thus, it is possible to display the color image to which the recognition result of the object photographed in the multispectral image and the evaluation index are added, on the display of the output device 315. Accordingly, the evaluation index presenting system 303 is capable of automatically presenting the evaluation index suitable for the object by only imaging a desired object with the multispectral camera 311 and the RGB camera 312.

Accordingly, in the related art, for example, an evaluation index suitable for each food is different, and thus, in a case where it is necessary for the user to activate dedicated software with respect to each of the foods or to set an operation mode, a coefficient, or the like, such a labor can be reduced by the automation of the evaluation index presenting system 303. That is, the user may only activate the software presenting the evaluation index regardless of the object as the target, and thus, more excellent user experience can be provided by the evaluation index presenting system 303.

FIGS. 27A and 27B illustrate usage examples of an information processing terminal on which the evaluation index presenting system 303 is mounted.

For example, as illustrated in FIG. 27A, in a tomato selling space, it is automatically recognized that the target presenting the evaluation index is a tomato, by only imaging the tomato with the multispectral camera 311 and the RGB camera 312 of the information processing terminal. Then, a sugar content is selected as the evaluation index applied to the tomato, and an evaluation result of "SUGAR CONTENT OF THIS TOMATO IS 14.0" with respect to the tomato as the target is presented on the display, which is the output device 315 of the information processing terminal, by being superimposed on the color image imaged by the RGB camera 312. Furthermore, for example, a message of "DURING RECOGNITION OF TYPE OF FOOD" representing that it is in the middle of the processing is displayed during object recognition processing or the acquisition of the evaluation index.

Similarly, for example, as illustrated in FIG. 27B, in a cabbage selling space, it is automatically recognized that the target presenting the evaluation index is a cabbage by only imaging the cabbage with the multispectral camera 311 and the RGB camera 312 of the information processing terminal. Then, freshness is selected as the evaluation index applied to the cabbage, and an evaluation result of "FRESHNESS OF CABBAGE IS 70%" with respect to the cabbage as the target is presented on the display, which is the output device 315 of the information processing terminal by being superimposed on the color image imaged by the RGB camera 312. Furthermore, for example, a message of "DURING RECOGNITION OF TYPE OF FOOD" representing that it is in the middle of the processing is displayed during the object recognition processing and the acquisition of the evaluation index.

In addition, the evaluation index presenting system 303, for example, is capable of obtaining the tastiness of the food as described below with reference to FIG. 32, the moisture of the fruit as described below with reference to FIG. 33, and the like as the evaluation index.

Figure 28:
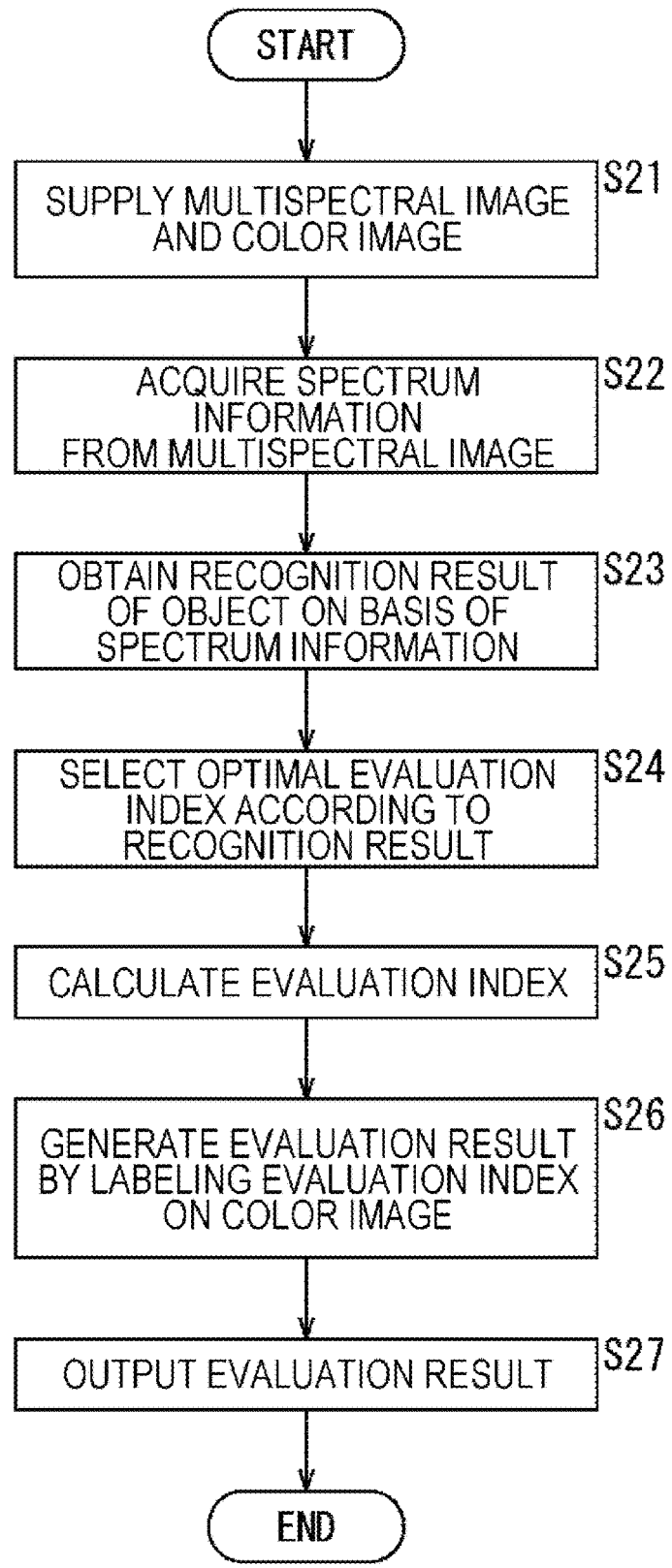
FIG. 28 is a flowchart describing evaluation index presenting processing.

FIG. 28 is a flowchart illustrating evaluation index presenting processing of the evaluation index presenting system 303.

For example, in the case of performing an operation of instructing the evaluation index of the object to be presented in a state where the multispectral camera 311 and the RGB camera 312 are directed towards the object, which is the target presenting the evaluation index, the processing is started. Then, in steps S21 to S23, similar processing to that in steps S11 to S13 of FIG. 25 is performed.

In step S24, the evaluation index calculating unit 324 automatically selects the optimal evaluation index with respect to the type of the object as the target, according to a recognition result supplied from the recognition processing unit 322 in step S23.

In step S25, the evaluation index calculating unit 324 automatically selects an index calculation formula and a coefficient necessary for calculating the evaluation index selected in step S24, calculates the evaluation index, and supplies the evaluation index to the labeling unit 323.

In step S26, the labeling unit 323 labels the recognition result supplied from the recognition processing unit 322 in step S23 and the evaluation index supplied from the evaluation index calculating unit 324 in step S25, on the color image supplied from the RGB camera 312 in step S21, and generates the evaluation result of the object as the target. Then, the labeling unit 323 supplies the generated evaluation result to the output device 315.

In step S27, the output device 315 outputs the evaluation result supplied from the labeling unit 323 in step S26, and then, the evaluation index presenting processing is ended. After that, for example, in the case of performing an operation of instructing the evaluation index to be presented by using the next object as the target, hereinafter, similar processing is repeated.

As described above, in the evaluation index presenting system 303, it is possible to automatically present the evaluation result applied to the object by only imaging the object, which is the target presenting the evaluation index, and for example, it is possible to provide the user with more excellent experience.

Figure 29:
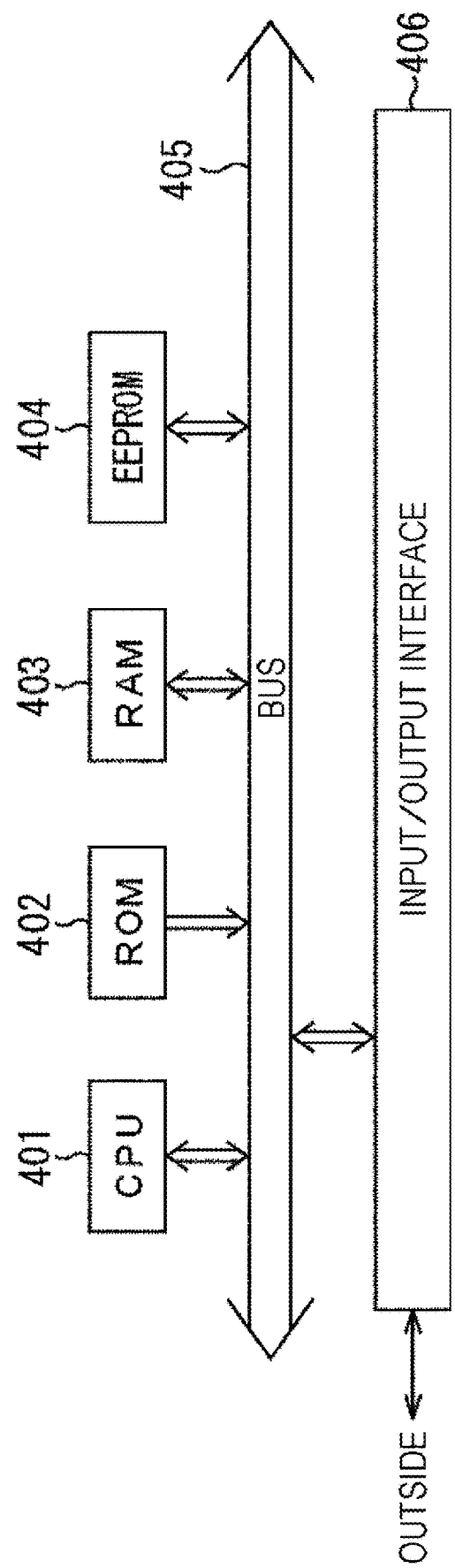
FIG. 29 is a block diagram illustrating a configuration example of an embodiment of a computer.

FIG. 29 is a block diagram illustrating a configuration example of hardware of a computer which executes a set of processings described above (the training data generating processing of FIG. 25 and the evaluation index presenting processing of FIG. 28) by a program.

In the computer, a central processing unit (CPU) 401, a read only memory (ROM) 402, a random access memory (RAM) 403, and an electronically erasable and programmable read only memory (EEPROM) 404 are connected to each other through a bus 405. An input/output interface 406 is further connected to the bus 405, and the input/output interface 406 is connected to the outside (for example, the multispectral camera 311, the RGB camera 312, or the like).

In the computer configured as described above, the CPU 401, for example, loads a program stored in the ROM 402 and the EEPROM 404 on the RAM 403 through the bus 405, and executes the program, and thus, performs the set of processings described above. In addition, the program executed by the computer (the CPU 101) is written in advance in the ROM 402, and can be installed in the EEPROM 404 from the outside through the input/output interface 406 or can be updated.

Furthermore, the training data generating system 301 and the evaluation index presenting system 303 include two cameras of the multispectral camera 311 and the RGB camera 312, and for example, may include one camera which is capable of detecting a multiwavelength.

In addition, the training data generating system 301 and the evaluation index presenting system 303 may be incorporated in the imaging device 10 including the imaging element 12 of FIG. 1, and for example, the training data, the evaluation result, or the like can be output from the imaging device 10.

Furthermore, the training data generating system 301 and the evaluation index presenting system 303 are not limited to recognizing the object by only using the multispectral camera 311 as described above, and may recognize the object by using other types of sensors. For example, a brightness sensor acquiring brightness information, a time-of-flight (ToF) sensor acquiring distance information, an ambient sensor acquiring various environmental information items, an infrared ray sensor acquiring infrared ray information, a thermal sensor acquiring temperature information, and the like can be used, and an image configured of the information acquired by such sensors can be used for recognizing the object.

Further, the labeling processing which is automated by using the multispectral image output from the imaging element 12 of FIG. 1 is not limited to the recognition result or the evaluation result of the object, and the labeling of various information items can be performed.

3. Modification Example

Hereinafter, a modification example of the embodiments of the present technology described above will be described.

For example, the number of types of the film thicknesses of the conductor thin film may be set to be greater than or equal to 3, according to the hole pitch (the transmission band).

In addition, in the plasmon filter having the dot array structure, the film thickness of the conductor thin film (the dot) may be changed according to the dot pitch (the absorption band).

Specifically, as illustrated in FIG. 13, as the dot pitch narrows and the absorption band is shifted to a short wavelength, a peak width and a half width of the absorption band basically narrow, but an absorption rate (a negative peak value of the absorption band) decreases. In contrast, as the dot pitch widens and the absorption band is shifted to a long wavelength, the absorption rate (the negative peak value of the absorption band) is basically improved, but the peak width and the half width of the absorption band widen.

In addition, as the conductor thin film configuring the dot becomes thin, the absorption rate basically decreases, but the peak width and the half width of the absorption band narrow. In contrast, as the conductor thin film configuring the dot becomes thick, the peak width and the half width of the absorption band basically widen, but the absorption rate is improved.

Accordingly, for example, it is desirable that as the dot pitch of the plasmon filter narrows and the absorption band is shifted to the short wavelength, the conductor thin film becomes thick and the absorption rate increases, even though the peak width and the half width of the absorption band slightly widen. In contrast, it is desirable that as the dot pitch of the plasmon filter widens and the absorption band is shifted to the long wavelength, the conductor thin film becomes thin and the peak width and the half width of the transmission band narrow, even though the absorption rate slightly decreases.

Further, for example, in the plasmon filter of the same transmission band (the same hole pitch) or the same absorption band (the same dot pitch), the film thickness of the conductor thin film may be changed for each pixel. Accordingly, it is possible to provide pixels of which the transmission bands or the absorption bands are identical to each other, but the sensitivities or the absorption rates are different from each other. Accordingly, for example, it is possible to improve a detection accuracy of narrow band light in a part of the pixels.

In addition, the present technology is not limited only to the back-side illumination type CMOS image sensor described above, but can be applied to other imaging elements using the plasmon filter. For example, the present technology can be applied to a surface irradiation type CMOS image sensor, a charge coupled device (CCD) image sensor, an image sensor having a photoconductor structure in which an organic photoelectric conversion film, a quantum dot structure, or the like is embedded, and the like.

Figure 30:
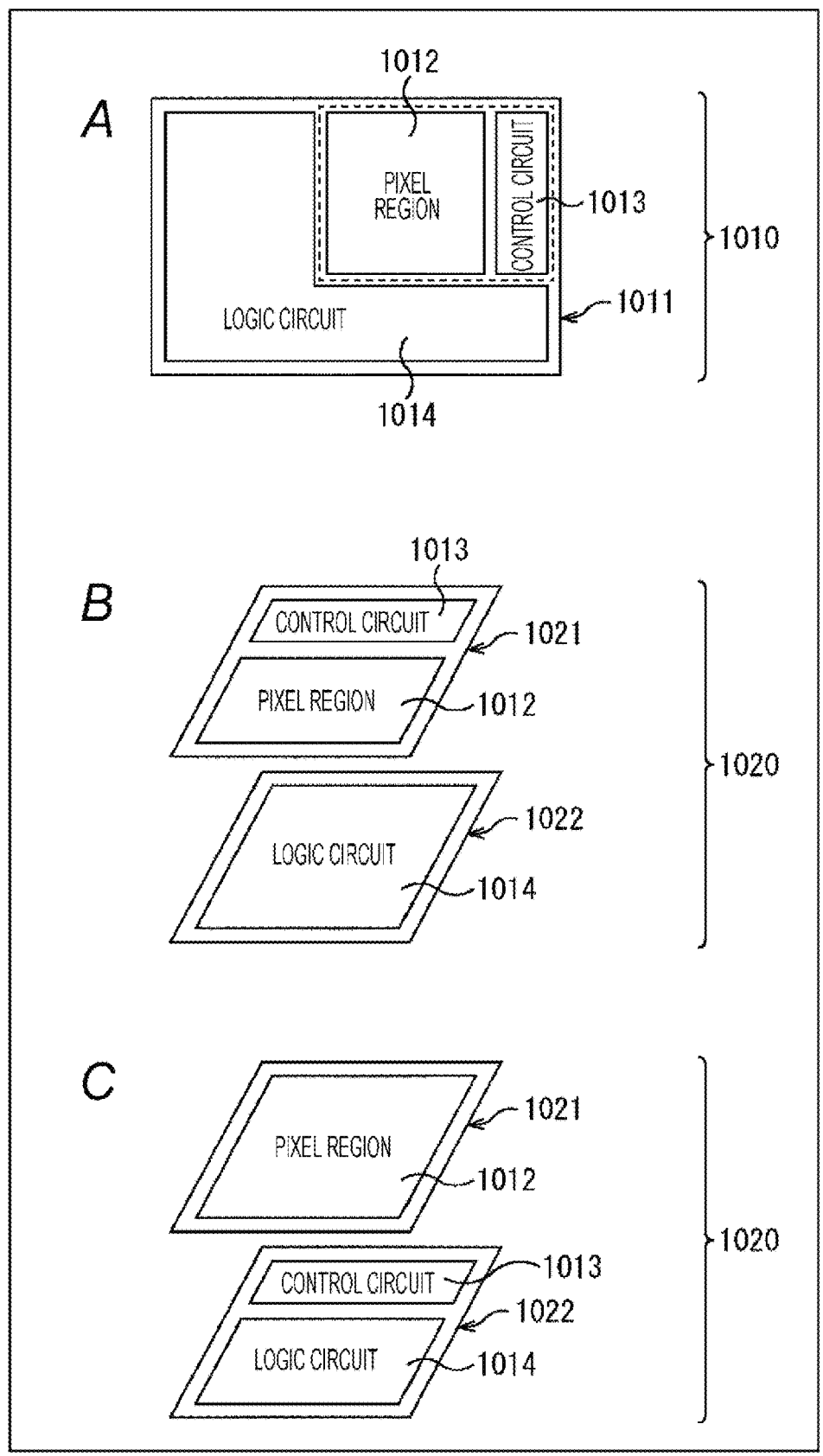
FIG. 30 is a diagram illustrating outlines of a configuration example of a laminated solid imaging device to which the present technology can be applied.

In addition, the present technology, for example, can be applied to a laminated solid imaging device illustrated in FIGS. 30A to 30C.

FIG. 30A illustrates a schematic configuration example of a non-laminated solid imaging device. As illustrated in FIG. 30A, a solid imaging device 1010 includes one die (a semiconductor substrate) 1011. A pixel region 1012 in which the pixels are arranged in the shape of an array, a control circuit 1013 performing various controls other than the driving of the pixel, and logic circuit 1014 for signal processing are mounted on the die 1011.

FIGS. 30B and 30C illustrate schematic configuration examples of a laminated solid imaging device. As illustrated in FIGS. 30B and 30C, two dies of a sensor die 1021 and a logic die 1022 are laminated on a solid imaging device 1020, are electrically connected to each other, and are configured as one semiconductor chip.

In FIG. 30B, the pixel region 1012 and the control circuit 1013 are mounted on the sensor die 1021, and the logic circuit 1014 including a signal processing circuit which performs the signal processing is mounted on the logic die 1022.

In FIG. 30C, the pixel region 1012 is mounted on the sensor die 1021, and the control circuit 1013 and the logic circuit 1014 are mounted on the logic die 1024.

Further, the present technology can be applied to a metal thin film filter using a metal thin film other than the plasmon filter, and a possibility that the present technology is applied to photonic crystals using a semiconductor material is considered as an application example.

4. Application Example

Next, an application example of the present technology will be described.

Application Example of Present Technology

Figure 31:
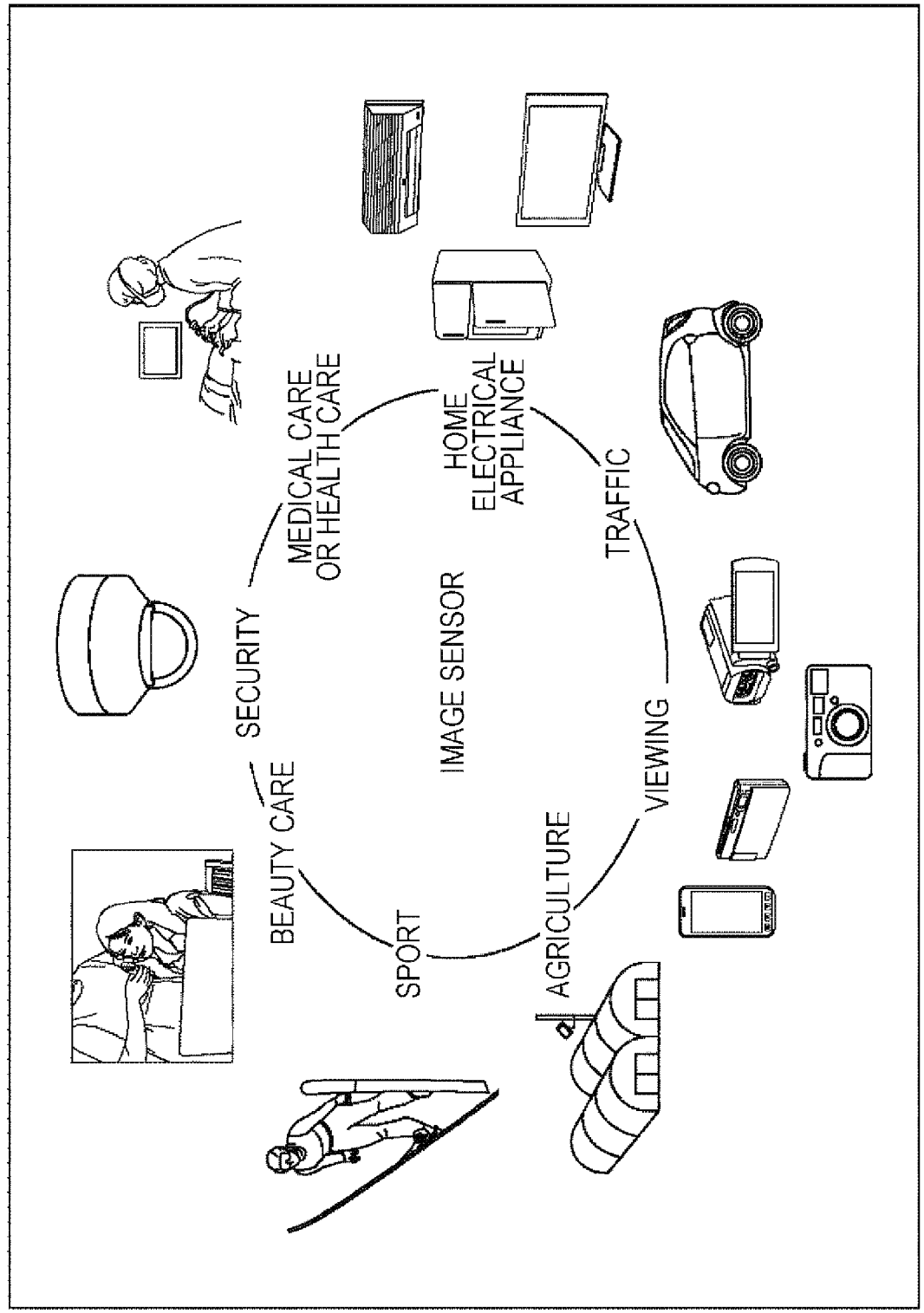
FIG. 31 is a diagram illustrating an application example of the present technology.

For example, as illustrated in FIG. 31, the present technology can be applied to various cases of sensing light such as visible light, infrared light, ultraviolet light, and an X ray.

- a device shooting an image provided for viewing, such as a digital camera or portable device having a camera function
- a device provided for traffic, such as an in-vehicle sensor shooting the front side, the rear side, the circumference, the inside, or the like of the automobile, a monitoring camera monitoring a running vehicle or a road, and a distance measuring sensor measuring a distance between vehicles or the like, in order for a safety operation such as automatic stop, the recognition of the state of a driver, and the like
- a device provided for a home electrical appliance, such as a TV, a refrigerator, and an air conditioner, in order to shoot the gesture of the user, and to perform a device operation according to the gesture
- a device provided for a medical care or a health care, such as an endoscope or a device performing angiography by receiving infrared light
- a device provided for security, such as a monitoring camera for anti-crime and a camera for personal authentication
- a device provided for a beauty care, such as a skin measuring machine shooting the skin and a microscope shooting the scalp
- a device provided for sport, such as an action camera or a wearable camera for sport
- a device provided for agriculture, such as a camera monitoring the state of the cultivation or the crop Hereinafter, a more detailed application example will be described.

For example, the transmission band of the narrow band filter NB of each of the pixels 51 of the imaging device 10 of FIG. 1 is adjusted, and thus, a wavelength band of light which is detected by each of the pixels 51 of the imaging device 10 (hereinafter, referred to as a detection band) can be adjusted. Then, the detection band of each of the pixels 51 is suitably set, and thus, the imaging device 10 can be used for various applications.

For example, FIG. 32 illustrates an example of a detection band in a case where the tastiness or the freshness of the food is detected.

For example, a peak wavelength of a detection band in the case of detecting myoglobin representing a tastiness component of tuna, beef, or the like is in a range of 580 nm to 630 nm, and a half width is in a range of 30 nm to 50 nm. A peak wavelength of a detection band in the case of detecting an oleic acid representing the freshness of the tuna, the beef, or the like is 980 nm, and a half width is in a range of 50 nm to 100 nm. A peak wavelength of a detection band in the case of detecting chlorophyll representing the freshness of leaf vegetable such as bras sica rapa is in a range of 650 nm to 700 nm, and a half width is in a range of 50 nm to 100 nm.

FIG. 33 illustrates an example of a detection band in a case where a sugar content or the moisture of a fruit is detected.

For example, a peak wavelength of a detection band in the case of detecting a flesh light path length representing a sugar content of Raiden, which is one breed of melon, is 880 nm, and a half width is in a range of 20 nm to 30 nm. A peak wavelength of a detection band in the case of detecting sucrose representing the sugar content of Raiden is 910 nm, and a half width is in a range of 40 nm to 50 nm. A peak wavelength of a detection band in the case of detecting sucrose representing a sugar content of Raiden Red, which is another breed of melon, is 915 nm, and a half width is in a range of 40 nm to 50 nm. A peak wavelength of a detection band in the case of detecting moisture representing the sugar content of Raiden Red is 955 nm, and a half width is in a range of 20 nm to 30 nm.

A peak wavelength of a detection band in the case of detecting sucrose representing a sugar content of an apple is 912 nm, and a half width is in a range of 40 nm to 50 nm. A peak wavelength of a detection band in the case of detecting water representing the moisture of a mandarin orange is 844 nm, and a half width is 30 nm. A peak wavelength of a detection band in the case of detecting sucrose representing a sugar content of the mandarin orange is 914 nm, and a half width is in a range of 40 nm to 50 nm.

FIG. 34 illustrates an example of a detection band in a case where plastics are sorted.

For example, a peak wavelength of a detection band in the case of detecting poly ethylene terephthalate (PET) is 1669 nm, and a half width is in a range of 30 nm to 50 nm. A peak wavelength of a detection band in the case of detecting poly styrene (PS) is 1688 nm, and a half width is in a range of 30 nm to 50 nm. A peak wavelength of a detection band in the case of detecting poly ethylene (PE) is 1735 nm, and a half width is in a range of 30 nm to 50 nm. A peak wavelength of a detection band in the case of detecting poly vinyl chloride (PVC) is in a range of 1716 nm to 1726 nm, and a half width is in a range of 30 nm to 50 nm. A peak wavelength of a detection band in the case of detecting polypropylene (PP) is in a range of 1716 nm to 1735 nm, and a half width is in a range of 30 nm to 50 nm.

In addition, for example, the present technology can be applied to freshness management of plucked flower.

Further, for example, the present technology can be applied to an inspection of foreign substances which are mixed into the food. For example, the present technology can be applied to the detection of the foreign substances, such as a shell, a hull, a stone, a leaf, a branch, and a wood chip, which are mixed into nuts, such as an almond, a blueberry, and a walnut, or fruits. In addition, for example, the present technology can be applied to the detection of the foreign substances such as plastic pieces mixed into processed food, beverage, or the like.

Further, for example, the present technology can be applied to the detection of a normalized difference vegetation index (NDVI), which is an index of vegetation.

In addition, for example, the present technology can be applied to the detection of a human body on the basis of any one or both of a spectral shape in the vicinity of a wavelength of 580 nm, derived from Hemoglobin of the human skin and a spectral shape in the vicinity of a wavelength of 960 nm, derived from a melanin dye contained in the human skin.

Further, for example, the present technology can be applied to biological detection (biological authentication), fabrication prevention, monitoring, and the like of a user interface and a sign.

<Application Example of Endoscopic Surgery System>

In addition, for example, a technology according to an embodiment of the present disclosure (the present technology) may be applied to an endoscopic surgery system.

Figure 35:
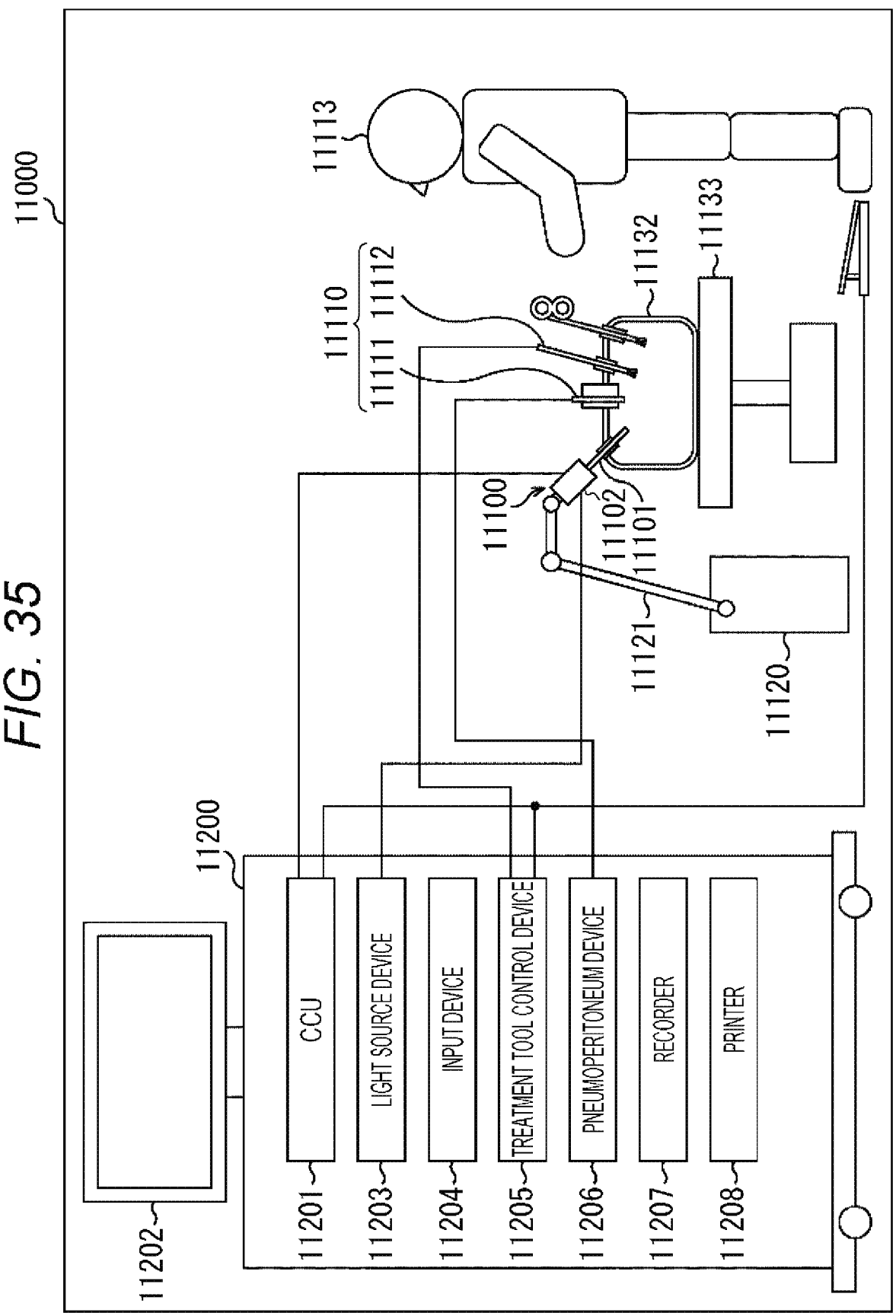
FIG. 35 is a diagram illustrating an example of a schematic configuration of an endoscopic surgery system.

FIG. 35 is a diagram illustrating an example of a schematic configuration of the endoscopic surgery system to which the technology according to an embodiment of the present disclosure (the present technology) is applied.

FIG. 35 illustrates an aspect in which an operator (a medical doctor) 11131 performs a surgery with respect to a patient 11132 on a patient bed 11133 by using an endoscopic surgery system 11000. As illustrated in the drawing, the endoscopic surgery system 11000 is configured of an endoscope 11100, other surgical tools 11110 such as a pneumoperitoneum tube 11111 or an energy treatment tool 11112, a support arm device 11120 supporting the endoscope 11100, and a cart 11200 on which various devices for the surgery under the endoscope are mounted.

The endoscope 11100 is configured of a lens barrel 11101 in which a region having a predetermined length from a tip end is inserted into a body cavity of the patient 11132, and a camera head 11102 connected to a base end of the lens barrel 11101. In the illustrated example, the endoscope 11100 configured as a so-called rigid scope including a rigid lens barrel 11101 is illustrated, and the endoscope 11100 may be configured as a so-called flexible scope including a flexible lens barrel.

An opening portion embedded with an objective lens is disposed on the tip end of the lens barrel 11101. A light source device 11203 is connected to the endoscope 11100, and light generated by the light source device 11203 is guided to the tip end of the lens barrel by a light guide extending in the lens barrel 11101, and is emitted towards an observation target in the body cavity of the patient 11132 through the objective lens. Furthermore, the endoscope 11100 may be a direct view mirror, or may be a perspective view mirror or a side view mirror.

An optical system and an imaging element are disposed on the camera head 11102, and reflection light from the observation target (observation light) is condensed on the imaging element by the optical system. The observation light is subjected to photoelectric conversion by the imaging element, and thus, an electric signal corresponding to the observation light, that is, an image signal corresponding to the observation image is generated. The image signal is transmitted to a camera control unit (CCU) 11201 as RAW data.

The CCU 11201 is configured of a central processing unit (CPU), a graphics processing unit (GPU), or the like, and integrally controls the operations of the endoscope 11100 and a display device 11202. Further, the CCU 11201 receives the image signal from the camera head 11102, and performs various image processings for displaying an image based on the image signal with respect to the image signal, such as developing processing (demosaic processing).

The display device 11202 displays the image based on the image signal, which is subjected to the image processing by the CCU 11201, according to the control from the CCU 11201.

The light source device 11203, for example, is configured of a light source such as a light emitting diode (LED), and supplies irradiation light at the time of shooting a surgical site or the like to the endoscope 11100.

An input device 11204 is an input interface with respect to the endoscopic surgery system 11000. It is possible for the user to perform various information inputs or instruction inputs with respect to the endoscopic surgery system 11000 through the input device 11204. For example, the user inputs an instruction or the like to the effect of changing imaging conditions of the endoscope 11100 (the type of irradiation light, a magnification, a focal point distance, and the like).

A treatment tool control device 11205 controls the drive of the energy treatment tool 11112, such as the cauterization of tissues, and the incision or the sealing of a blood vessel. A pneumoperitoneum device 11206 feeds gas in the body cavity through the pneumoperitoneum tube 11111, in order to inflate the body cavity of the patient 11132 to ensure a visual field of the endoscope 11100 and an operation space of the operator. A recorder 11207 is a device which is capable of recording various information items relevant to the surgery. A printer 11208 is a device which is capable of printing various information items relevant to the surgery in various formats such as a text, an image, or a graph.

Furthermore, the light source device 11203 supplying the irradiation light at the time of shooting the surgical site to the endoscope 11100, for example, can be configured of a white light source which is configured of an LED, a laser light source, or a combination thereof. In a case where the white light source is configured of a combination of RGB laser light sources, an output intensity and an output timing of each color (each wavelength) can be controlled with a high accuracy, and thus, a white balance of the imaged image can be adjusted in the light source device 11203. In addition, in this case, the RGB laser light source irradiates the observation target with each laser light ray in time division, and controls the driving of the imaging element of the camera head 11102 in synchronization with the irradiation timing, and thus, it is also possible to image an image corresponding to each of RGB in time division. According to the method described above, it is possible to obtain a color image even in a case where the color filter is not disposed in the imaging element.

In addition, the light source device 11203 may control the driving such that the light intensity to be output is changed for each predetermined time. The driving of the imaging element of the camera head 11102 is controlled in synchronization with a timing at which the light intensity is changed, an image is acquired in time division, and the image is synthesized, and thus, it is possible to generate an image in a high dynamic range without having so-called black defects and overexposure.

In addition, the light source device 11203 may be configured to be capable of supplying light in a predetermined wavelength band corresponding to special light observation. In the special light observation, for example, light in a narrow band, compared to the irradiation light (that is, white light) at the time of normal observation, is emitted by using wavelength dependency of light absorption in the body tissues, and thus, so-called narrow band light observation (narrow band imaging) shooting a predetermined tissue of the blood vessel or the like on a surface layer of a mucous membrane with a high contrast is performed. Alternatively, in the special light observation, fluorescent light observation may be performed in which an image is obtained by fluorescent light generated by emitting excitation light. In the fluorescent light observation, the body tissues are irradiated with the excitation light, and thus, the fluorescent light from the body tissues can be observed (self-fluorescent light observation), or a reagent such as indocyanine green (ICG) is locally injected into the body tissues, and the body tissues are irradiated with excitation light corresponding to the wavelength of the fluorescent light of the reagent, and thus, a fluorescent image can be obtained. The light source device 11203 can be configured to be capable of supplying the narrow band light and/or the excitation light corresponding to the special light observation.

Figure 36:
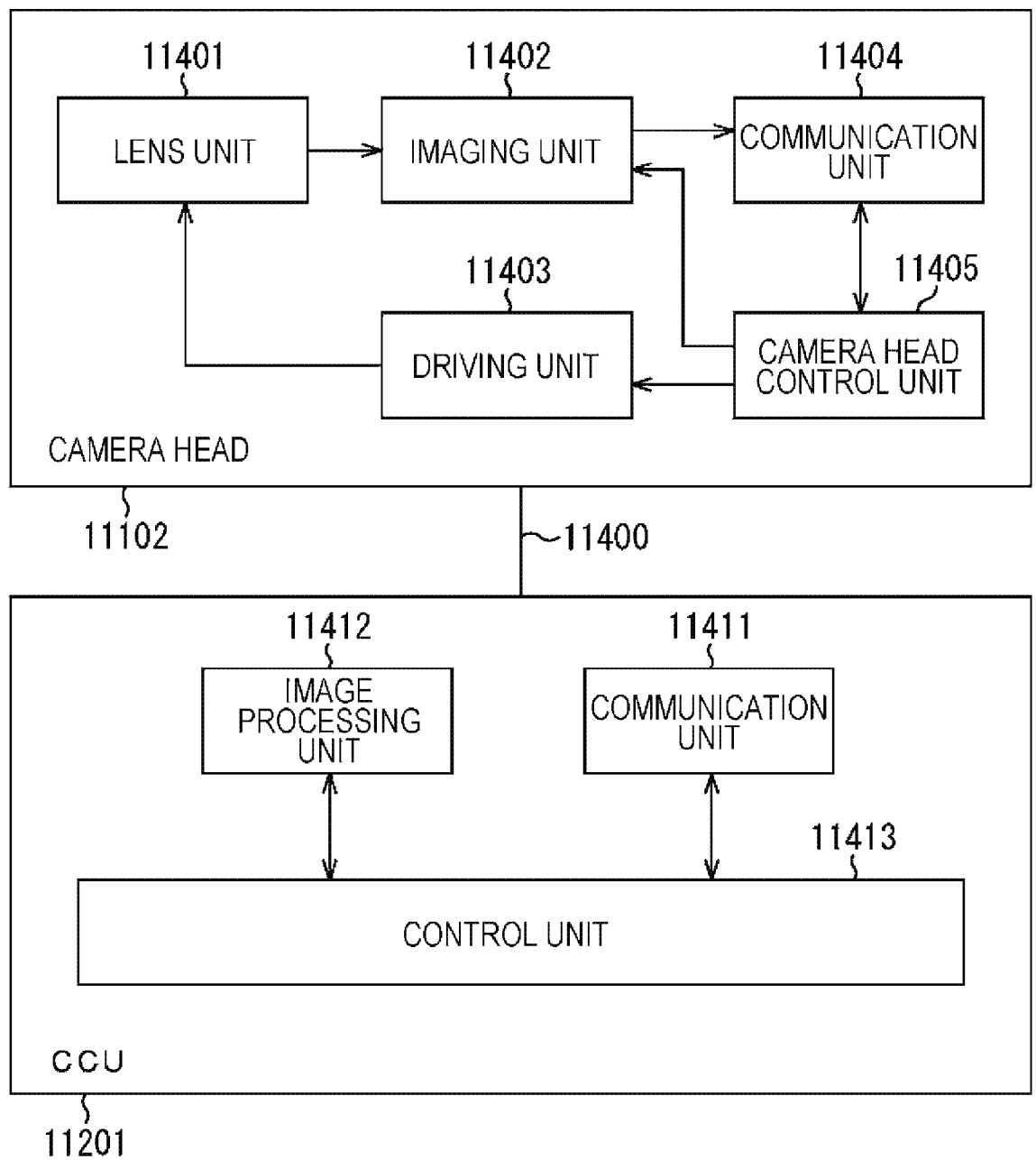
FIG. 36 is a block diagram illustrating an example of a functional configuration of a camera head and CCU.

FIG. 36 is a block diagram illustrating an example of functional configurations of the camera head 11102 and the CCU 11201 illustrated in FIG. 35.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are connected to each other to communicate with each other by a transmission cable 11400.

The lens unit 11401 is an optical system which is disposed in a connection portion with respect to the lens barrel 11101. The captured observation light from the tip end of the lens barrel 11101 is guided to the camera head 11102, and is incident on the lens unit 11401. The lens unit 11401 is configured of a combination of a plurality of lenses including a zoom lens and a focus lens.

The imaging element configuring the imaging unit 11402 may be one imaging element (a so-called single-plate type imaging element), or may be a plurality of imaging elements (a so-called multi-plate type imaging element). In a case where the imaging unit 11402 is configured of the multi-plate type imaging element, for example, image signals corresponding to each of RGB are generated by each of the imaging elements, and are synthesized, and thus, a color image may be obtained. Alternatively, the imaging unit 11402 may be configured to include a pair of imaging elements for acquiring image signals for a right eye and a left eye, which correspond to three-dimensional (3D) display. By performing the 3D display, it is possible for the operator 11131 to more accurately grasp the depth of the body tissues in the surgical site. Furthermore, in a case where the imaging unit 11402 is configured of the multi-plate type imaging element, a plurality of lens units 11401 can also be disposed corresponding to each of the imaging elements.

In addition, the imaging unit 11402 may not be necessarily disposed on the camera head 11102. For example, the imaging unit 11402 may disposed in the lens barrel 11101 immediately behind the objective lens.

The driving unit 11403 is configured of an actuator, and moves the zoom lens and the focus lens of the lens unit 11401 along an optical axis by a predetermined distance, according to the control from the camera head control unit 11405. Accordingly, the magnification and the focal point of the imaged image obtained by the imaging unit 11402 can be suitably adjusted.

The communication unit 11404 is configured of a communication device for transmitting and receiving various information items with respect to the CCU 11201. The communication unit 11404 transmits the image signal obtained from the imaging unit 11402 to the CCU 11201 through the transmission cable 11400, as RAW data.

In addition, the communication unit 11404 receives a control signal for controlling the driving the camera head 11102 from the CCU 11201, and supplies the control signal to the camera head control unit 11405. The control signal, for example, includes information relevant to the imaging conditions, such as information to the effect of designating a frame rate of the imaged image, information to the effect of designating an exposure value at the time of imaging, and/or information to the effect of designating the magnification and the focal point of the imaged image.

Furthermore, the imaging conditions such as the frame rate or the exposure value, the magnification, and the focal point, described above, may be suitably designated by the user, or may be automatically set by the control unit 11413 of the CCU 11201 on the basis of the acquired image signal. In the latter case, a so-called auto exposure (AE) function, an auto focus (AF) function, and an auto white balance (AWB) function are mounted on the endoscope 11100.

The camera head control unit 11405 controls the driving of the camera head 11102 on the basis of the control signal from the CCU 11201, which is received through the communication unit 11404.

The communication unit 11411 is configured of a communication device for transmitting and receiving various information items with respect to the camera head 11102. The communication unit 11411 receives the image signal transmitted through the transmission cable 11400 from the camera head 11102.

In addition, the communication unit 11411 transmits the control signal for controlling the driving of the camera head 11102 to the camera head 11102. The image signal or the control signal can be transmitted by telecommunication, light communication, or the like.

The image processing unit 11412 performs various image processings with respect to the image signal, which is the RAW data transmitted from the camera head 11102.

The control unit 11413 performs various controls relevant to the imaging of the surgical site or the like using the endoscope 11100 and the display of the imaged image obtained by imaging the surgical site or the like. For example, the control unit 11413 generates the control signal for controlling the driving of the camera head 11102.

In addition, the control unit 11413 displays the imaged image, on which the surgical site or the like is reflected, on the display device 11202, on the basis of the image signal which is subjected to the image processing by the image processing unit 11412. At this time, the control unit 11413 may recognize various objects in the imaged image by using various image recognition technologies. For example, the control unit 11413 detects the shape, the color, or the like of the edge of the object which is included in the imaged image, and thus, is capable of recognizing a surgical tool such as forceps, a specific organic site, bleed, mist at the time of using the energy treatment tool 11112, or the like. The control unit 11413 may display various surgery assistance information items by superimpose the information on the image of the surgical site, by using the recognition result, at the time of displaying the imaged image on the display device 11202. The surgery assistance information is displayed by being superimposed, and is presented to the operator 11131, and thus, it is possible to reduce a load on the operator 11131, and it is possible for the operator 11131 to reliably perform the surgery.

The transmission cable 11400 connecting the camera head 11102 and the CCU 11201 to each other is an electric signal cable corresponding to the communication of the electric signal, an optical fiber corresponding to the light communication, or a composite cable thereof.

Here, in the illustrated example, the communication is performed in a wired manner by using the transmission cable 11400, and the communication between the camera head 11102 and the CCU 11201 may be performed in a wireless manner.

As described above, an example of the endoscopic surgery system which can be obtained by applying the technology according to an embodiment of the present disclosure thereto has been described. In the configurations described above, the technology according to an embodiment of the present disclosure, for example, can be obtained by being applied to the camera head 11102 or the imaging unit 11402 of the camera head 11102. Specifically, for example, the imaging element 12 of FIG. 1 can be applied to the imaging unit 11402. It is possible to obtain a more specific and high accurate surgical site image by applying the technology according to an embodiment of the present disclosure to the imaging unit 11402, and thus, it is possible for the operator to reliably confirm the surgical site.

Furthermore, here, the endoscopic surgery system has been described as an example, but the technology according to an embodiment of the present disclosure, for example, may be applied to a microscope surgery system or the like in addition to the endoscopic surgery system.

<Application Example to Movable Body>

In addition, for example, the technology according to an embodiment of the present disclosure may be realized as a device mounted on any type of movable body such as an automobile, an electric automobile, a hybrid electric automobile, a motorcycle, a bicycle, a personal mobility, an airplane, a drone, a ship, and a robot.

Figure 37:
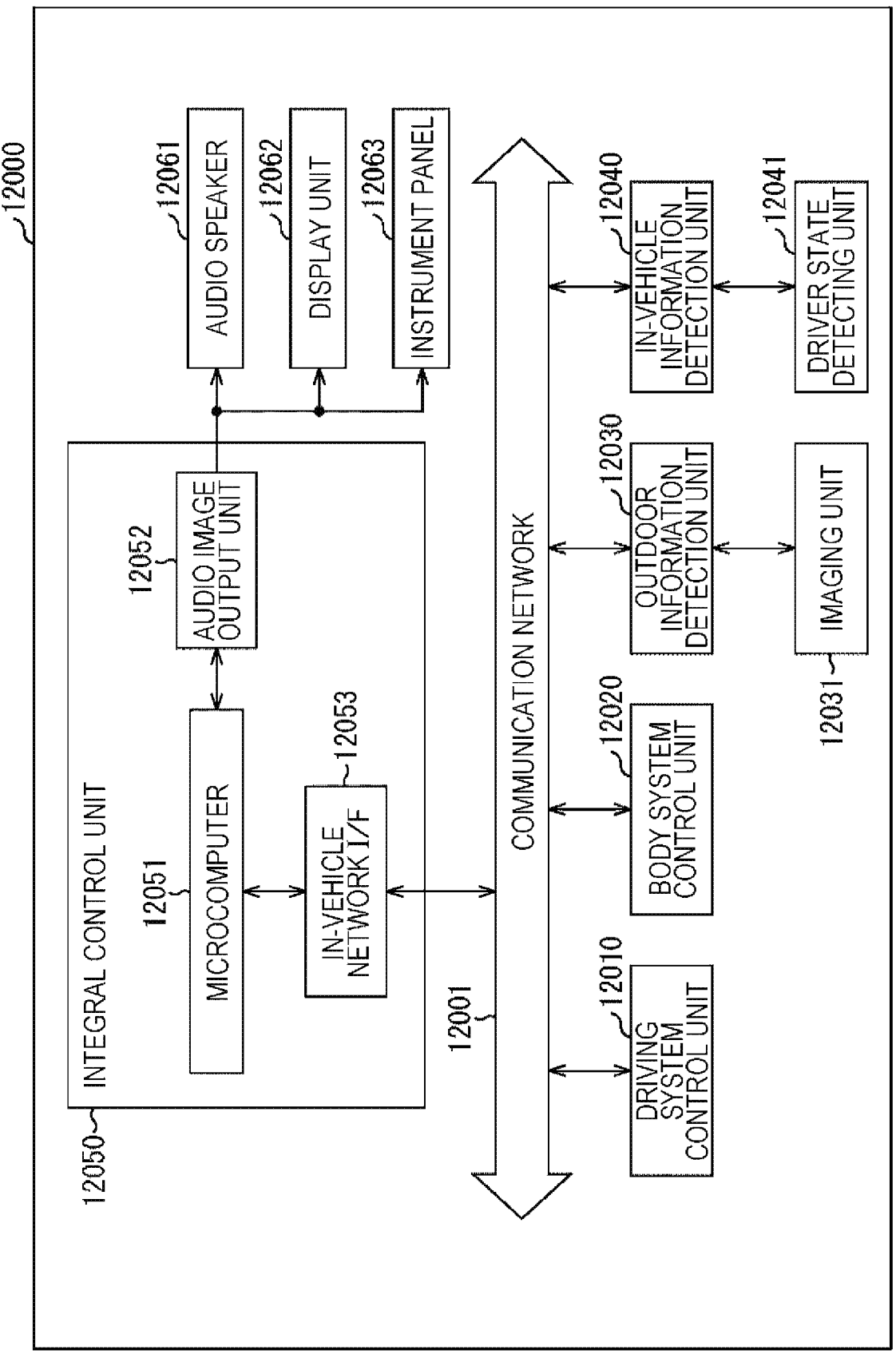
FIG. 37 is a block diagram illustrating an example of a schematic configuration of a vehicle control system.

FIG. 37 is a block diagram illustrating a schematic configuration example of a vehicle control system, which is an example of a movable body control system obtained by applying the technology according to an embodiment of the present disclosure thereto.

A vehicle control system 12000 includes a plurality of electronic control units connected to each other through a communication network 12001. In the example illustrated in FIG. 37, the vehicle control system 12000 includes a driving system control unit 12010, a body system control unit 12020, an outdoor information detection unit 12030, an in-vehicle information detection unit 12040, and an integral control unit 12050. In addition, a microcomputer 12051, an audio image output unit 12052, and an in-vehicle network interface (I/F) 12053 are illustrated as a functional configuration of the integral control unit 12050.

The driving system control unit 12010 controls an operation of a device relevant to a driving system of the vehicle according to various programs. For example, the driving system control unit 12010 functions as a control device of a driving force generating device for generating a driving force of a vehicle, such as an internal-combustion engine or a driving motor, a driving force transfer mechanism for transferring the driving force to a wheel, a steering mechanism adjusting a rudder angle of the vehicle, a braking device generating a braking force of the vehicle, and the like.

The body system control unit 12020 controls the operations of various devices mounted on a vehicle body according to various programs. For example, the body system control unit 12020 functions as a control device of a keyless entry system, a smart key system, an electric window device, and various lamps such as a head lamp, a back lamp, a brake lamp, a winker lamp, or a fog lamp. In this case, an electric wave transmitted from a portable machine instead of a key or signals of various switches can be input into the body system control unit 12020. The body system control unit 12020 receives the input of the electric wave or the signal, and controls the door lock device, the electric window device, the lamp, and the like of the vehicle.

The outdoor information detection unit 12030 detects the outside information of the vehicle on which the vehicle control system 12000 is mounted. For example, an imaging unit 12031 is connected to the outdoor information detection unit 12030. The outdoor information detection unit 12030 images the outdoor image by the imaging unit 12031, and receives the imaged image. The outdoor information detection unit 12030 may perform object detection processing or distance detection processing of a person, a car, an obstacle, a sign, characters on a road surface, or the like, on the basis of the received image.

The imaging unit 12031 is an optical sensor which receives light and outputs an electric signal according to the amount of the received light. The imaging unit 12031 is capable of outputting the electric signal as an image, and is capable of outputting the electric signal as distance measuring information. In addition, the light received by the imaging unit 12031 may be visible light, or may be non-visible light such as an infrared ray.

The in-vehicle information detection unit 12040 detects in-vehicle information. For example, a driver state detecting unit 12041 detecting the state of the driver is connected to the in-vehicle information detection unit 12040. The driver state detecting unit 12041, for example, includes a camera imaging the driver, and the in-vehicle information detection unit 12040 may calculate a fatigue degree or a concentration degree of the driver, or may determine whether or not the driver dozes off, on the basis of detection information input from the driver state detecting unit 12041.

The microcomputer 12051 calculates a control target value of the driving force generating device, the steering mechanism, or the braking device on the basis of the in-vehicle information and the outdoor information, which are acquired in the outdoor information detection unit 12030 or the in-vehicle information detection unit 12040, and is capable of outputting a control command to the driving system control unit 12010. For example, the microcomputer 12051 is capable of performing cooperative control for realizing the function of an advanced driver assistance system (ADAS) including collision avoidance or impact relaxation of the vehicle, following running based on an inter-vehicle distance, vehicle speed maintaining running, collision warning of the vehicle, lane departure warning of the vehicle, and the like.

In addition, the microcomputer 12051 controls driving force generating device, the steering mechanism, the braking device, or the like, on the basis of the information around the vehicle, which is acquired in the outdoor information detection unit 12030 or the in-vehicle information detection unit 12040, and is capable of performing cooperative control for automated driving in which the vehicle autonomously runs without depending on the operation of the driver.

In addition, the microcomputer 12051 is capable of outputting the control command to the body system control unit 12020, on the basis of the outdoor information, which is acquired in the outdoor information detection unit 12030. For example, the microcomputer 12051 controls the head lamp according to the position of a leading vehicle or an oncoming vehicle, which is detected by the outdoor information detection unit 12030, and thus, is capable of performing cooperative control for glare-proof such as switching the high beam with a low beam.

The audio image output unit 12052 transmits at least one output signal of an audio and an image to an output device which is capable of visually or auditorily notifying a person on board or the outdoor of the vehicle of the information. In the example of FIG. 37, an audio speaker 12061, a display unit 12062, and an instrument panel 12063 are exemplified as the output device. The display unit 12062, for example, may include at least one of an on-board display and a head-up display.

Figure 38:
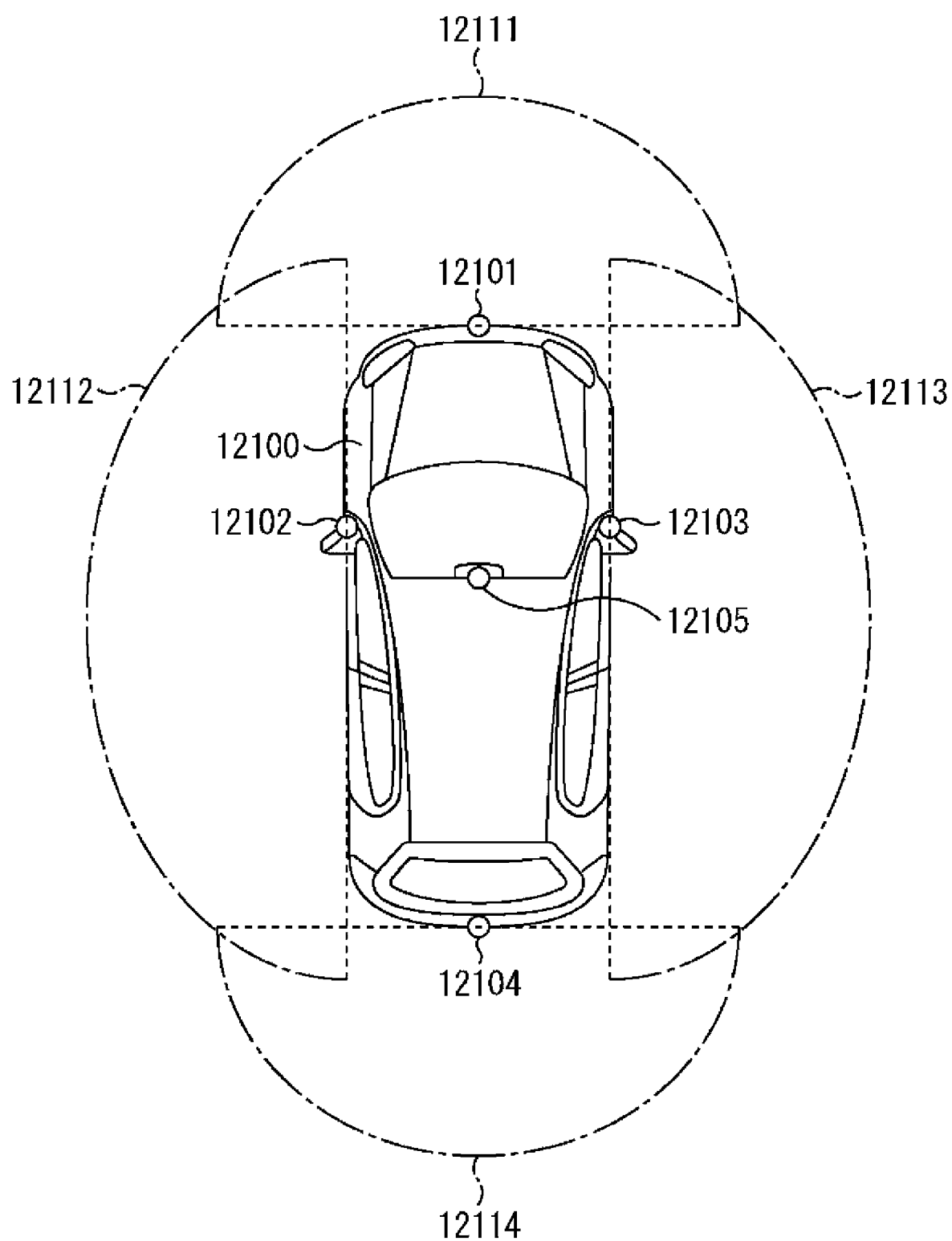
FIG. 38 is an explanatory diagram describing an example of a disposition position of an outdoor information detecting unit and an imaging unit.

FIG. 38 is a diagram illustrating an example of a disposition position of the imaging unit 12031.

In FIG. 38, the imaging unit 12031 includes imaging units 12101, 12102, 12103, 12104, and 12105.

The imaging units 12101, 12102, 12103, 12104, and 12105, for example, are disposed in positions such as a front nose, a side mirror, a rear bumper, a back door of a vehicle 12100, and an upper portion of a front glass of a vehicle interior. The imaging unit 12101 provided in the front nose and the imaging unit 12105 provided in the upper portion of the front glass of the vehicle interior mainly acquire a front image of the vehicle 12100. The imaging units 12102 and 12103 provided in the side minor mainly acquire a side image of the vehicle 12100. The imaging unit 12104 provided in the rear bumper or the back door mainly acquires a rear image of the vehicle 12100. The imaging unit 12105 provided in the upper portion of the front glass of the vehicle interior is mainly used for detecting a leading vehicle, a pedestrian, an obstacle, a traffic light, a traffic sign, a traffic lane, or the like.

Furthermore, FIG. 38 illustrates an example of shooting ranges of the imaging units 12101 to 12104. The imaging range 12111 illustrates an imaging range of the imaging unit 12101 provided in the front nose, imaging ranges 12112 and 12113 illustrate imaging ranges of the imaging units 12102 and 12103 respectively provided in the side mirror, and the imaging range 12114 illustrates an imaging range of the imaging unit 12104 provided in the rear bumper or the back door. For example, image data items imaged in the imaging units 12101 to 12104 are superimposed on each other, and thus, an overhead image is obtained in which the vehicle 12100 is viewed from the upper side.

At least one of the imaging units 12101 to 12104 may have a function of acquiring the distance information. For example, at least one of the imaging units 12101 to 12104 may be a stereo camera formed of a plurality of imaging elements, or may be an imaging element including a pixel for detecting a phase difference.

For example, the microcomputer 12051 obtains a distance to each solid object in the imaging ranges 12111 to 12114, and a temporal change of the distance (a relative speed with respect to the vehicle 12100), on the basis of the distance information obtained from the imaging units 12101 to 12104, and thus, in particular, it is possible to extract the solid object running at a predetermined speed (for example, greater than or equal to 0 km/h) in approximately the same direction as that of the vehicle 12100 as the leading vehicle, in the closest solid object on a traveling path of the vehicle 12100. Further, the microcomputer 12051 sets the inter-vehicle distance to be ensured in advance immediately before the leading vehicle, and thus, is capable of performing automatic brake control (also including following stop control), automatic acceleration control (also including following start control), or the like. Thus, it is possible to perform the cooperative control for the automated driving in which the vehicle autonomously runs without depending on the operation of the driver.

For example, it is possible for the microcomputer 12051 to extract solid object data relevant to the solid object by sorting the data into other solid objects such as a two-wheeled vehicle, an ordinary vehicle, a large vehicle, a pedestrian, and a telegraph pole, on the basis of the distance information obtained from the imaging units 12101 to 12104, and to use the data for automatically avoiding the obstacle. For example, the microcomputer 12051 distinguishes the obstacle around the vehicle 12100 between an obstacle which is visible to the driver of the vehicle 12100 and an obstacle which is not visible. Then, the microcomputer 12051 determines collision risk representing a dangerous extent of the collision with respect to each of the obstacles, and in the case of a situation in which the collision risk is greater than or equal to a set value, that is, there is a possibility of the collision, an alarm is output to the driver through the audio speaker 12061 or the display unit 12062, or forced deceleration and avoidance steering is performed through the driving system control unit 12010, and thus, it is possible to perform driving assistance for avoiding the collision.

At least one of the imaging units 12101 to 12104 may be an infrared ray camera detecting an infrared ray. For example, the microcomputer 12051 determines whether or not the pedestrian exists in the imaged images of the imaging units 12101 to 12104, and thus, it is possible to recognize the pedestrian. Such recognition of the pedestrian, for example, is performed in the order of extracting a characteristic point in the imaged images of the imaging units 12101 to 12104 as the infrared ray camera and the order of determining whether or not there is the pedestrian by performing pattern matching processing with respect to a set of characteristic points representing the outline of the object. The microcomputer 12051 determines that the pedestrian exists in the imaged images of the imaging units 12101 to 12104, and in a case where the pedestrian is recognized, the audio image output unit 12052 controls the display unit 12062 such that a rectangular outline for emphasis is displayed by being superimposed on the recognized pedestrian. In addition, the audio image output unit 12052 may control the display unit 12062 such that an icon or the like representing the pedestrian is displayed in a desired position.

As described above, an example of the vehicle control system, which can be obtained by applying the technology according to an embodiment of the present disclosure thereto, has been described. In the configurations described above, the technology according to an embodiment of the present disclosure, for example, can be applied to the imaging unit 12031. Specifically, for example, the imaging device 10 of FIG. 1 can be applied to the imaging unit 12031. By applying the technology according to an embodiment of the present disclosure to the imaging unit 12031, for example, it is possible to more specifically acquire the outdoor information with a higher accuracy, and to realize improvement or the like or the safety of the automated driving.

Furthermore, the embodiment of the present technology are not limited to the embodiments described above, and can be variously changed within a range not departing from the gist of the present technology.

Additionally, the present technology may also be configured as below.

(1)

An imaging system, comprising:
a multispectral camera configured to capture a multispectral image of an object;
an RGB camera configured to capture a color image of the object;
at least one storage device configured to store spectrum information for each of a plurality of labeled objects; and
processing circuitry configured to:
determine, based on the captured multispectral image, spectrum information associated with the object;
associate, based at least in part, on the spectrum information associated with the object and the stored spectrum information for each of the plurality of objects, a label with the color image of the object; and
store, on the at least one storage device, the color image and the associated label as training data.

(2)

The imaging system of claim 1, wherein associating a label with the color image of the object comprises:
determining a similarity measure of the spectrum information of the object with the stored spectrum information for each of the plurality of labeled objects; identifying, based on the determined similarity measures, the labeled object having a highest similarity measure; and
associating a label associated with the labeled object having the highest similarity measure with the color image of the object.

(3)

The imaging system of claim 2, wherein the similarity measure comprises a similarity ratio.

(4)

The imaging system of any one of (2) or (3), wherein associating a label with the color image of the object further comprises:
comparing the similarity measure for the labeled object having a highest similarity measure to a threshold value; and
associating the label associated with the labeled object having the highest similarity measure with the color image of the object only when the similarity measure for the labeled object is greater than the threshold value.

(5)

The imaging system of any one of (1) to (4), wherein determining spectrum information associated with the object comprises:
identifying a region of the multispectral image that includes the object, wherein the region comprises a region smaller than the entire image; and
determining the spectrum information associated with the object based on the region of the multispectral image.

(6)

The imaging system of any one of (1) to (5), wherein the multispectral camera and the RGB camera are configured to capture the multispectral image and the color image, respectively, simultaneously.

(7)

The imaging system of any one of (1) to (6), wherein the processing circuitry is further configured to train an object classifier using the stored training data to generate a trained object classifier.

(8)

The imaging system of (7), wherein the processing circuitry is further configured to classify an object in a received color image using the trained object classifier.

(9)

The imaging system of (8), wherein the processing circuitry is further configured to: determine based, at least in part, on the classification of the object in the received color image and spectrum information associated with the object, an evaluation index value for a characteristic of the object; and output on a display, an indication of the evaluation index value.

(10)

The imaging system of (9), wherein the processing circuitry is further configured to output on the display, the received color image, and an indication of the classification of the object in the color image.

(11)

The imaging system of (9), wherein the indication of the classification value comprises text and wherein the processing circuitry is further configured to output on the display, the text superimposed on the received color image.

(12)

The imaging system of (9), wherein determining the evaluation index value for a characteristic of the object comprises:
selecting based at least on part, on the classification of the object, an index calculating formula and a coefficient necessary for calculating the evaluation index value; and
determining the evaluation index value using the selected index calculating formula and coefficient.

(13)

The imaging system of (9), wherein the processing circuitry is further configured to determine the spectrum information associated with the object.

(14)
An object classification system, comprising:
at least one storage device configured to store a trained object classifier; and processing circuitry configured to:
classify an object in a received color image using the trained object classifier;
determine based, at least in part, on the classification of the object in the received color image and spectrum information associated with the object, an evaluation index value for a characteristic of the object; and
output on a display, an indication of the evaluation index value.
(15)
The object classification system of (14), wherein the processing circuitry is further configured to output on the display, the received color image, and an indication of the classification of the object in the color image.
(16)
The object classification system of any one of (14) or (15), wherein determining the evaluation index value for a characteristic of the object comprises:
selecting based at least on part, on the classification of the object, an index calculating formula and a coefficient necessary for calculating the evaluation index value; and
determining the evaluation index value using the selected index calculating formula and coefficient.
(17)
The object classification system of any one of (14) to (16), wherein the object in the received color image is a food, and wherein the characteristic of the object is a freshness or a nutrient content of the food.
(18)
The object classification system of any one of (14) to (17), wherein the processing circuitry is further configured to:
identify a region of the received color image that includes the object, wherein the region comprises a region smaller than the entire image; and
classify the object based on the identified region of the color image.
(19)
The object classification system of any one of (14) to (18), further comprising a camera configured to capture the color image.
(20)
The object classification system of any one of (14) to (19), wherein the processing circuitry is further configured to determine the spectrum information associated with the object.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

301 Training data generating system
302 Object recognition system
303 Evaluation index presenting system
311 Multispectral camera
312 RGB camera
313 Storage device
314 Training data generating processing device
315 Output device
321 Spectrum information retaining unit
322 Recognition processing unit
323 Labeling unit
324 Evaluation index calculating unit
331 Storage device
332 Learning tool
333 RGB camera
334 Output device

The invention claimed is:
1. An imaging system, comprising:
a multispectral camera configured to capture a multispectral image of an object;
an RGB camera configured to capture a color image of the object;
at least one storage device configured to store spectrum information for each of a plurality of labeled objects; and
processing circuitry configured to:
determine, based on the captured multispectral image, spectrum information associated with the object;
associate, based at least in part, on the spectrum information associated with the object and the stored spectrum information for each of the plurality of objects, a label with the color image of the object; and
store, on the at least one storage device, the color image and the associated label as training data.

2. The imaging system of claim 1, wherein associating a label with the color image of the object comprises:
determining a similarity measure of the spectrum information of the object with the stored spectrum information for each of the plurality of labeled objects;
identifying, based on the determined similarity measures, the labeled object having a highest similarity measure; and
associating a label associated with the labeled object having the highest similarity measure with the color image of the object.

3. The imaging system of claim 2, wherein the similarity measure comprises a similarity ratio.

4. The imaging system of claim 2, wherein associating a label with the color image of the object further comprises:
comparing the similarity measure for the labeled object having a highest similarity measure to a threshold value; and
associating the label associated with the labeled object having the highest similarity measure with the color image of the object only when the similarity measure for the labeled object is greater than the threshold value.

5. The imaging system of claim 1, wherein determining spectrum information associated with the object comprises:
identifying a region of the multispectral image that includes the object, wherein the region comprises a region smaller than the entire image; and
determining the spectrum information associated with the object based on the region of the multispectral image.

6. The imaging system of claim 1, wherein the multispectral camera and the RGB camera are configured to capture the multispectral image and the color image, respectively, simultaneously.

7. The imaging system of claim 1, wherein the processing circuitry is further configured to train an object classifier using the stored training data to generate a trained object classifier.

8. The imaging system of claim 7, wherein the processing circuitry is further configured to classify an object in a received color image using the trained object classifier.

9. The imaging system of claim 8, wherein the processing circuitry is further configured to:
- determine based, at least in part, on the classification of the object in the received color image and spectrum information associated with the object, an evaluation index value for a characteristic of the object; and
- output on a display, an indication of the evaluation index value.

10. The imaging system of claim 9, wherein the processing circuitry is further configured to output on the display, the received color image, and an indication of the classification of the object in the color image.

11. The imaging system of claim 9, wherein the indication of the classification value comprises text and wherein the processing circuitry is further configured to output on the display, the text superimposed on the received color image.

12. The imaging system of claim 9, wherein determining the evaluation index value for a characteristic of the object comprises:
- selecting based at least on part, on the classification of the object, an index calculating formula and a coefficient necessary for calculating the evaluation index value; and
- determining the evaluation index value using the selected index calculating formula and coefficient.

13. The imaging system of claim 9, wherein the processing circuitry is further configured to determine the spectrum information associated with the object.

* * * * *